United States Patent
Merritt

(10) Patent No.: US 11,149,225 B1
(45) Date of Patent: Oct. 19, 2021

(54) INCENDIARY DEVICE

(71) Applicant: James Perry Merritt, Kaukauna, WI (US)

(72) Inventor: James Perry Merritt, Kaukauna, WI (US)

( * ) Notice: Subject to any disclaimer, the term of this patent is extended or adjusted under 35 U.S.C. 154(b) by 0 days.

(21) Appl. No.: 16/731,003

(22) Filed: Dec. 30, 2019

Related U.S. Application Data

(60) Provisional application No. 62/787,256, filed on Dec. 31, 2018.

(51) Int. Cl.
| | |
|---|---|
| *C10L 11/06* | (2006.01) |
| *C10L 5/14* | (2006.01) |
| *C10L 5/36* | (2006.01) |
| *B32B 29/08* | (2006.01) |
| *C10L 5/40* | (2006.01) |

(52) U.S. Cl.
CPC .............. *C10L 11/06* (2013.01); *B32B 29/08* (2013.01); *C10L 5/146* (2013.01); *C10L 5/365* (2013.01); *C10L 5/403* (2013.01); *C10L 2290/20* (2013.01); *C10L 2290/30* (2013.01)

(58) Field of Classification Search
CPC .......... B32B 29/08; C01L 11/06; C01L 5/146; C01L 5/365; C01L 5/403; C01L 11/00; C01L 11/02; C01L 11/04
USPC ................................. 44/535, 532, 533, 544
See application file for complete search history.

(56) References Cited

U.S. PATENT DOCUMENTS

| | | | |
|---|---|---|---|
| 930,526 A * | 8/1909 | Bloss | ............................... 44/521 |
| 1,651,165 A | 11/1927 | Thomas | |
| 2,107,054 A | 2/1938 | Haymond | |
| 2,261,467 A | 11/1941 | Hanson | |
| 2,622,017 A | 12/1952 | Bramhall et al. | |
| 2,789,890 A | 4/1957 | Stevens | |
| 3,367,757 A * | 2/1968 | Church | ................... F23Q 13/00 |
| | | | 44/522 |
| 3,377,147 A | 4/1968 | Remines | |
| 3,759,675 A | 9/1973 | Lazarus et al. | |
| 3,880,611 A | 4/1975 | Weiss | |
| 3,883,317 A | 5/1975 | Neme | |
| 4,043,765 A | 8/1977 | Tanner | |
| 4,104,034 A | 8/1978 | Wu et al. | |
| 4,116,645 A | 9/1978 | Dalzell | |
| 4,326,854 A | 4/1982 | Tanner | |
| 4,414,906 A | 11/1983 | Hartouni | |
| 4,417,900 A | 11/1983 | Barthel | |
| 4,539,011 A | 9/1985 | Kretzschmann | |
| 4,560,389 A | 12/1985 | Steibel | |
| 4,670,018 A | 6/1987 | Cornwell | |
| 4,725,286 A | 2/1988 | Brame | |

(Continued)

*Primary Examiner* — Joshua T Semick

(74) *Attorney, Agent, or Firm* — Bryan R. Rosiejka

(57) ABSTRACT

An inventive incendiary device is provided. The incendiary device comprises a plurality of corrugated components which are substantially saturated with a waxy component. In one preferred embodiment, the plurality of corrugated components are arranged in a stacked configuration to form a firestarter log. The firestarter log can additionally include a support component longitudinally disposed therethrough. The firestarter log can further comprise an ignition component at least partially disposed thereupon. In some aspects, the firestarter log further comprises a groove, which can provide an air passageway, and in which the ignition component can be at least partially disposed.

20 Claims, 35 Drawing Sheets

(56) References Cited

U.S. PATENT DOCUMENTS

| | | |
|---|---|---|
| 4,781,128 A | 11/1988 | Salner |
| 4,883,498 A | 11/1989 | MacIsaac |
| 5,393,310 A | 2/1995 | Wollen |
| 5,711,766 A | 1/1998 | Bain |
| 5,830,245 A * | 11/1998 | Raddon .................. C10L 5/44 44/544 |
| 5,990,057 A | 11/1999 | Sharp |
| 6,093,224 A | 7/2000 | Jones |
| 6,102,032 A | 8/2000 | Sebby et al. |
| 6,203,586 B1 | 3/2001 | Davis |
| 6,210,453 B1 | 4/2001 | Noronha |
| 6,379,405 B1 | 4/2002 | Reiger et al. |
| 6,458,177 B1 | 10/2002 | Cox |
| 6,508,849 B1 | 1/2003 | Comas |
| 6,716,259 B2 | 4/2004 | Peterson et al. |
| 6,719,816 B2 | 4/2004 | Barford |
| 8,123,824 B2 | 2/2012 | Cavero, Jr. et al. |
| 8,216,322 B2 | 7/2012 | Schweickhardt |
| 8,425,634 B2 | 4/2013 | Parker |
| 8,597,381 B2 | 12/2013 | Paapsi |
| 8,647,399 B2 | 2/2014 | Reddy et al. |
| 8,663,347 B2 | 3/2014 | Lush |
| 2002/0117071 A1 | 8/2002 | Kaliszewski |
| 2005/0016062 A1 * | 1/2005 | Bonnell-Rickard .... C10L 5/365 44/535 |
| 2006/0130395 A1 | 6/2006 | Roth |
| 2006/0156621 A1 | 7/2006 | Kraus et al. |
| 2007/0044376 A1 | 3/2007 | Monin |
| 2008/0083159 A1 | 4/2008 | Doepker et al. |
| 2008/0196301 A1 | 8/2008 | de Oliveira et al. |
| 2008/0196302 A1 | 8/2008 | Cavero et al. |
| 2009/0151239 A1 | 6/2009 | Gomez |
| 2011/0192078 A1 | 8/2011 | Malone |
| 2011/0214342 A1 | 9/2011 | Burgi |
| 2014/0283440 A1 | 9/2014 | Beadles |
| 2015/0020442 A1 | 1/2015 | Gomez |
| 2015/0191669 A1 * | 7/2015 | Preciat Cervera ...... C10L 11/06 431/6 |

* cited by examiner

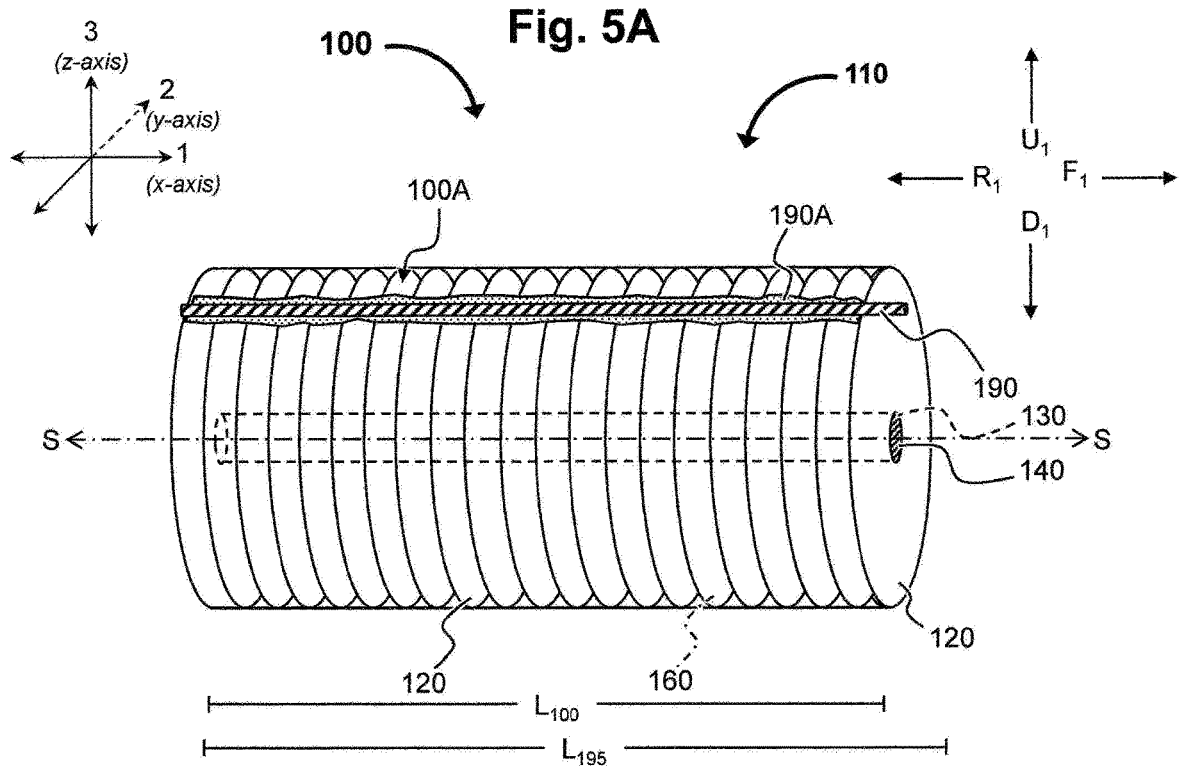
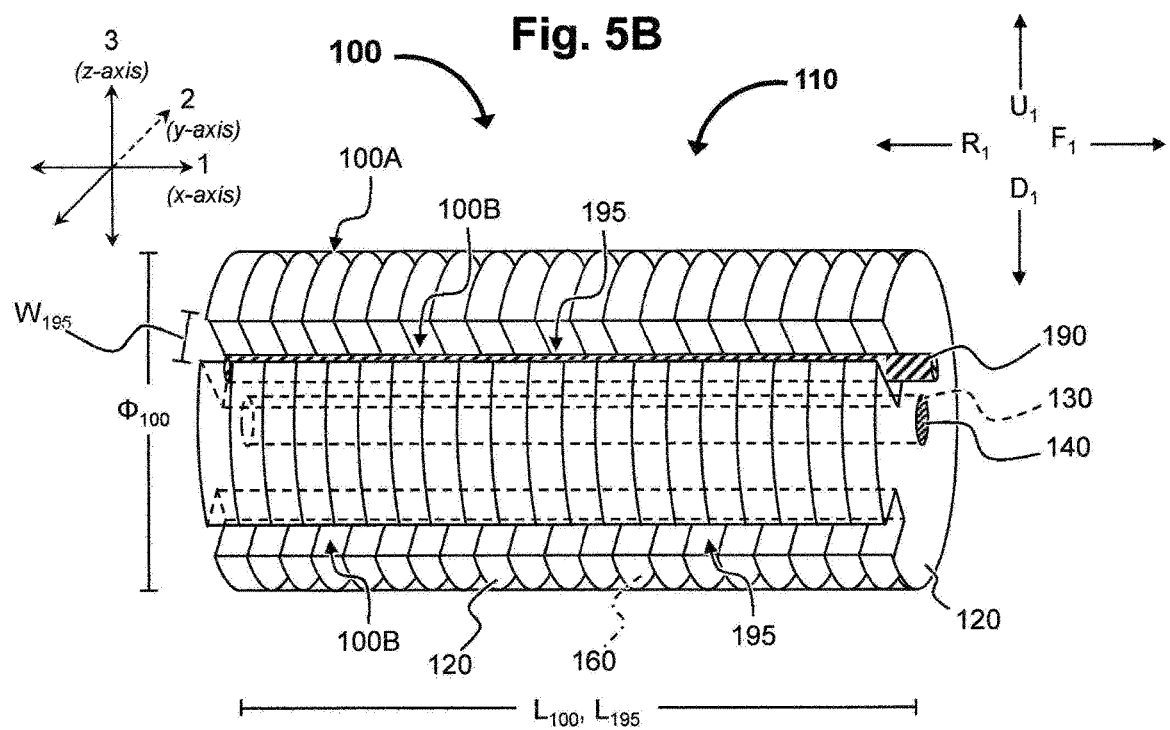

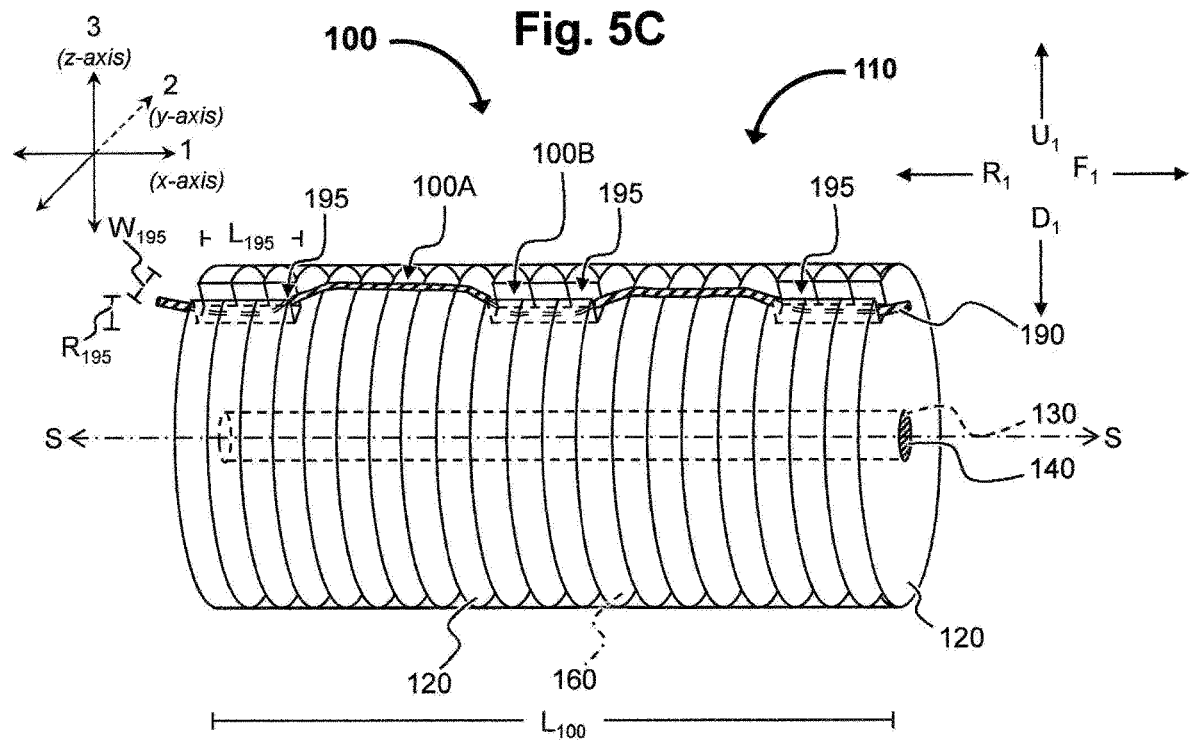
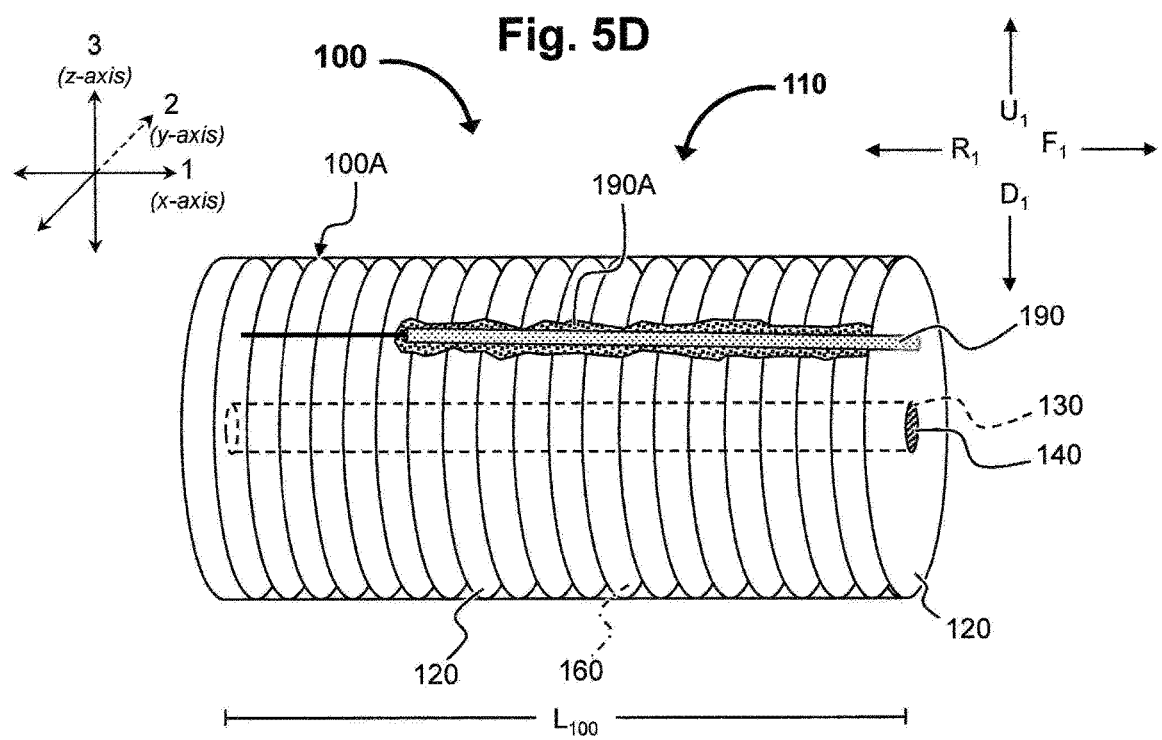

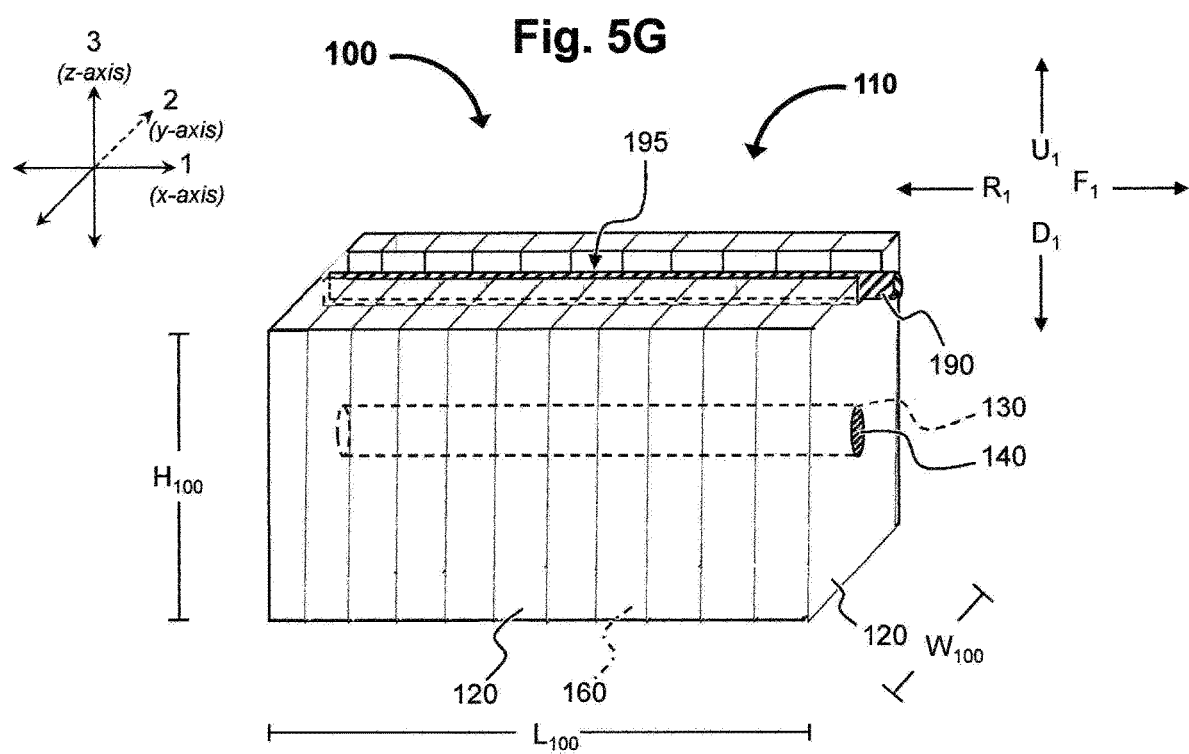

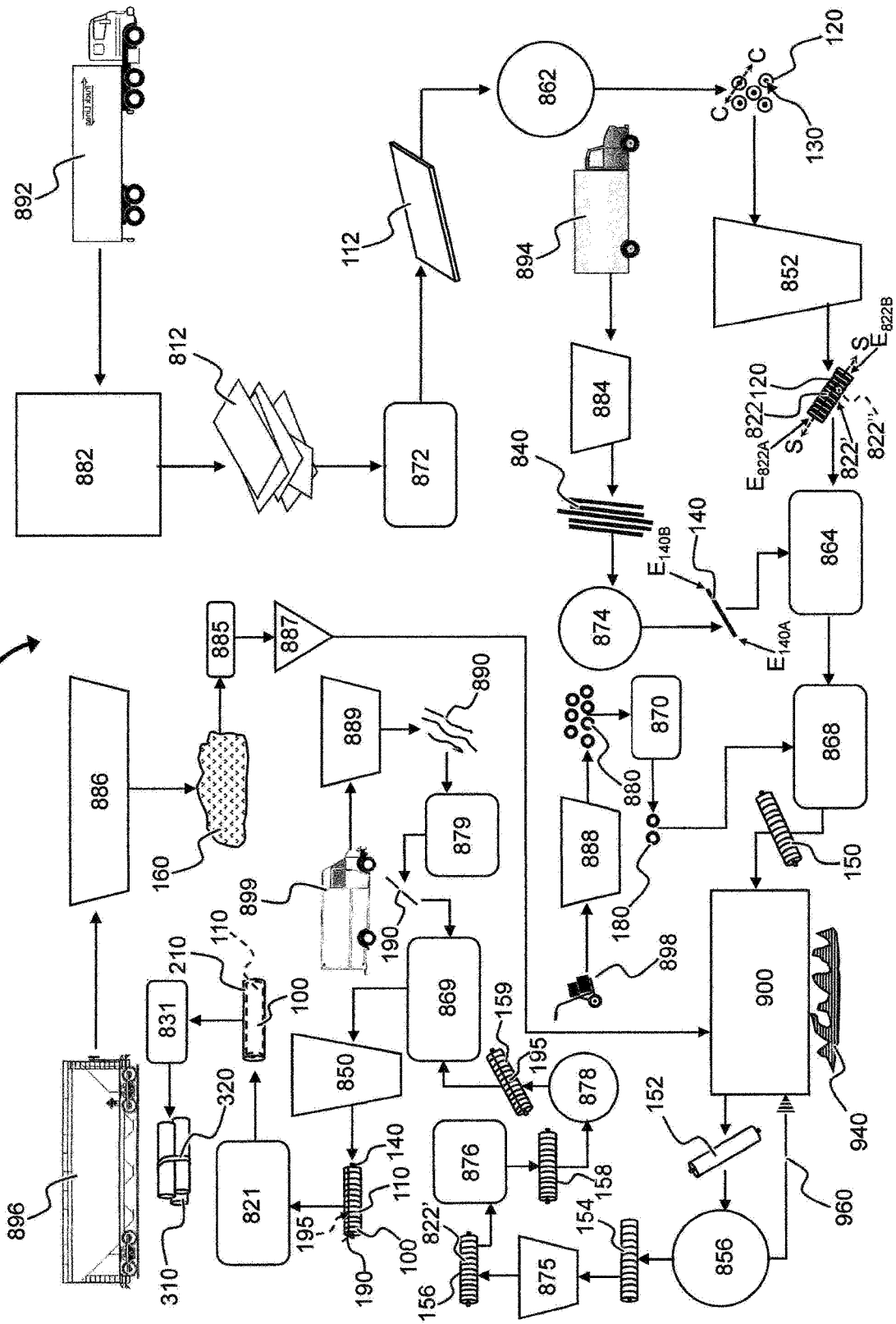

878

878

INCENDIARY DEVICE

CROSS-REFERENCE TO RELATED APPLICATION

This application claims the benefit of, and claims priority to, U.S. Provisional Application No. 62/787,256 filed Dec. 31, 2018 entitled "Incendiary Means, Devices and Methods Thereof", which is incorporated herein by reference in its entirety.

FIELD OF INVENTION

The present invention relates generally to the field of incineration. More particularly, the present invention relates to improved devices for igniting and/or sustaining fires.

BACKGROUND

People claim to find joy in many superficial items (e.g., labor, cultural status, politics, shopping, appearance, eating/drinking, exercising, binge-watching, social networking, gossiping, etc.), but inexplicably often struggle at being truly happy in life. Ironically, according to research conducted herein, it has been discovered that when most people were asked what they believed provides a true sense of happiness (particularly those nearing the end of their lifespan), the overwhelming answer defaulted to the times spent directly interacting with family and/or friends. Through further researching this apparent anomaly between, on the one hand, what people believe will result in true happiness in life and, on the other hand, the actions people actually take in pursuit of such happiness, it was revealed that the time and effort required to gather family and friends for direct interactions is largely viewed as a hurdle, and therefore is often not pursued, favoring instead the more superficial items (noted above) which tend to result in instant gratification, even with having full knowledge that the happiness effects of such actions will only be relatively short-term at best. As a result, it has been observed herein that the likelihood of obtaining true happiness in life continues to decrease over time, exemplified by broken families, increasing divorce rates and infidelities, secret dating web sites, increasing violence, increasing suicide rates, increasing drug abuse, psychotherapist shortages, increasing burglaries and other crime rates, and the like.

As a further part of the research conducted herein, an example of camping was proposed as a potential means for gathering family and friends in order to engage in the type of direct interactions which result in the true happiness in life that seemingly most humans desire, preferably without the distractions of such superficial items as enumerated above. Interestingly, with respect to campsites, most participants in the study believed that camping with family and friends would indeed be a desirable option that could lead to the happiness in life that people wish to attain. When questioned further as to what particular aspects of camping could provide the biggest impact in pursuit of the happiness goal, the overwhelming response typically included sitting around a campfire and/or bonfire together (or similar responses).

Somewhat unexpectedly, when the participants of the study were subsequently questioned as to what might prevent them from simply arranging and enjoying campfires or bonfires more often at the present time (or in some cases, at all), regardless of whether or not associated with camping, most indicated that building a sustainable campfire or bonfire took too much work and consumed too much time to make it worthwhile. For example, it was revealed that most people inherently wanted to participate in more campfires and/or bonfires, but most cited having too many bad experiences in the past (e.g., difficulties finding appropriate dried materials as fuel, difficulties lighting the fire initially, repeatedly needing to re-light the fire when it is extinguished (often within just a few minutes), difficulty sustaining the fire once it is finally ignited, sustaining physical injuries (back injuries, cuts, bruises, snake or insect bites, etc.), emotional humiliation during the process, etc.) that by the time the campfire or bonfire was finally burning to their satisfaction, most of their family or friends had lost interest and/or that the participants of the study simply were not able to enjoy the campfire or bonfire thereafter.

Furthermore, it was revealed that some participants took the additional step of purchasing a commercial simulated fire-burning log (i.e., a simulated log typically formed via compression of sawdust which has been mixed with a binding agent) in an attempt to alleviate at least some of the problems noted above. However, most participants further indicated that such commercial simulated fire-burning logs did not ignite well enough and/or were not a suitable substitute for a campfire or bonfire utilizing natural wood logs. Feedback included that the simulated logs were too expensive; the simulated logs did not look like natural logs; the simulated logs did not work well when mixed with natural wood blocks (particularly green wood); the simulated logs did not completely burn (i.e., did not sustain the campfire); the simulated logs did not provide the feeling of a campfire but rather appeared to look "out-of-place" or looked more like a novelty item; the simulated logs burned for several hours which was much longer than the interest or attention-span of their audience (which was discovered to range from about 30 minutes to about 90 minutes, more preferably about 45 minutes to about 60 minutes); and the like.

The enlightening feedback from this study led to a deeper analysis into not only campfires and bonfires as a relatively narrow topic, but also the relatively broader topic of starting and/or maintaining fires in general. More particularly, further studies were conducted herein to discover the various problems (both actual and perceived) associated with starting fires, as well as maintaining such fires, even with green or wet wood, and the positive impact that overcoming such problems could potentially have for improving the quality of people's livelihood.

Accordingly, there is a need for a device that can start fires, such as campfires and/or bonfires, which include the presence of natural wood blocks, for example. There is a further need for a device that can sustain the burning of natural wood blocks. There is still a further need for a device that can start and/or maintain the burning of green (i.e., non-dried or semi-dried) or wet (i.e., via water content) wood. There is yet a further need for a device that can be formed into various embodiments, and can entertainingly burn with or without the addition of external sources (e.g., wood). There is still a further need for a device that can burn for a desired time period (e.g., 30 minutes-90 minutes).

In addition to the studies referenced above, further studies were conducted herein to discover the various problems (both real and perceived) associated with starting and sustaining fires. Further studies were also performed herein which included, but were not limited to, variations of one exemplary preferred embodiment (i.e., a firestarter log, such as described below), as well as additional uses well beyond starting a campfire or bonfire. In addition, still further studies were also performed herein which included, but were not limited to, observing the resulting impact that various embodiments of the inventive device of the present disclosure could have for improving the quality of people's lives (e.g., true personal happiness, time spent interacting directly with family and/or friends, reducing injuries, etc.). Moreover, still further studies were also performed herein which included, but were not limited to, observing the resulting impact that various embodiments of the inventive device of the present disclosure could have for improving the environment (e.g., reducing landfill waste, burning brush (even when green) without need for additional harmful fuels (such as lighter fluid, kerosene, gasoline, and the like), etc.). Thus, there is a need for a device that can improve the quality of people's lives. There is also a need for such a device that can improve the environment.

SUMMARY

Among the studies performed herein, a plurality of campfires and bonfires were observed, along with the materials and methods utilized for such fires. Such observations included, but were not limited to, the materials used to build each fire, how the materials were obtained and/or gathered, the arrangement of the materials prior to attempting ignition, the methods used for igniting each fire, the types and amounts of any additives/fuels additionally utilized (e.g., paper, lighter fluid, currently available firestarters, etc.), the degrees of success for each attempted ignition, the quality of each fire over given periods of time, the degrees of success for sustaining a desirable burn quality for each fire, the methods and materials used for maintaining a desirable burn, the length of time that each fire burned, the degree of satisfaction expressed by participants in the study, and the like. Indeed, the results of such observations, particularly the disturbingly high rates of failure and excessive struggles that were observed with existing methods and currently available firestarters, provided a baseline which inspired the inventor herein to conceive and develop some of the unique inventive embodiments of the present disclosure. For example, some embodiments of the present invention include, inter alia, incendiary devices, and methods thereof, such as the example inventive firestarter log embodiment described briefly as follows. (Other inventive firestarter log embodiments, including devices, and methods relating thereto, as well as numerous other embodiments and aspects of the inventive devices and methods of the present disclosure, are described further below, such as in the Detailed Description.)

Accordingly, one object of the invention of the present disclosure is to provide an incendiary device which may be used for igniting wood (whether dry, green or wet) and other types of relatively slow burning solid fuels directly and without the necessity of employing supplementary tinder and kindling materials, such as lighter fluid, paper, kindling wood, and the like.

Another object is to provide an incendiary device which can be relatively small in size (with respect to a human body) and which can be ignited relatively quickly (e.g., in less than 1 minute, such as within about 10 seconds or less) to produce a large amount of heat over an extended period of time (e.g., from about 30 minutes to about 90 minutes, such as about 45 minutes to about 60 minutes).

Still another object is to provide an effective incendiary device which will impart an additional benefit to a fire (e.g., variegated color effects) to the fire, and which may optionally persist over an extended period of time (e.g., about 5 minutes to about 45 minutes).

Another object is to provide an incendiary device which can be safely handled, stored and/or shipped.

Yet another object is to provide an incendiary device from which a user can derive pleasure.

Still another object is to provide an incendiary device that can improve the environment (e.g., by utilizing recycled materials, reducing landfill loading, etc.).

Yet another object is to provide an incendiary device satisfying the conditions described above which, inter alia, will be economical to produce, pleasing in appearance, and/or convenient to use.

Still another object is to provide methods for producing an incendiary device meeting any of the above objects.

Yet another object is to provide methods for igniting and/or sustaining a fire.

In some aspects, a device for incinerating comprises at least one corrugated component, a support component, a waxy component and an ignition component.

In some aspects, an incendiary device comprises a plurality of corrugated components, a support component, a waxy component and an ignition component, wherein the plurality of corrugated components is arranged in a stacked configuration to form a corrugated component stack, wherein the support component is in contact with at least a portion of the corrugated component stack, wherein the corrugated component stack is substantially saturated with the waxy component, and wherein the ignition component is in contact with at least a portion of the corrugated component stack. In further aspects, the device can be in the form of a firestarter log. In yet further aspects, the device can comprise a groove. In still further aspects, the ignition component can be at least partially disposed within the groove.

In some aspects, a method for producing a firestarter log comprises: providing corrugated materials, waxy materials; a support component and an ignition component; preparing a plurality of corrugated components from the corrugated materials, wherein the corrugated components each further comprise a hole disposed therethrough; arranging the plurality of corrugated components into a stacked configuration such that the holes are substantially aligned to form a corrugated component stack comprising air passageways; disposing the support component through the holes of the corrugated component stack such that the distal ends of the support component extend externally to the distal ends of the corrugated component stack to form a precursor incendiary log; disposing the waxy materials into a suitable container and heating the waxy materials to form a molten waxy component; heating the molten waxy component to a desired temperature (or alternatively to a desired viscosity) to form heated molten waxy component; disposing the precursor incendiary log into the heated molten waxy component until substantial saturation is attained to form a saturated incendiary log; attaching the saturated incendiary log to a spinning apparatus and spinning the saturated incendiary log to remove excess molten waxy component sufficient to substantially clear the air passageways to form a spun incendiary log; longitudinally compressing the corrugated component stack of the spun incendiary log such that each corrugated component is in planar contact with an adjacent corrugated component to form a compressed incendiary log; cooling the compressed incendiary log to a temperature wherein the waxy material has substantially solidified to form a cooled incendiary log; and disposing the ignition component onto the cooled compressed incendiary log to form the inventive firestarter log.

In some aspects, an incendiary device comprises a plurality of corrugated components and a waxy component, wherein each corrugated component comprises corrugated material comprising a first wall layer having a first planar surface, a second wall layer having a second planar surface distal to the first wall layer, and a fluting layer disposed therebetween to provide a plurality of air passageways through the corrugated component; wherein the corrugated components are substantially saturated with the waxy component; and wherein the corrugated components are disposed in an adjacent configuration such that the first planar surface of a corrugated component is in substantial contact with the second planar surface of an adjacent corrugated component.

In some aspects, the incendiary device is in the form of a firestarter log.

In some aspects, the incendiary device further comprises a support component in contact with at least one of the plurality of corrugated components. In other aspects, the the adjacent configuration of the plurality of corrugated components is configured as a stacked configuration to form a corrugated component stack having a longitudinal length, a width, a height, a first end and a second end. In still other aspects, the plurality of corrugated components each further comprise an aperture disposed such that the aperture of each corrugated component is substantially contiguously aligned throughout the longitudinal length of the corrugated component stack. In yet other aspects, the support component is disposed within the apertures throughout the longitudinal length of the corrugated component stack. In still other aspects, the support component extends beyond the first end and the second end of the corrugated component stack. In yet other aspects, the incendiary device further comprises a fastener component disposed about the support component, wherein the fastener component is in substantial contact with the first end of the corrugated component stack. In some aspects, the support component is a wood doweling.

In some aspects, incendiary device further comprises an ignition component extending at least partially along the longitudinal length of the corrugated component stack. In other aspects, the incendiary device further comprises a groove extending at least partially along the longitudinal length of the corrugated component stack. In yet other aspects, the incendiary device further comprises an ignition component extending at least partially along the longitudinal length of the corrugated component stack, wherein at least a portion of the ignition component is disposed within at least a portion of the groove.

In some aspects, a method for making an incendiary device comprises:

a. providing corrugated materials, waxy materials and a support component having a longitudinal length and distal ends;

b. preparing a plurality of corrugated components from the corrugated materials, wherein each corrugated component comprises a first wall layer having a first planar surface, a second wall layer having a second planar surface distal to the first wall layer, and a fluting layer disposed therebetween to provide a plurality of air passageways through the corrugated component;

c. disposing a hole in each corrugated component, wherein the hole passes through the first wall layer, the fluting layer and the second wall layer, and wherein the hole is located in substantially the same location for each corrugated component;

d. arranging the plurality of corrugated components into a stacked configuration such that the holes are substantially aligned to form a corrugated component stack having a longitudinal length and distal ends;

e. disposing the support component through the holes of the corrugated component stack such that the distal ends of the support component extend externally from the distal ends of the corrugated component stack to form a precursor incendiary log;

f. disposing the waxy materials into a suitable container and heating the waxy materials to form a molten waxy component;

g. disposing the precursor incendiary log into the molten waxy component until saturation is attained to form a saturated incendiary log;

h. spinning the saturated incendiary log to remove excess molten waxy component sufficient to substantially clear the air passageways to form a spun incendiary log;

i. longitudinally compressing the corrugated component stack of the spun incendiary log such that each corrugated component is in planar contact with an adjacent corrugated component to form a compressed incendiary log; and j. cooling the compressed incendiary log to a temperature wherein the waxy material substantially solidifies to form the incendiary device.

In other aspects of the method, the molten waxy material is heated to a viscosity of about 1 centipoise.

In some aspects, the method further comprises providing an ignition component, and attaching the ignition component to the incendiary device. In other aspects, the method further comprises disposing a groove into the incendiary device. In still other aspects, the method further comprises providing an ignition component, and disposing the ignition component at least partially into the groove. In yet other aspects, the method further comprises providing fastener components, and disposing the fastener components onto the distal ends of the support component such that the fastener components are in substantial contact with the distal ends of the corrugated component stack of the precursor incendiary log. In still other aspects, the method further comprises applying a packaging component to the incendiary device.

In some aspects, a method for incinerating comprises:

a. providing an incendiary device, wherein the incendiary device comprises a plurality of corrugated components in a stacked configuration to form a corrugated component stack having a longitudinal length and distal ends, a support component disposed through the longitudinal length of the corrugated component stack, and an ignition component in contact with the corrugated component stack, and wherein the corrugated component stack is substantially saturated with a waxy component;

b. placing the incendiary device onto a suitable surface; and c. igniting the incendiary device by contacting the ignition component with a flame.

In other aspects of the method, the ignition component is disposed along substantially the entire longitudinal length of the incendiary device. In yet other aspects, the method further comprises placing at least one block of wood onto the incendiary device.

Such exemplary objects of the invention of the present disclosure, along with the various embodiments and aspects, include, but are not limited to, the items described herein. Consequently, it is to be understood that the disclosed embodiments and aspects are intended merely as non-limiting examples of the invention that may be embodied in various forms. Therefore, specific structural and functional details disclosed herein are not to be interpreted as limiting, but rather as an exemplary basis for claims, and as a representative basis for teaching persons having ordinary skill in the art to variously employ the present invention in virtually any appropriately detailed structure.

Accordingly, numerous other features and advantages of the present invention will appear from the following description. In the description, reference is made to exemplary embodiments of the invention. However, such embodiments do not represent the full scope of the invention. Reference should therefore be made to the claims herein for interpreting the full scope of the invention. In the interest of brevity and conciseness, any ranges of values set forth in this specification contemplate all values within the range and are to be construed as support for claims reciting any sub-ranges having endpoints which are real number values within the specified range in question. By way of a hypothetical illustrative example, a disclosure in this specification of a range of from 1 to 5 shall be considered to support claims to any of the following ranges of real numbers (including fractions therein): 1-5; 1-4; 1-3; 1-2; 2-5; 2-4; 2-3; 3-5; 3-4; and 4-5.

FIGURES

The foregoing and other features, aspects and advantages of the present invention will become better understood with regard to the following description, appended claims and accompanying drawings, which may not be drawn to scale, where:

Figure 5E:
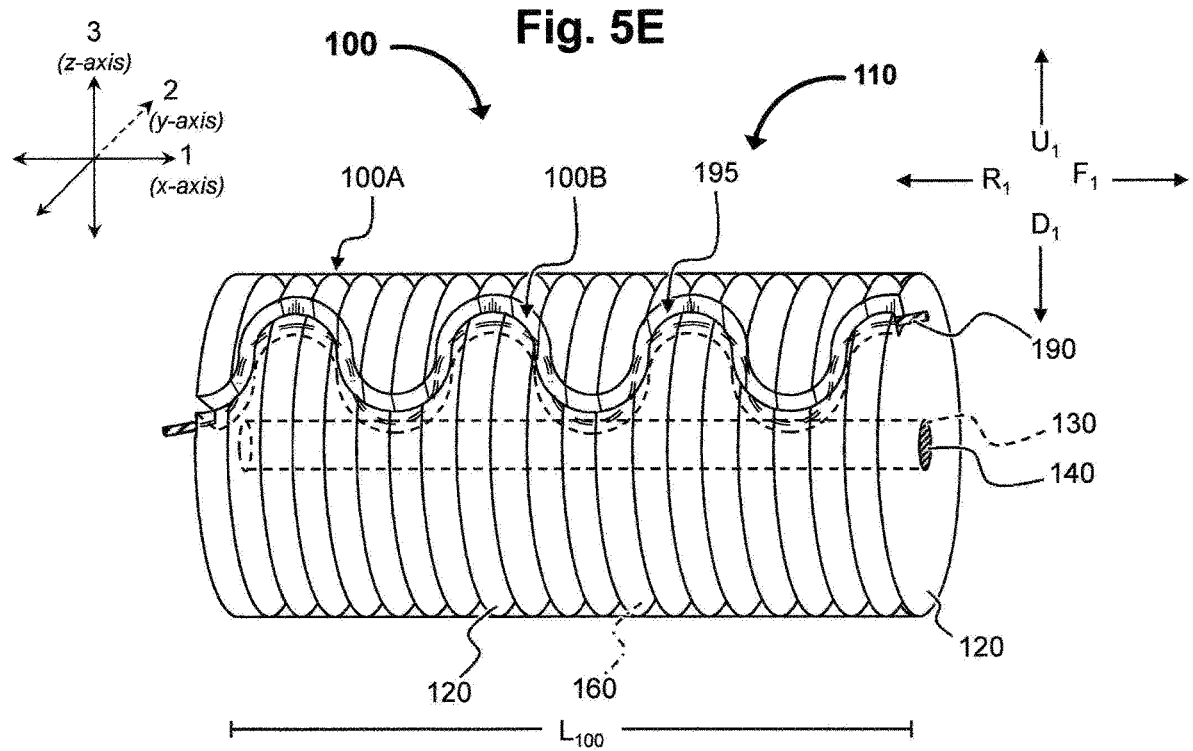
FIG. 5E is a perspective view showing an inventive incendiary device of the present disclosure comprising an ignition component in the form of a fuse disposed within an optional sinusoidal-shaped groove disposed along the length thereof.
Figure 5F:
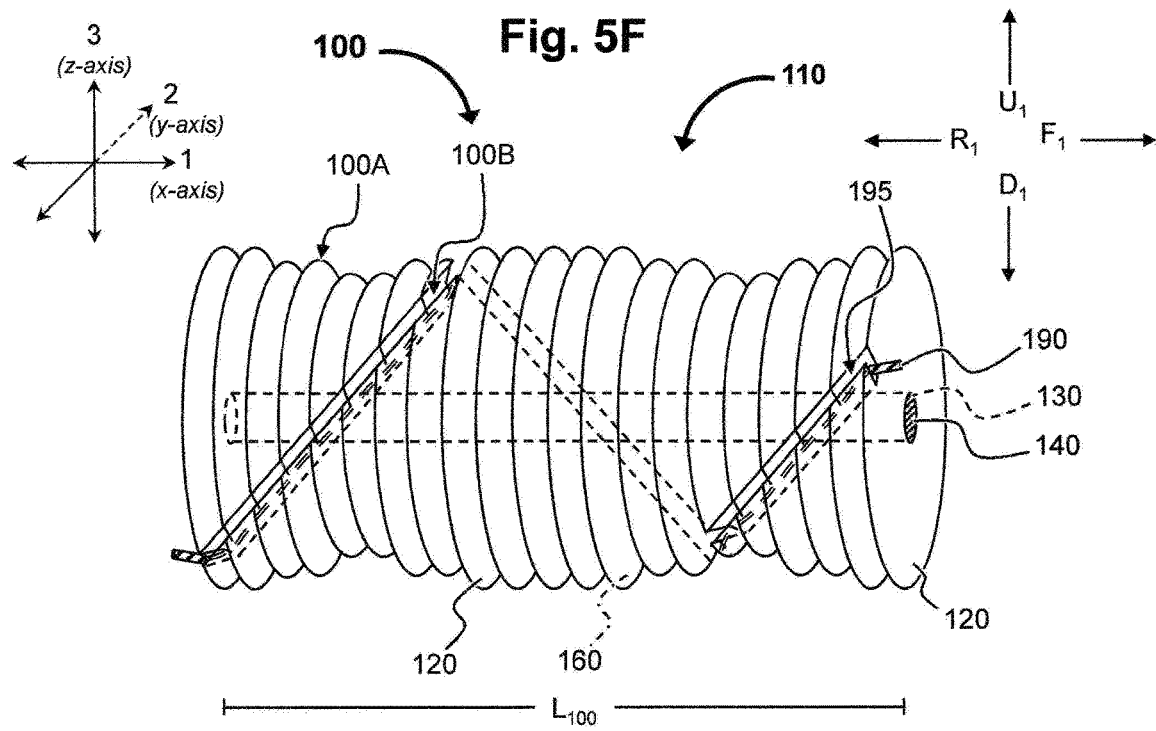
FIG. 5A is a perspective view showing an inventive incendiary device of the present disclosure comprising a generally linear ignition component disposed upon the exterior surface along the entire length thereof.
FIG. 5B is a perspective view showing an inventive incendiary device of the present disclosure comprising an ignition component and two optional generally linear grooves generally disposed along the entire length thereof, wherein the ignition component is disposed within one of the grooves.
FIG. 5C is a perspective view showing an inventive incendiary device of the present disclosure comprising an ignition component in the form of a wick and an optional plurality of generally linear grooves disposed along the length thereof, wherein the ignition component is disposed both upon the exterior surface and within the interior of the inventive incendiary device.
FIG. 5D is a perspective view showing an inventive incendiary device of the present disclosure comprising an ignition component in the form of a sparkler disposed upon the exterior surface along a partial length thereof.
Figure 6A:
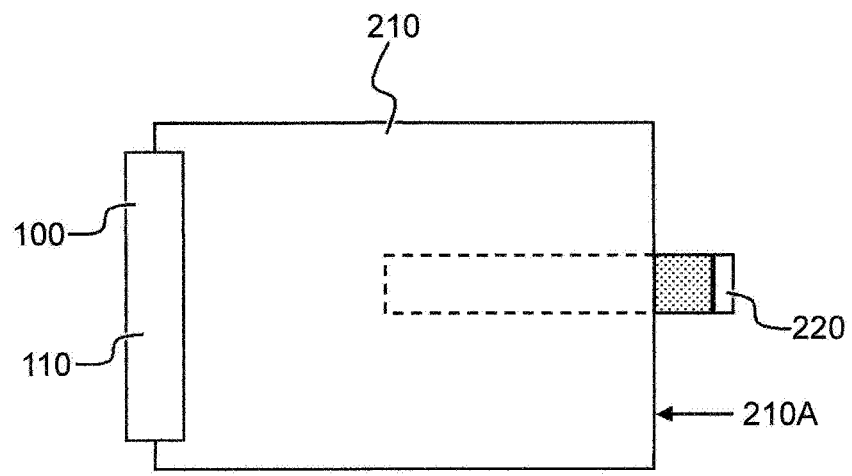
Figure 6B:
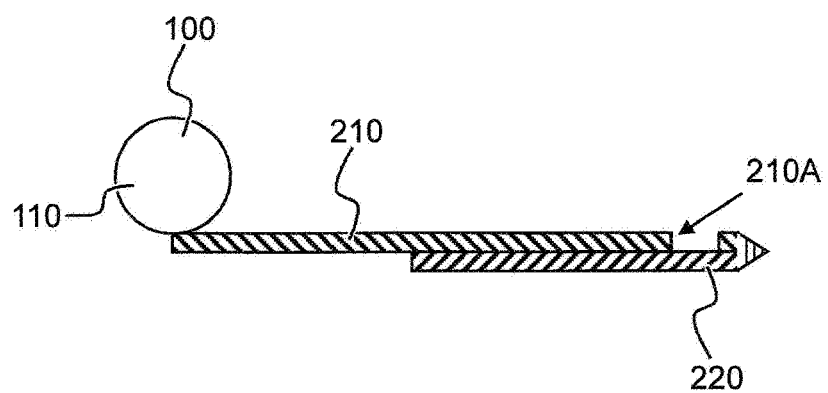
Figure 6C:
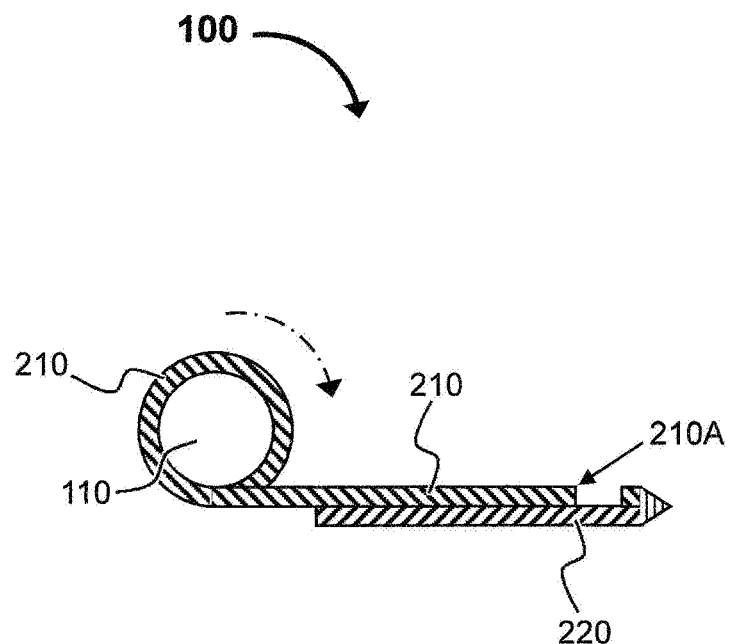
Figure 6D:
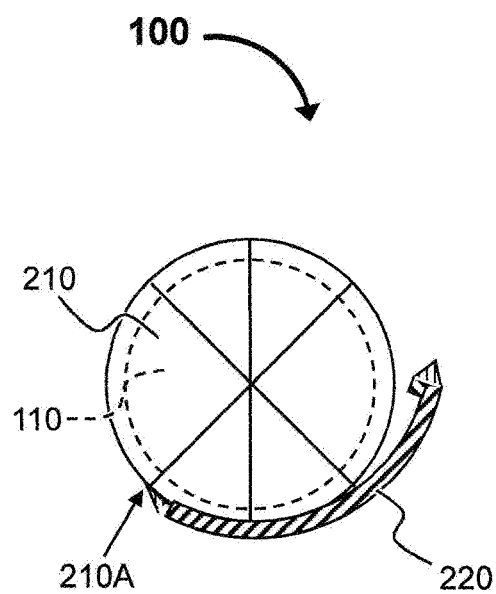
Figure 6E:
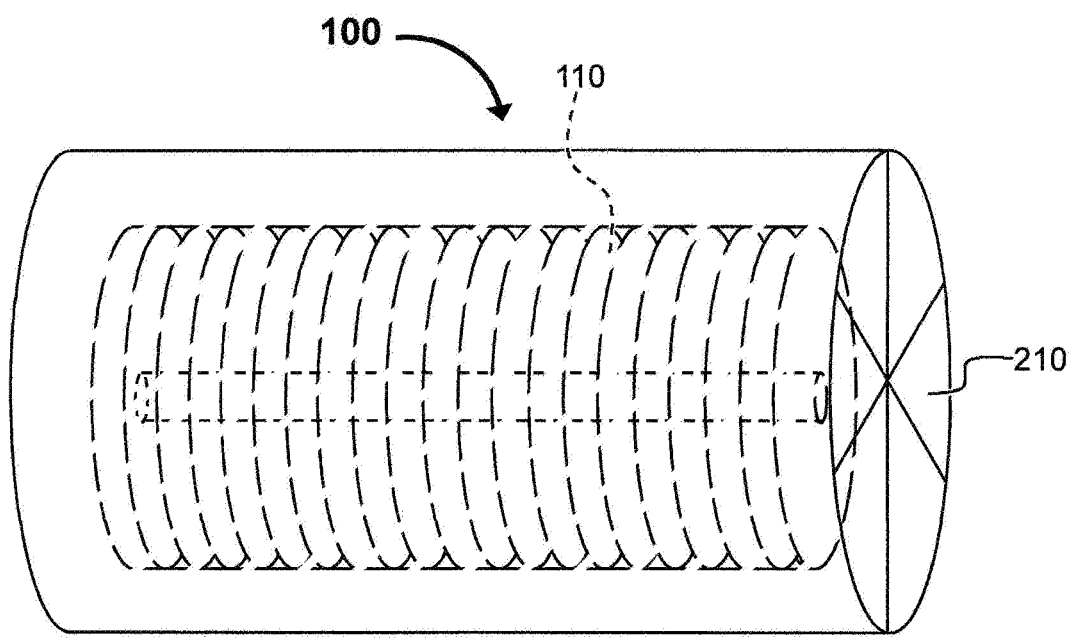
Figure 6F:
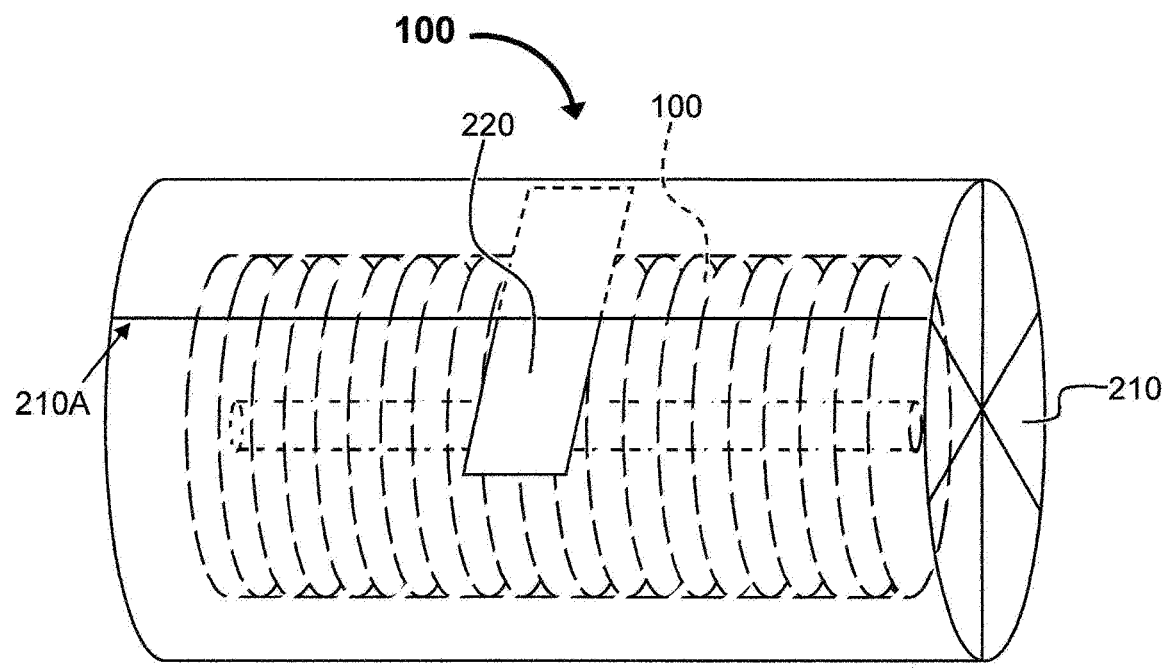
Figure 6G:
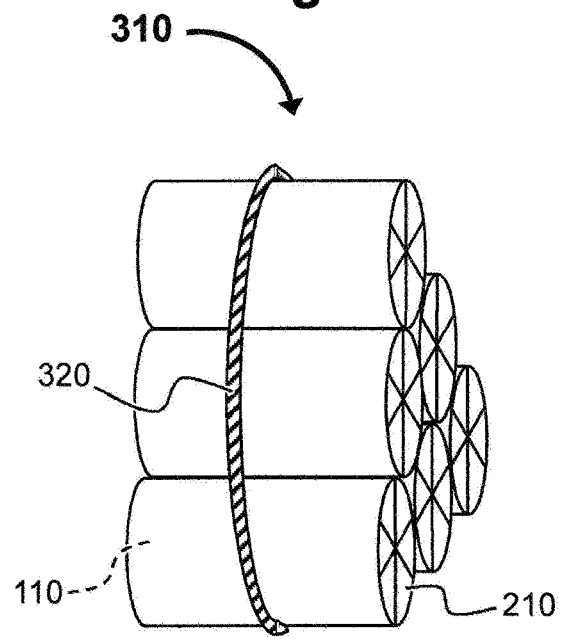
Figure 6H:
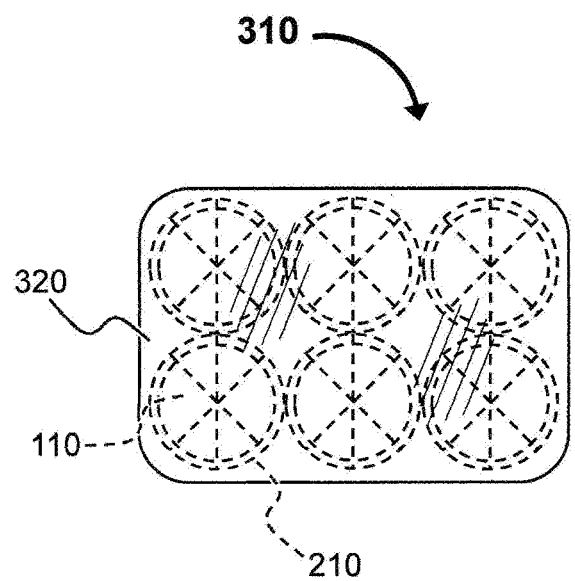
Figure 7:
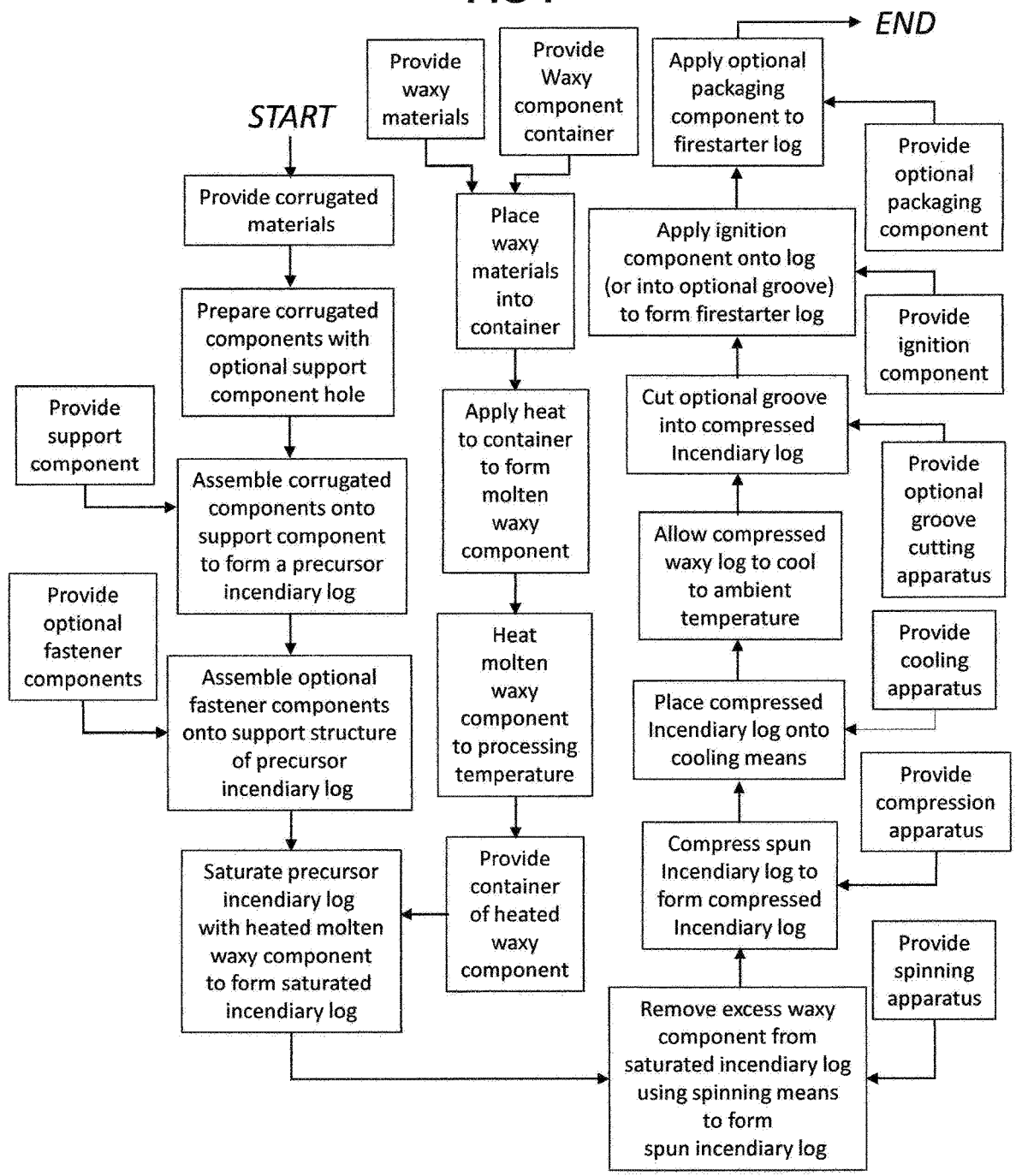
Figure 9A:
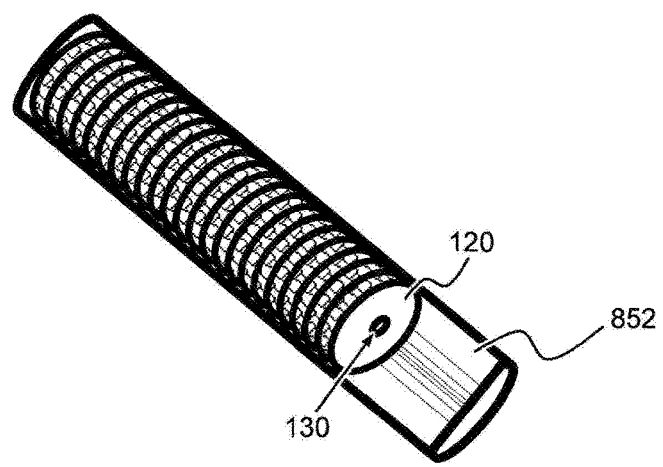
Figure 9B:
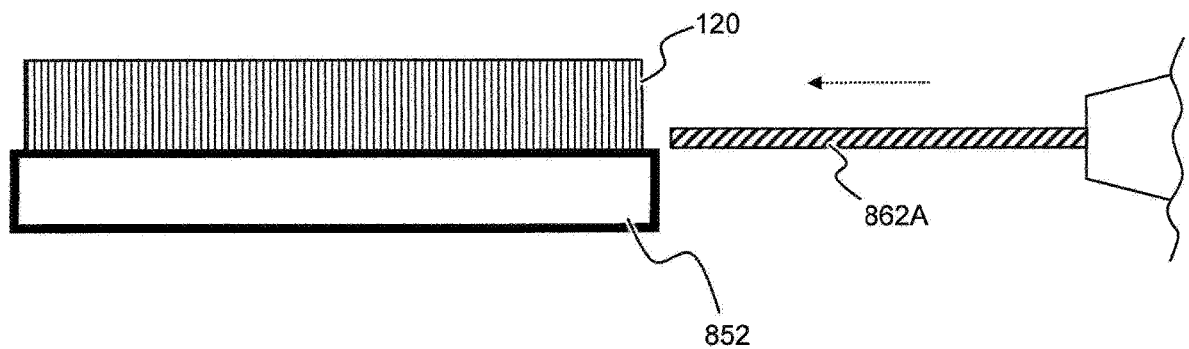
Figure 9C:
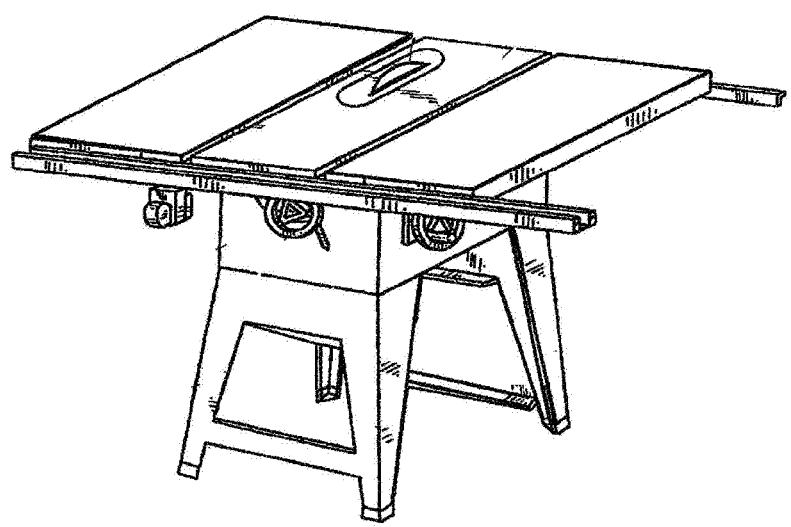
Figure 9D:
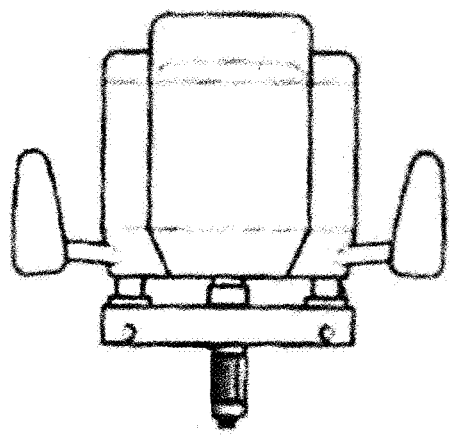
Figure 10A:
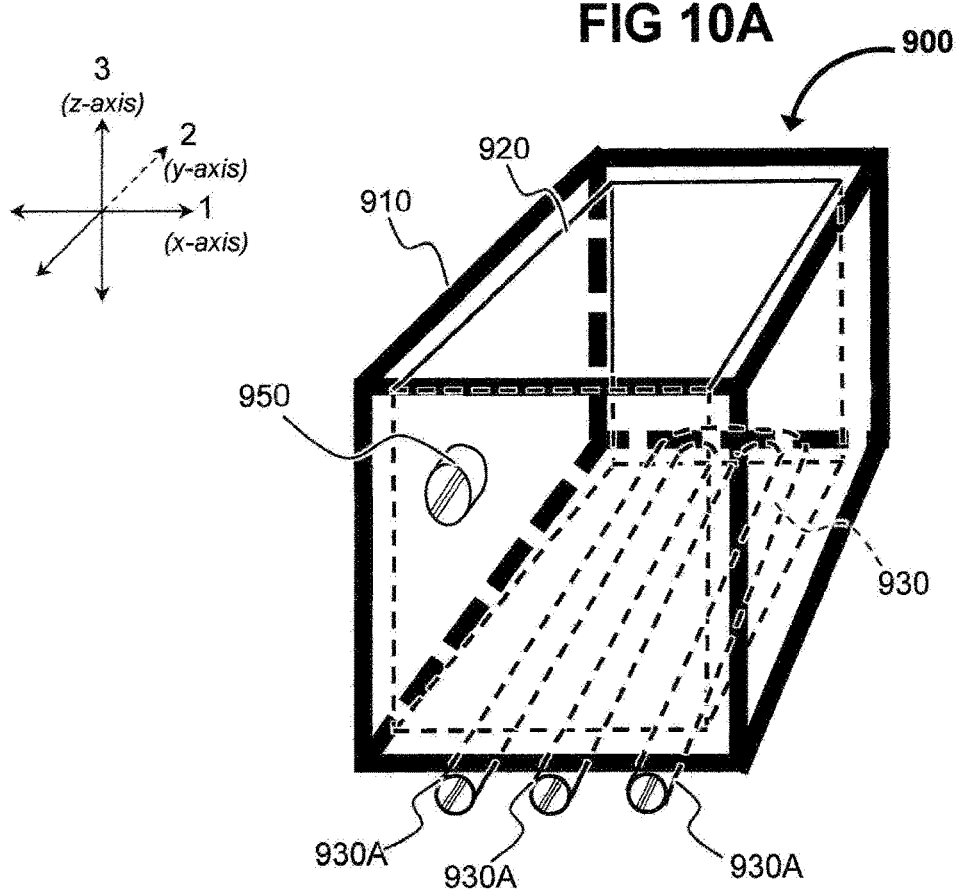

FIG. 5F is a perspective view showing an inventive incendiary device of the present disclosure comprising corrugated components of variable sizes and having an ignition component in the form of a fuse within an optional groove, wherein the groove is generally linear-shaped disposed along the length thereof in a substantially spiral configuration around the circumference of the inventive incendiary device;

FIG. 5G is a perspective view showing an inventive incendiary device of the present disclosure having a generally angular shape comprising an ignition component disposed within an optional groove which is present along the length thereof;

FIG. 6A is a top view showing an inventive incendiary device of the present disclosure including a packaging substrate in a laid-flat form having an optional release member attached thereto, wherein the inventive incendiary device is in an unwrapped form;

FIG. 6B is a side view of FIG. 6A;

FIG. 6C is a side view showing an inventive incendiary device of the present disclosure including a packaging substrate having an optional release member attached thereto, wherein the inventive incendiary device has been rotated such that it is partially wrapped in the packaging substrate;

FIG. 6D is a side view showing an inventive incendiary device of the present disclosure including a packaging substrate having an optional release member attached thereto, wherein the inventive incendiary device is in a fully wrapped form;

FIG. 6E is a perspective view showing an inventive incendiary device of the present disclosure that is disposed within a packaging substrate;

FIG. 6F is a perspective view showing an inventive incendiary device of the present disclosure that is disposed within a packaging substrate comprising an optional release member;

FIG. 6G is a perspective view showing a plurality of inventive incendiary devices of the present disclosure, each comprising a packaging substrate, forming a bundle comprising a bundling member in the form of a banding;

FIG. 6H is a side view showing a plurality of inventive incendiary devices of the present disclosure, each comprising a packaging substrate, forming a bundle disposed within a bundling member in the form of a wrapping substrate;

FIG. 7 is a flow chart showing one exemplary method for producing an inventive incendiary device of the present disclosure in the form of a firestarter log;

FIG. 8 is a flow chart showing one exemplary method for mass producing an inventive incendiary device of the present disclosure in the form of a firestarter log;

FIG. 9A is a perspective view showing an exemplary corrugated component stacking apparatus comprising a plurality of corrugate components;

FIG. 9B is a side view showing an exemplary corrugated component stacking apparatus comprising a plurality of corrugated components and an exemplary hole forming apparatus;

FIG. 9C is a perspective view showing an exemplary optional groove forming apparatus in the form of a table saw;

FIG. 9D is a perspective view showing an exemplary optional groove forming apparatus in the form of a router;

FIG. 10A is a perspective view showing an apparatus for infusing a waxy component into the incendiary devices of the present disclosure.

Figure 10B:
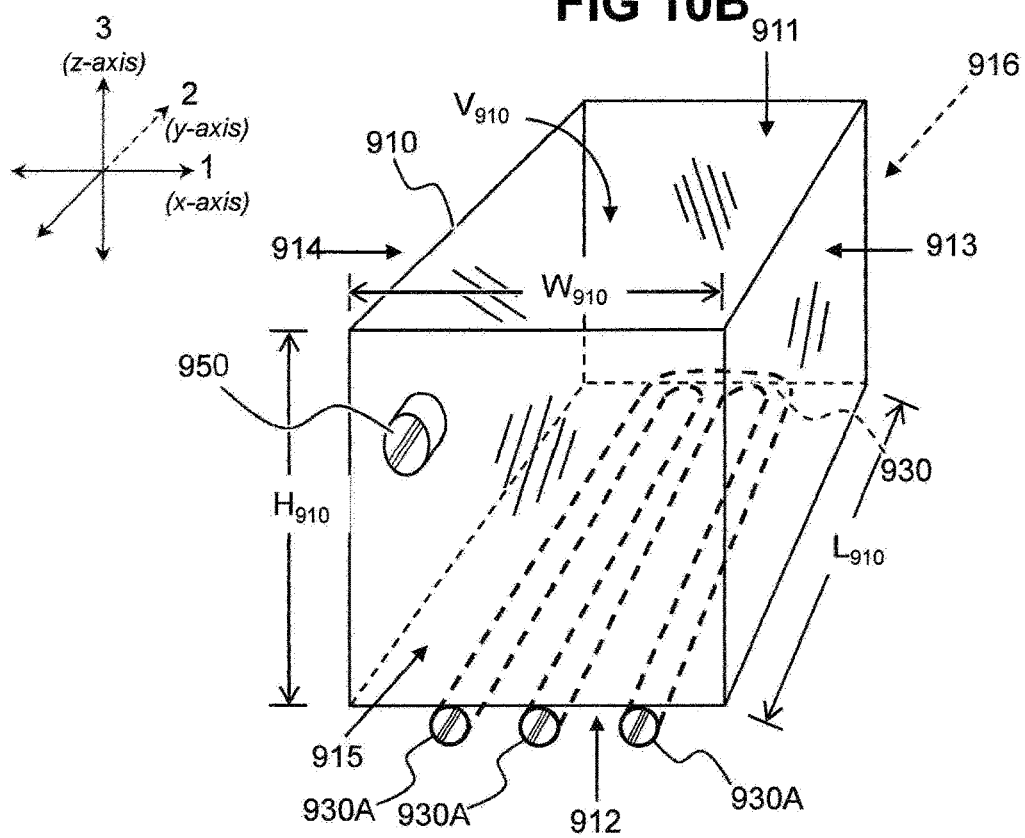
Figure 10C:
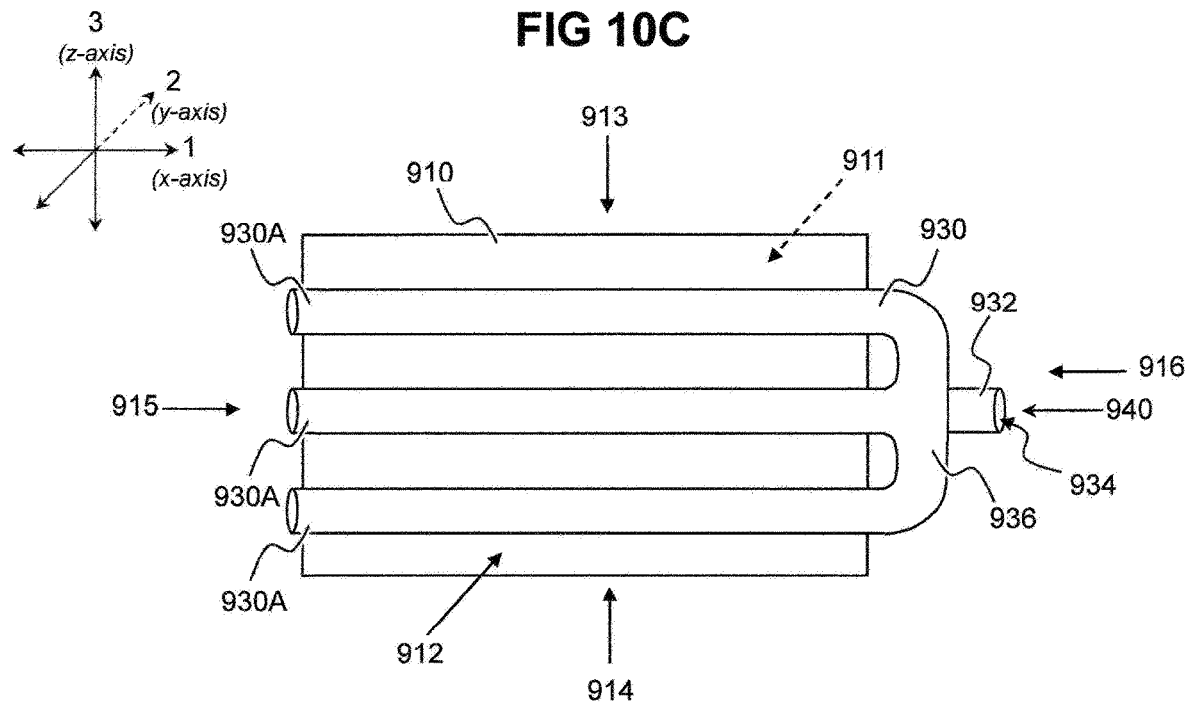
Figure 10D:
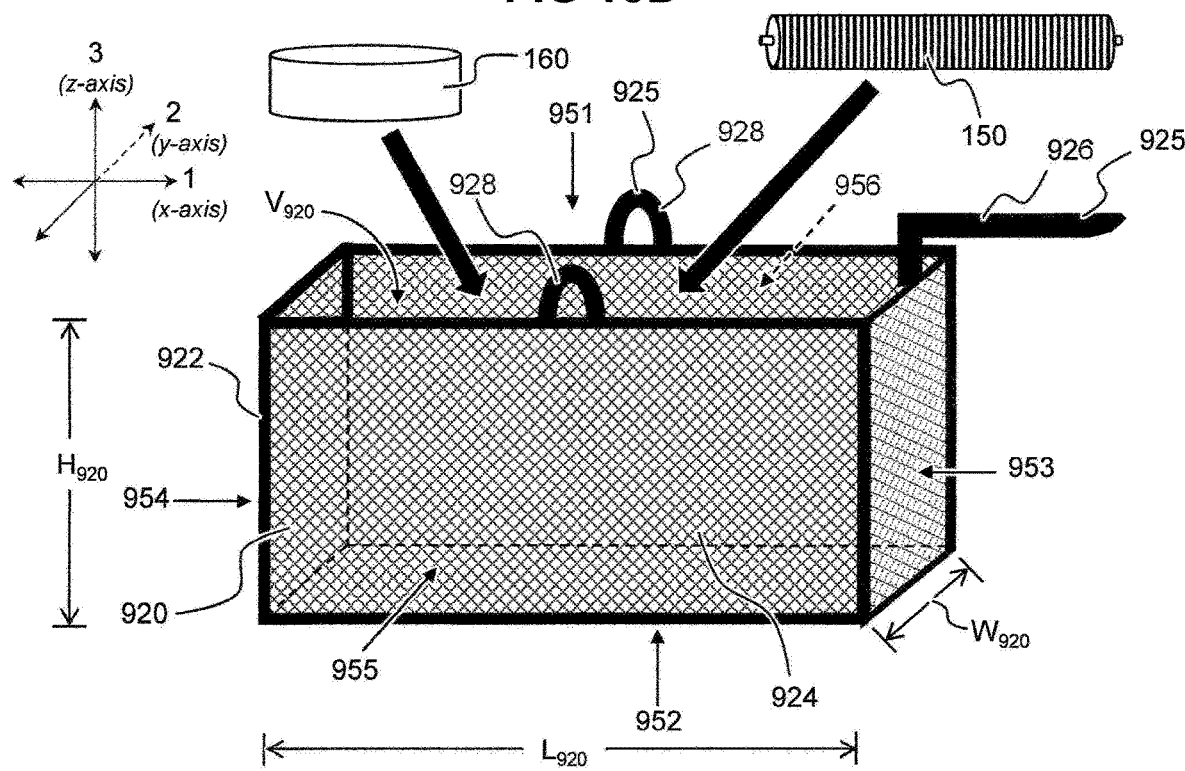
Figure 11A:
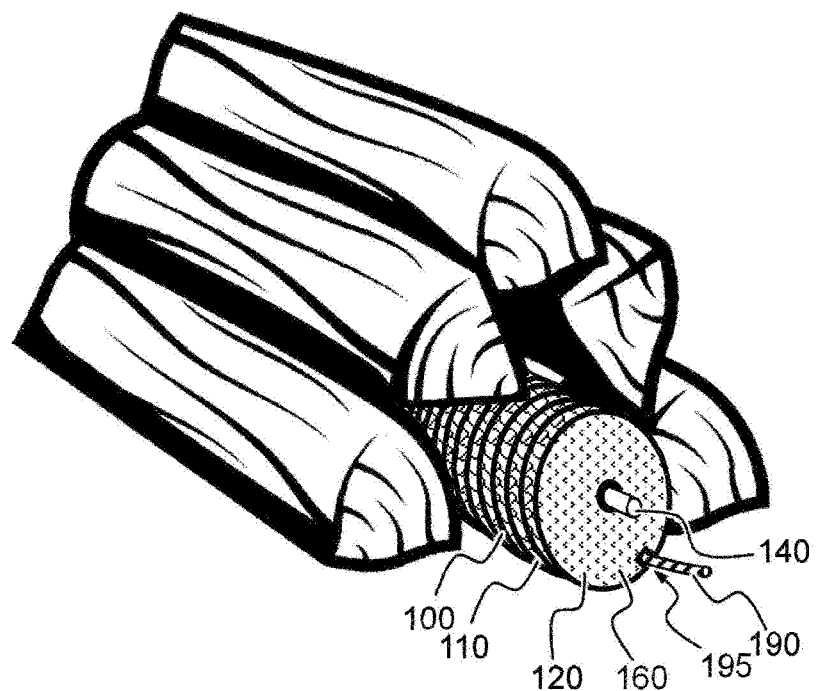
Figure 11B:
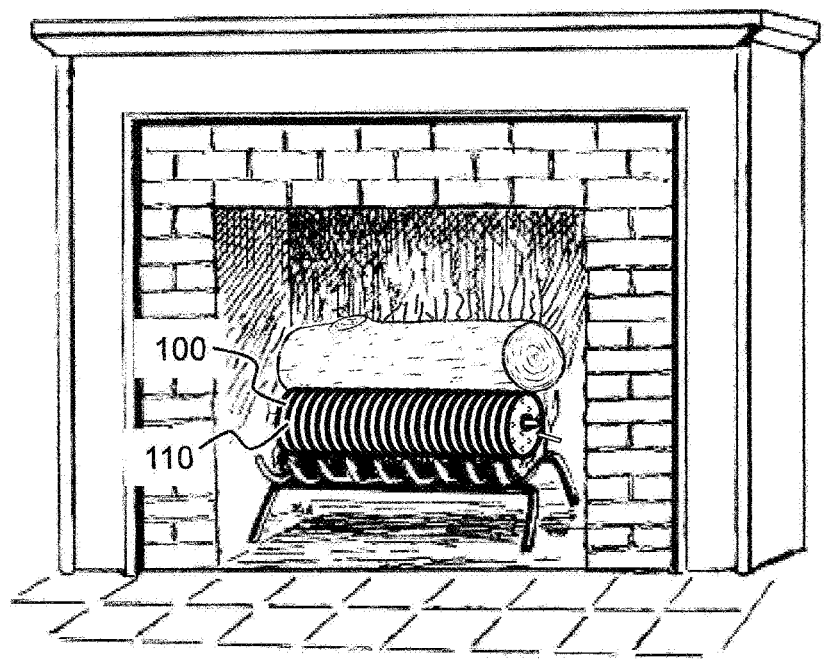
Figure 12A:
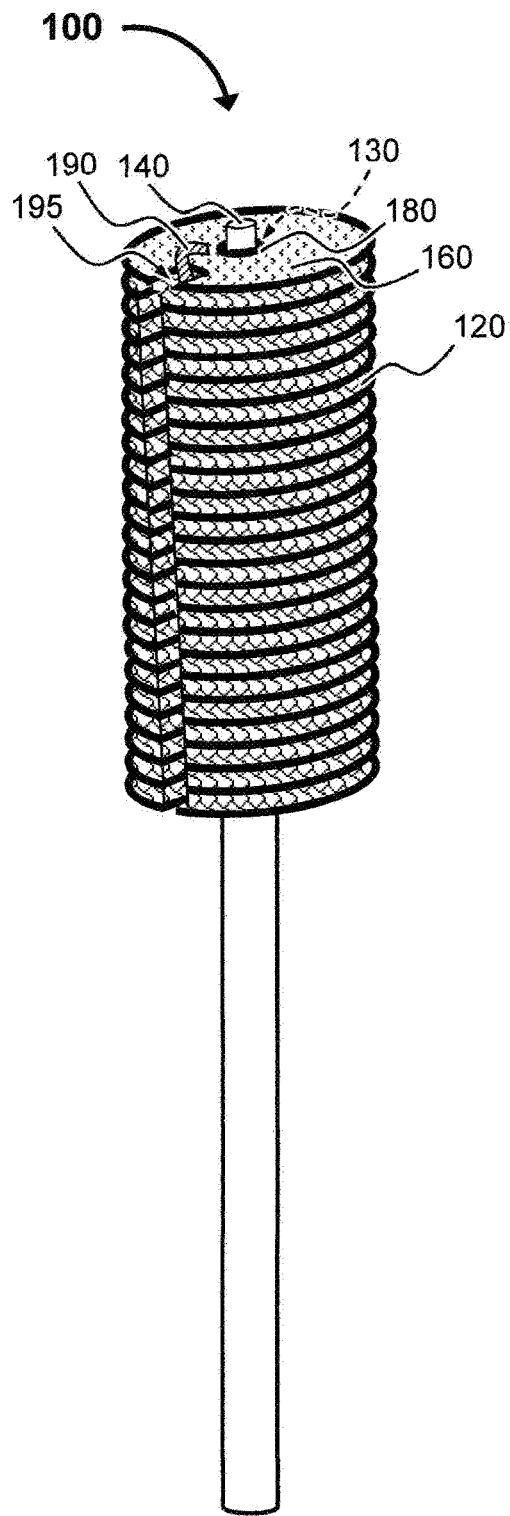
Figure 12B:
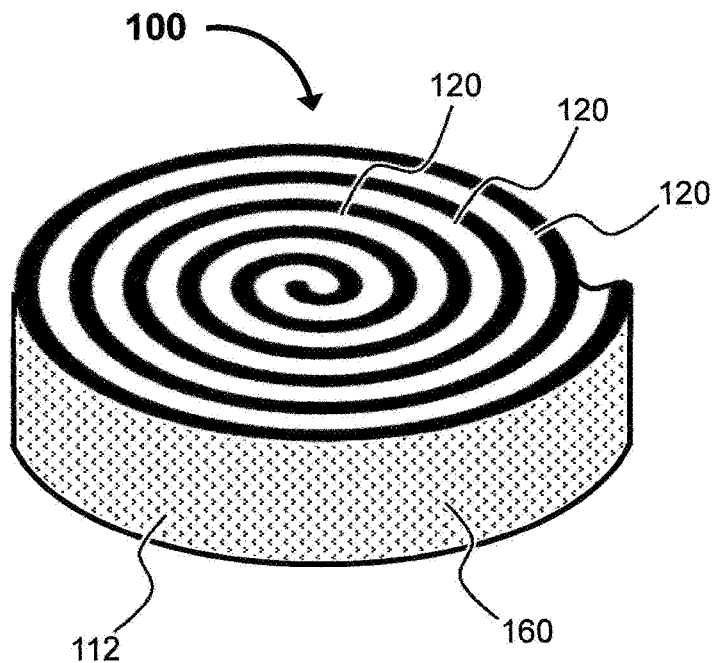
Figure 12C:
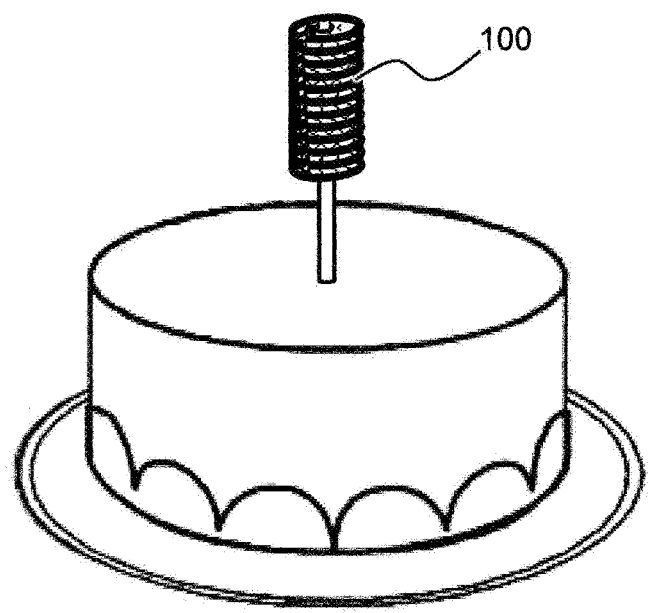

FIG. 10B is a perspective view showing a waxy component container of an apparatus for infusing a waxy component into the incendiary devices of the present disclosure;

FIG. 10C is a bottom side view showing the waxy component container of FIG. 10B;

FIG. 10D is a perspective view showing a strainer member of an apparatus for infusing a waxy component into the incendiary devices of the present disclosure;

FIG. 11A is a perspective view showing an inventive incendiary device of the present disclosure in the form of a firestarter log with wood blocks stacked thereupon;

FIG. 11B is a perspective view showing an inventive incendiary device of the present disclosure in the form of a firestarter log with wood blocks stacked thereupon, and positioned within a fireplace;

FIG. 12A is a perspective view showing an alternative embodiment of the inventive incendiary devices of the present disclosure in the form of a torch;

FIG. 12B is a perspective view showing an alternative embodiment of the inventive incendiary devices of the present disclosure in the form of a rolled product; and FIG. 12C is a perspective view showing an alternative embodiment of the inventive incendiary devices of the present disclosure in the form of a candle on a celebration cake.

Repeated use of reference characters in the present specification and drawings is intended to represent the same or analogous features or elements of the present invention.

Test Methods

The inventive incendiary devices of the present disclosure, as well as methods thereof, can include measurement of airflow properties, such as porosity, airflow volume, airflow velocity, airflow resistance, pressure drop, amperage change, and the like (desirably ASTM or equivalent, such as TAPPI T460). Desirably, such measurements are obtained from a dimension including the fluting layer (i.e., measuring airflow properties through the fluting air passageways).

The viscosity (i.e., dynamic viscosity) of heated molten waxy component can be measured with a suitable viscosity test (preferably ASTM or equivalent, such as ASTM D7042-04). Results are reported in centipoise (cP).

DEFINITIONS

It should be noted that, when employed in the present disclosure, the terms "a" and "an" are intended to mean "at least one" of any stated features, elements, integers, steps, components, or groups and are not intended to be limited to only one of such features, elements, integers, steps, components, or groups thereof, except where specifically stated as such. In addition, use of the phrase "at least one" is not intended to render other uses of the terms "a" or "an" to be limited to only one of a feature, element, integer, step, component, or group.

It should be noted that, when employed in the present disclosure, the terms "comprises," "comprising" and other derivatives from the root term "comprise" are intended to be open-ended terms that specify the presence of any stated features, elements, integers, steps, components, or groups, and are not intended to preclude the presence or addition of one or more other features, elements, integers, steps, components, or groups thereof.

As used herein, the term "bulk delivery system" refers to the supply of relatively large quantities of goods and/or services. Non-limiting examples of suitable bulk delivery systems can include, but is not limited to, shipping crates, train cars, delivery trucks, vans, forklifts, dollies, persons, and the like.

As used herein, the term "burn" refers to the consumption of materials via a flame.

As used herein, the terms "corrugate," "corrugated material" and "corrugated substrate" may be used synonymously to refer to a paperboard comprising a cellulosic substrate layer having alternating flutings sandwiched between two substantially flat cellulosic substrate layers.

As used herein, the term "corrugated component" refers to a corrugate substrate having pre-determined dimensions suitable for use with the invention herein. Such corrugated component can have any desired shape, and is not limited to a circular or disk shape.

As used herein, the term "ignition component" refers to an igniter device comprising a propellant that is used to initiate incineration by flame of the present invention.

As used herein, the term "invention" refers to an invention of the present disclosure, as well as equivalents thereof that are consistent herewith, provided however that any of such equivalents is not prohibitive thereto with respect to patentability.

As used herein, the term "storage device" refers to containing an item at a particular location. Non-limiting examples of suitable storage devices can include, but is not limited to, warehouses, storage bins, storage hoppers, silos, totes, crates, and the like.

As used herein, the term "transfer apparatus" refers to moving an item from one location to another. Non-limiting examples of suitable transfer apparatus can include, but is not limited to, conveyors, forklifts, carts, dollies, hand carrying, and the like.

As used herein, the terms "waxy component" and "waxy material" can be used interchangeably and generally refer to organic compounds that are hydrophobic, malleable solids near ambient temperatures of about 70° F. (21° C.) and have a melting point of at least about 95° F. (35° C.), to give relatively low viscosity liquids (e.g., near 1.0 cP) upon such melting. They are generally insoluble in water but soluble in organic, nonpolar solvents, and can include, but are not limited to, higher alkanes and lipids. However, as used herein, the terms "waxy component" and "waxy material" are intended to be non-limiting with respect to the specific chemical makeup of a substance, but rather describe the physical attributes of the substance as described above.

As used herein when referring to components and/or quantities, the term "% by weight" or "wt %" is to be interpreted as based on dry weight, unless otherwise specified herein.

These terms may be defined with additional language in the remaining portions of the specification.

DETAILED DESCRIPTION

The invention is generally directed to improved incineration devices, and methods thereof. In some aspects, the invention is directed to firestarters, fire maitainers and/or fire enhancers. In other aspects, the invention is directed to novelties. In still other aspects, the invention is directed to sensory stimulators (e.g., visual stimulation such as for pleasure or improved lighting, touch stimulation such as for warmth, sound stimulation, smell stimulation, etc.). In yet other aspects, the invention is directed to efficiency improvements (e.g., efficiency for starting and/or maintaining a fire, such as campfires, bonfires, fireplaces, grills, etc.). In still other aspects, the invention is directed to social improvements. In yet other aspects, the invention is directed to relationship improvements. In still other aspects, the invention is directed to emotional and/or psychological improvements. In yet other aspects, the invention is directed to environmental improvements (e.g., waste reductions and/or landfill reductions). In still other aspects, the invention is directed to safety and/or health improvements.

Although several exemplary embodiments of the present invention will be described herein, it should be understood that the disclosed embodiments are intended merely as non-limiting examples of the invention that may be embodied in various forms. Therefore, specific details disclosed herein, such as relating to structure, function, and the like, are not to be interpreted as limiting in any manner whatsoever, but rather only as one of numerous example bases for claims and/or teaching persons having ordinary skill in the art to variously employ the present invention in virtually any appropriately detailed structure or circumstance.

Accordingly, in the interest of brevity and conciseness, descriptions herein may be substantially directed to a non-limiting exemplary embodiment in the form of a firestarter log. Such aspects can be useful for starting, maintaining and/or enhancing fires, preferably controlled fires, including but not limited to, campfires, bonfires, personal gatherings, fireplaces, heating, cooking, brush fires, land clean-up, and the like. It should be understood that the present invention is suitable for various other uses, including but not limited to other recreational activities, other aesthetic activities, other burning activities, and the like, without departing from the scope of the invention.

To gain a better understanding of the present invention, attention is directed to FIGS. 1A-1H for exemplary purposes showing aspects and components of an inventive incendiary device 100 in the non-limiting exemplary form of a firestarter log 110.

Figure 1A:
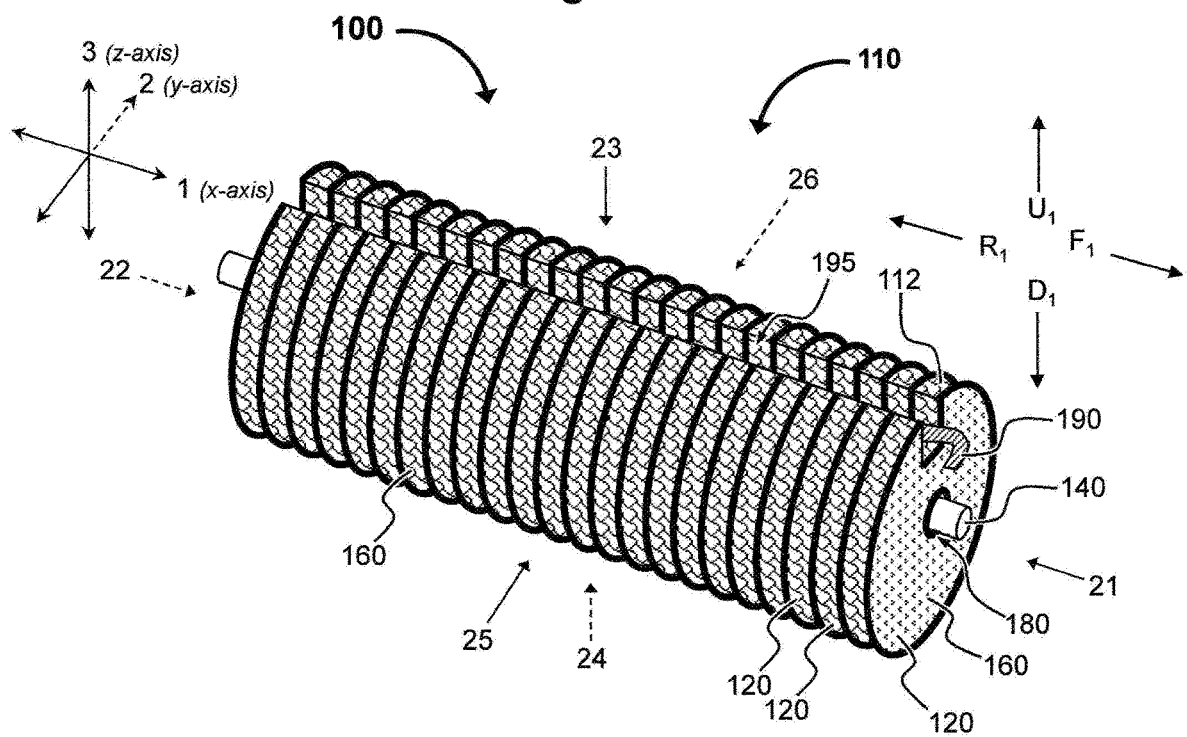
FIG. 1A is a perspective view showing one aspect of an inventive incendiary device of the present disclosure in the form of a firestarter log.
Figure 1B:
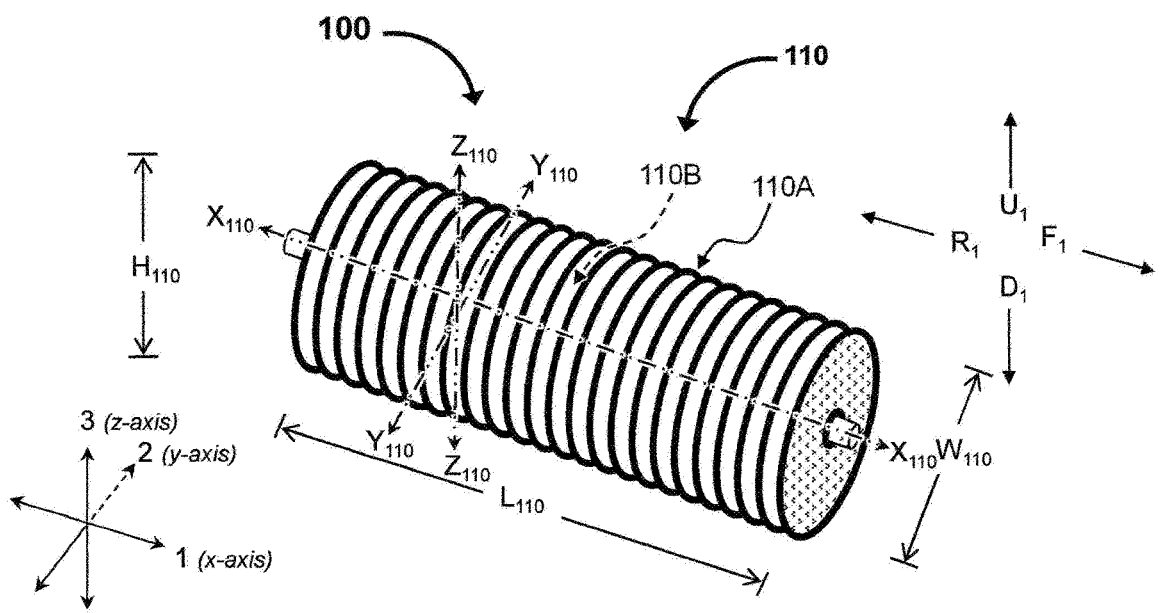
FIG. 1B is a perspective view showing one aspect of an inventive incendiary device of the present disclosure in the form of a firestarter log.
Figure 1C:
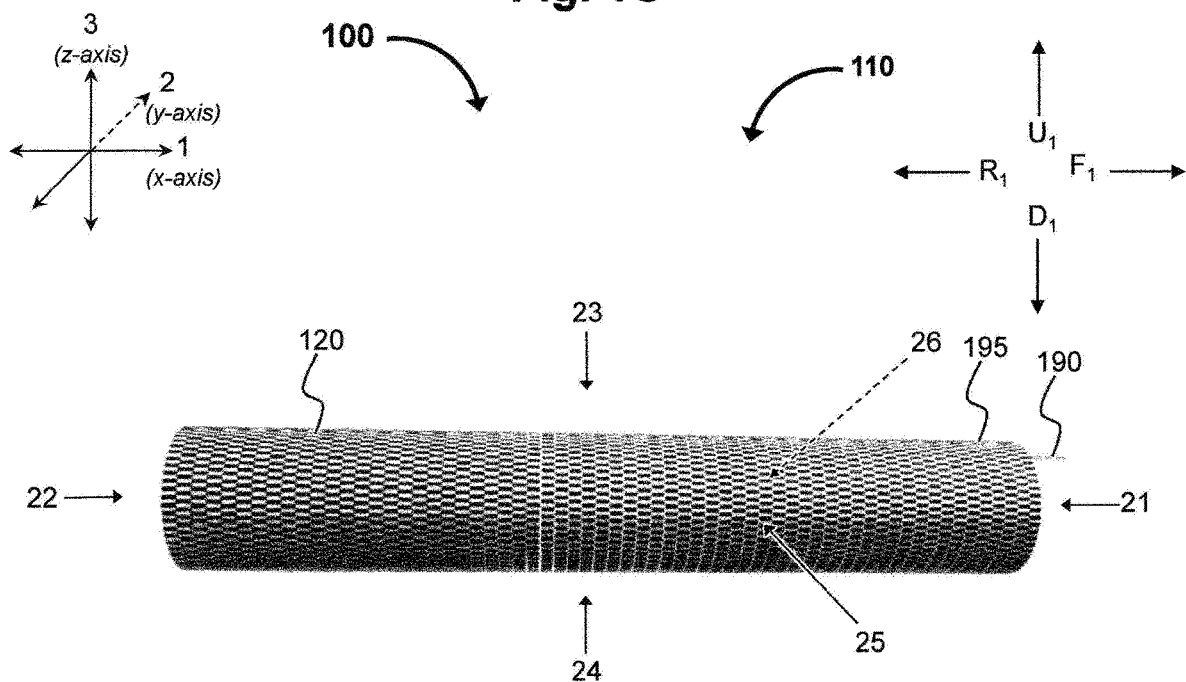
FIG. 1C is a side perspective view showing one aspect of an inventive incendiary device of the present disclosure in the form of a firestarter log.
Figure 1D:
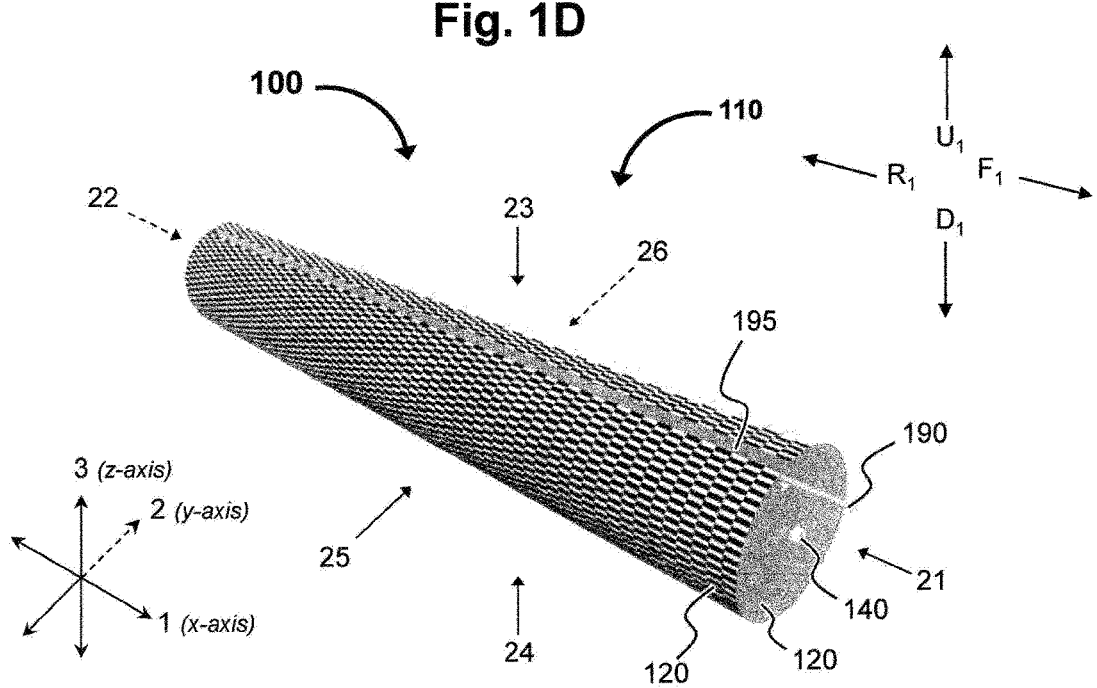
FIG. 1D is a perspective view of the inventive incendiary device of FIG. 1C.
Figure 1E:
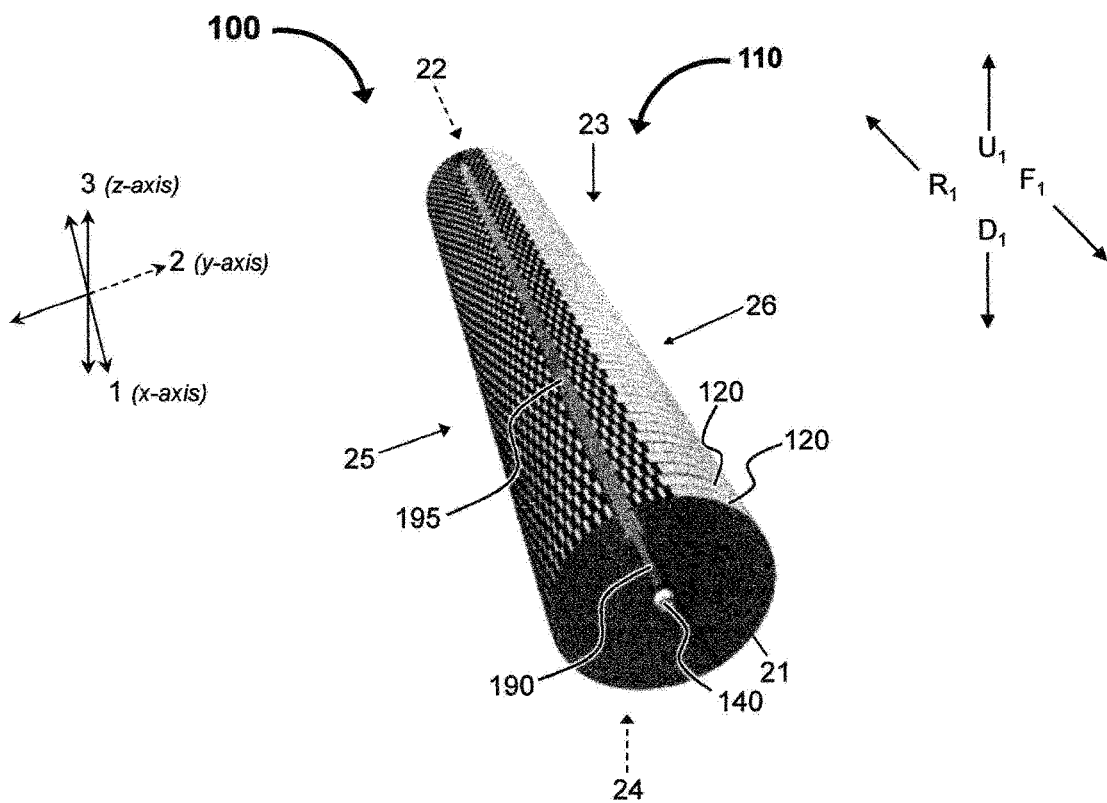
FIG. 1E is a top perspective view of the inventive incendiary device of FIG. 1C.
Figure 1F:
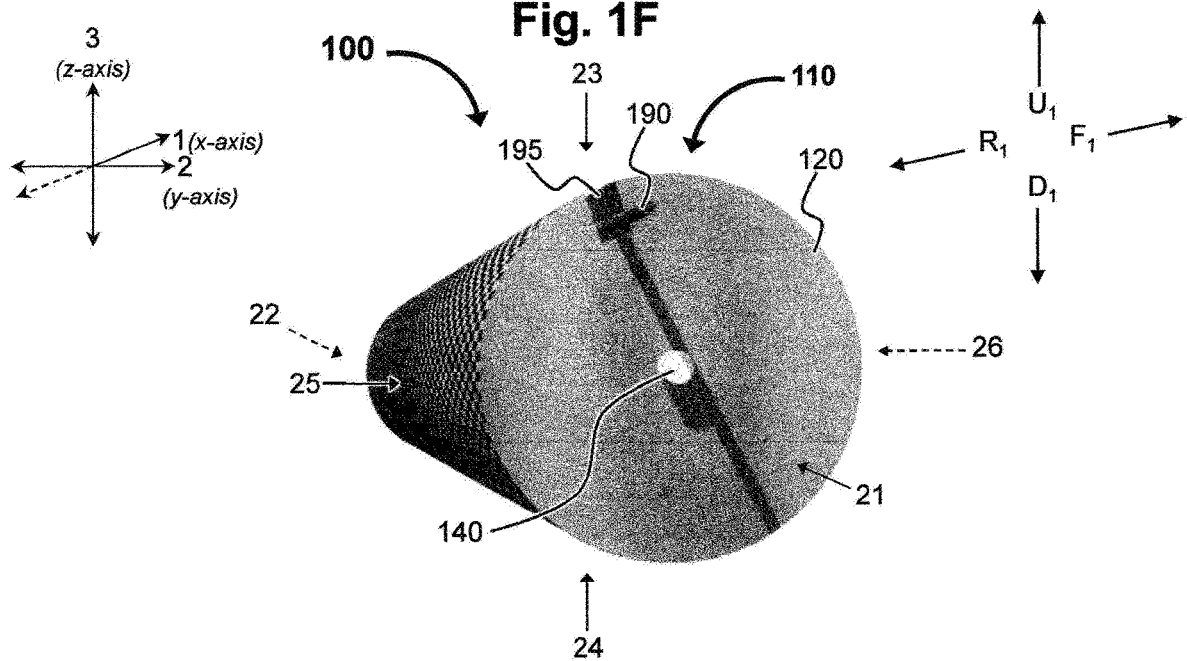
FIG. 1F is a front perspective view of the inventive incendiary device of FIG. 1C.
Figure 1G:
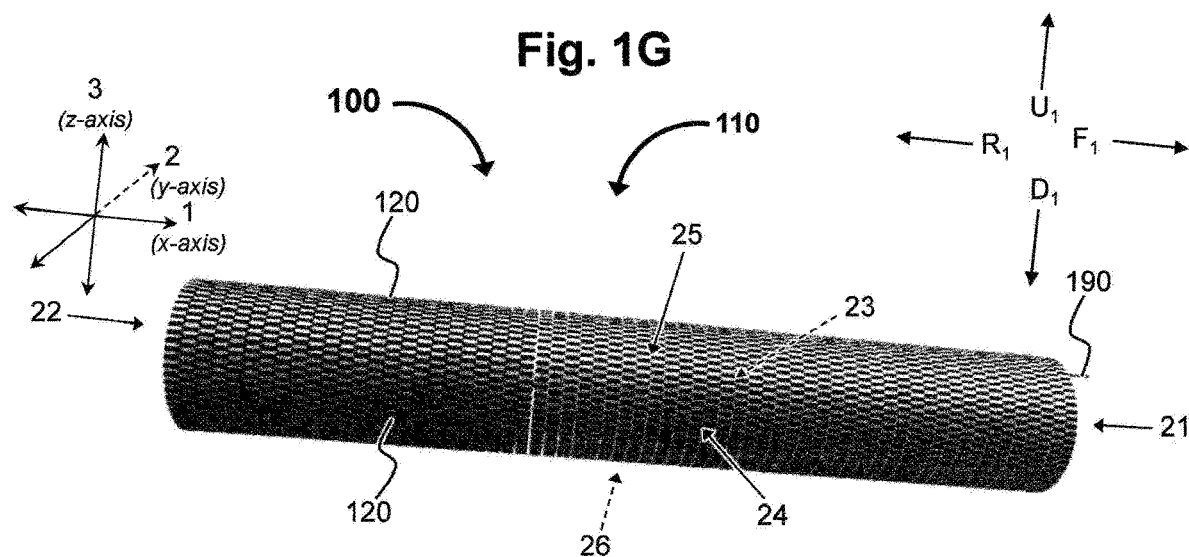
FIG. 1G is a bottom perspective view of the inventive incendiary device of FIG. 1C.
Figure 1H:
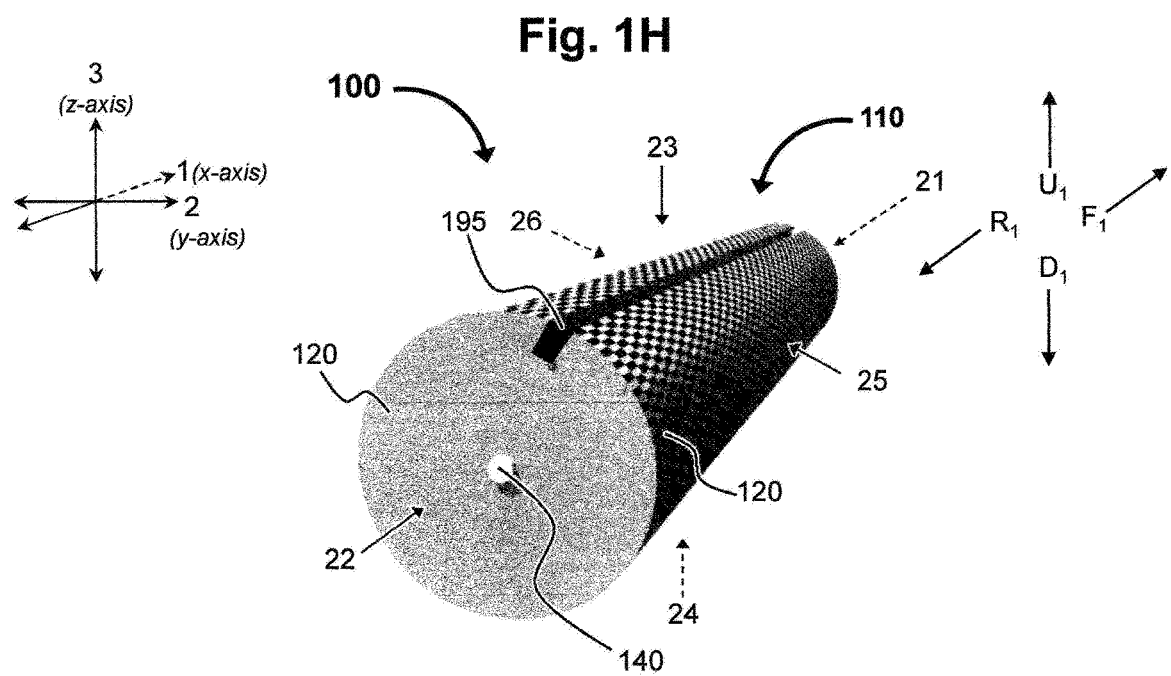
FIG. 1H is a rear perspective view of the inventive incendiary device of FIG. 1C.

With particular reference to FIGS. 1A-1B, the illustrated firestarter log 110 is a three-dimensional device having a front side 21, a rear side 22, a top side 23, a bottom side 24, a first side 25 and a second side 26. The firestarter log 110 has a length $L_{110}$ along axis $X_{110}$ (which follows along the x-axis 1), a width $W_{110}$ along axis $Y_{110}$ (which follows along the y-axis 2), and a height $H_{110}$ along axis $Z_{110}$ (which follows along the z-axis 3), which combine to form an interior volume 110B surrounded by an exterior surface 110A. It is noted that the illustrated non-limiting exemplary firestarter log 110 has a generally cylindrical shape; thus, the width $W_{110}$ and height $H_{110}$ dimensions of the illustrated example are, in this instance, substantially equivalent to, and thus generally define, the diameter $\phi_{110}$ of the illustrated device, though it need not be. It should be understood that incendiary devices of the present invention can have any suitable dimensional shape as may be desired (e.g., spherical, ovaloid, triangular, rectangular, cubical, pentagonal, hexagonal, heptagonal, octagonal, random, and the like, as well as combinations thereof) without departing from the scope of the invention. In one example, the firestarter log 110 has a length $L_{110}$ (as measured between the planar exterior surface 110A of the outermost distal corrugated components 120) of about fifteen inches (15 in.) (38.1 cm) and a diameter $\phi_{110}$ of about 3 in. (7.6 cm). In another example, the firestarter log 110 has a length $L_{110}$ of about 6 in. (15.2 cm) and a diameter $\phi_{110}$ of about 1.5 in. (3.8 cm). Indeed, the firestarter log 110 can have any suitable size dimensions without departing from the scope of the invention, such as a length $L_{110}$ of about 2 in. (5.1 cm) or less to about 73 in. (185.4 cm) or more, or about 3 in. (7.6 cm) to about 72 in. (182.9 cm), or about 6 in (15.2 cm) to about 36 in. (91.4 cm), for example. The illustrated firestarter log 110 can also have any suitable diameter $\phi_{110}$, such as about 0.25 in. (0.6 cm) or less to about 13 in. (33.0 cm) or more, or about 0.5 in. (1.3 cm) to about 12 in. (30.5 cm), or about 1 in. (2.5 cm) to about 3 in. (7.6 cm), for example. In aspects which exhibit a shape other than cylindrical, the firestarter log 110 can have a width $W_{110}$ and height $H_{110}$ which each fall into the range enumerated above for the diameter $\phi_{110}$, wherein the width $W_{110}$ and the height $H_{110}$ need not be equal.

Continuing with FIGS. 1A-1H, the illustrated firestarter log 110 comprises corrugated material 112. The corrugated material 112 can be folded upon itself (see e.g., FIG. 12B) or, more desirably, formed into shaped corrugated components 120 (see e.g., FIGS. 2G-2I), a plurality of which can be arranged in a congruent planar relationship with each other to form a stacked configuration. Such corrugated components 120 can optionally have an aperture or hole 130 disposed transversely therethrough. In some desirable aspects, the hole 130 in each corrugated component 120 can desirably be generally aligned when in a stacked configuration, though it need not be (such as when the hole 130 is intended for air induction purposes, for example). In some desirable aspects, the hole 130 can be located at the approximate center 128 of each corrugated component, though it need not be.

The illustrated firestarter log 110 further comprises a support component 140 which can generally maintain the stacked (or other) configuration of the corrugated components 120. In some aspects, the firestarter log 110 can further comprise an optional fastener component 180 which can secure the plurality of corrugated components 120 to the support component 140.

In addition, the illustrated firestarter log 110 also comprises a waxy component 160, which can desirably be absorbed into and/or adsorbed onto the corrugated components 120.

As illustrated, the firestarter log 110 can comprise an optional groove 195 which is shown to be generally disposed linearly along the entire length of the firestarter log 110, though it need not be (see e.g., FIGS. 5B, 5C and 5E-5G). Illustrated within the optional groove 195 is an ignition component 190 which can help quickly ignite the firestarter log 110, such a via application of a flame to the ignition component 190. However, in some aspects, the ignition component need not reside in the optional groove 195 (see e.g., FIGS. 5A and 5D)

In some aspects, the firestarter log 110 can further comprise an optional packaging component 210, which can at least partially encompass the firestarter log 110. In some further aspects, such packaging component 210 can comprise an optional release member 220, which can promote easier removal of the packaging component 210. In some aspects, a plurality of firestarter logs 110 can be grouped together to form a bundle 310 of firestarter logs 110 for presentation to a user. Such bundle 310 can be secured with an optional bundling member 320.

Figure 2A:
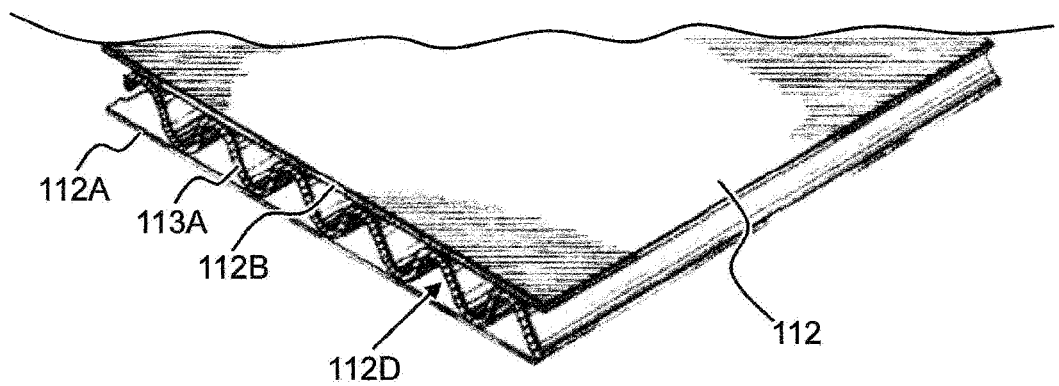
FIG. 2A is a partial perspective view showing a double-walled corrugated material.
Figure 2B:
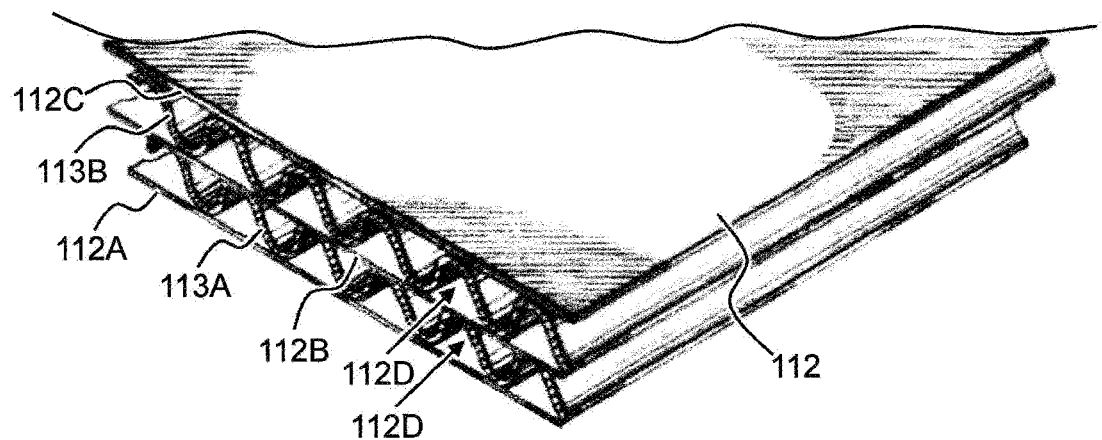
FIG. 2B is a partial perspective view showing a triple-walled corrugated material.
Figure 2C:
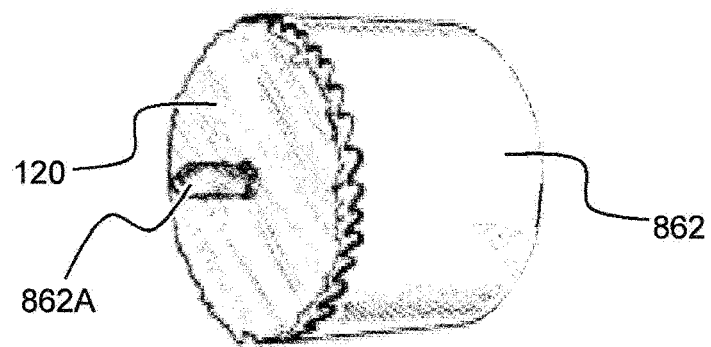
FIG. 2C is a perspective view showing an exemplary corrugated component forming apparatus in the form of a hole saw blade.
Figure 2D:
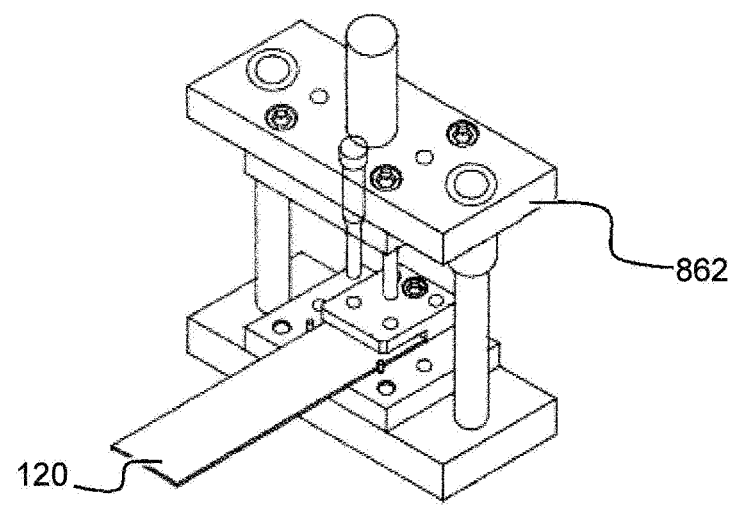
FIG. 2D is a perspective view showing an exemplary corrugated component forming apparatus in the form of a punch press.
Figure 2E:
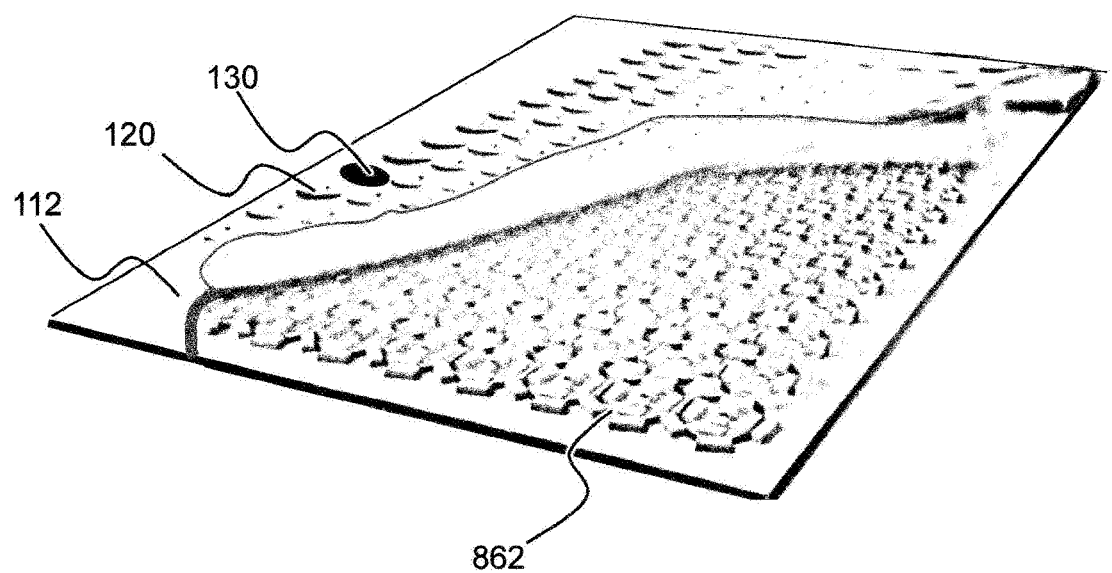
FIG. 2E is a perspective view showing an exemplary corrugated component forming apparatus in the form of a die and having a corrugated material which has been processed, and wherein one corner of the corrugated material has been pulled back to partially expose the die.
Figure 2F:
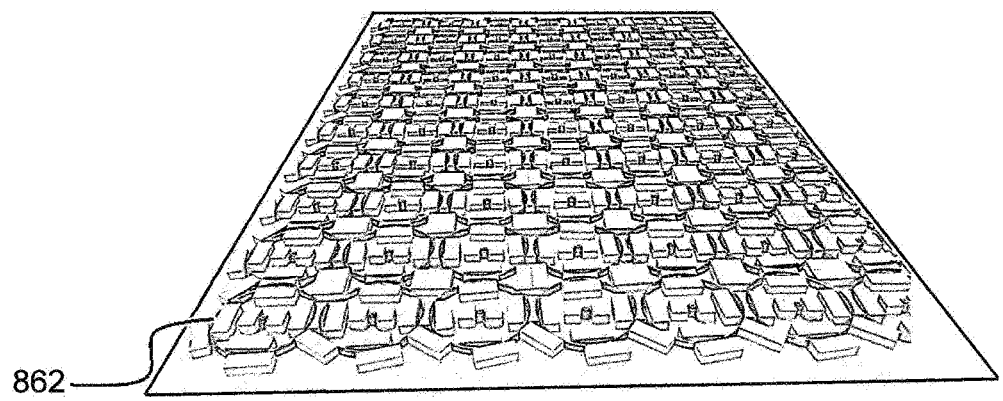
FIG. 2F is a perspective view showing the die of FIG. 2E.

Referring now to FIGS. 2A-2L, in its most basic form, the invention comprises at least one substrate of a corrugated material 112 presented in a desired shape to form a corrugated component 120. The corrugated material 112 can include those materials commonly utilized in shipping cases for consumer goods (e.g., boxes, knock-downs, etc.), including double-walled corrugated, triple-walled corrugated, and the like, as well as combinations thereof. In some desirable aspects, at least a portion of the corrugated materials 112 can be recycled, or otherwise intended as waste, to provide various advantages (e.g., environmental improvement, landfill reduction, cost reduction, etc.), though it need not be. For example, one suitable corrugated material includes double-walled corrugated material utilized in boxes having a length of 16 in. (41 cm), a width of 12 in. (31 cm), a height of 8 in. (20 cm), and a strength of 200 pound test, available as Model No. S-4235 from Uline, having a place of business located at 12575 Uline Drive, Pleasant Prairie, Wis., U.S.A. 53158. With particular reference to FIG. 2A, a double-walled corrugated material 112 is shown having a first wall layer 112A, a second wall layer 112B distal to the first wall layer 112A, and a first fluting layer 113A disposed therebetween. The presence of the first fluting layer 113A creates air passageways 112D through the corrugated component 120, which can be an important aspect of the present invention. With particular reference now to FIG. 2B, a triple-walled corrugated material 112 is shown having a first wall layer 112A, a second wall layer 112B and a first fluting layer 113A disposed therebetween, and further comprising a third wall layer 112C distal to the second wall layer 112B having a second fluting layer 113B disposed between the second wall layer 112B and the third wall layer 112C. The presence of the first fluting layer 113A and the second fluting layer 113B creates air passageways 112D through the inventive incendiary devices 100 of the present disclosure. In some aspects, it may be desirable that the inventive incendiary devices 100 include a plurality of layers of the corrugated material 112, disposed in congruent planar relation, such as folded upon itself, for example. In other aspects, it may be desirable for the inventive incendiary devices 100 to include a plurality of corrugated components 120 disposed in congruent planar relation to each other, such as to form a stacked configuration, for example.

With particular reference to FIGS. 2C-2L, corrugated components 120 can be prepared from corrugated materials 112 using a corrugated component forming apparatus 862. Several non-limiting exemplary corrugated component forming apparatus 862 are shown in FIGS. 2C-2F, although other such apparatus as will become apparent to persons having ordinary skill in the art can also be utilized without departing from the scope of the invention.

Figure 2G:
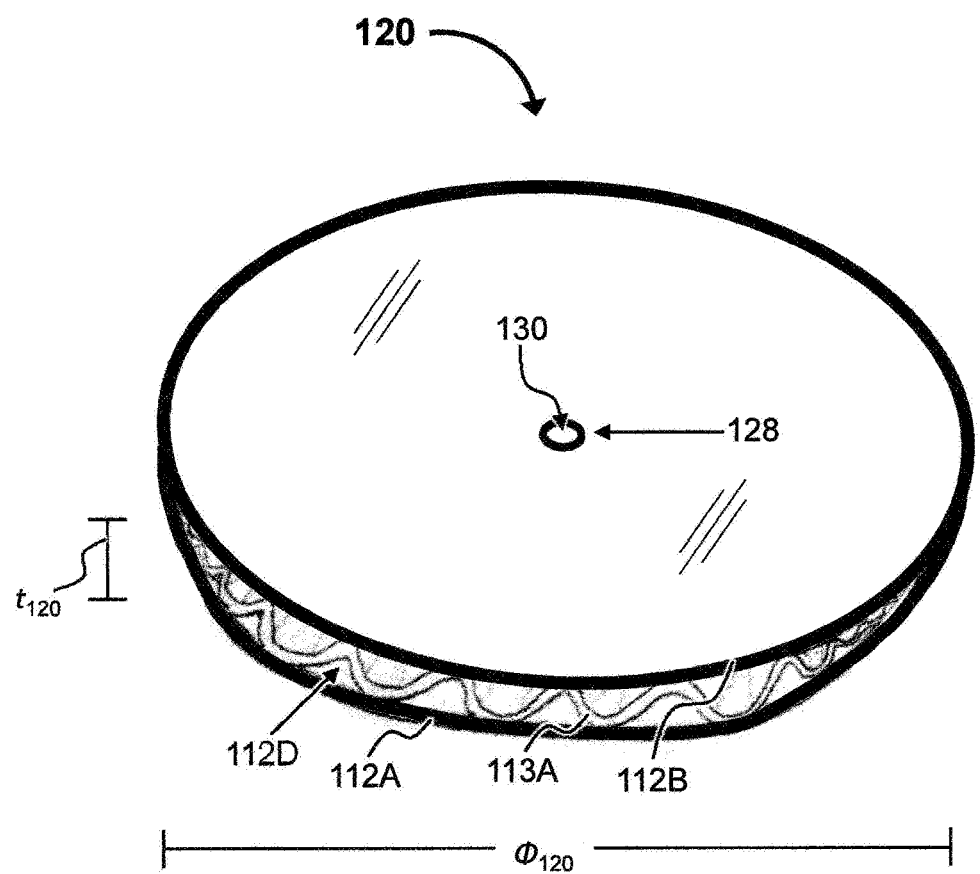
FIG. 2G is a perspective view showing a circular-shaped corrugated component constructed of a double-walled corrugated material.

With particular reference to FIG. 2G, a circular-shaped corrugated component 120 is shown comprising a double-walled corrugated material 112 having a first wall layer 112A, a second wall layer 112B distal to the first wall layer 112A, and a first fluting layer 113A disposed therebetween. The presence of the first fluting layer 113A creates air passageways 112D through the corrugated component 120, and thus through the inventive incendiary devices 100 of the present disclosure. In addition, the illustrated circular-shaped corrugated component 120 further comprises an optional hole 130 disposed therethrough, located at or about the corrugated component's center 128. In some aspects, one or more such holes 130 may be desirable to improve airflow into and/or through the incendiary devices 100. In other aspects, such a hole 130 may be desirable for inserting a support component 140 therethrough (further discussed below).

Figure 2H:
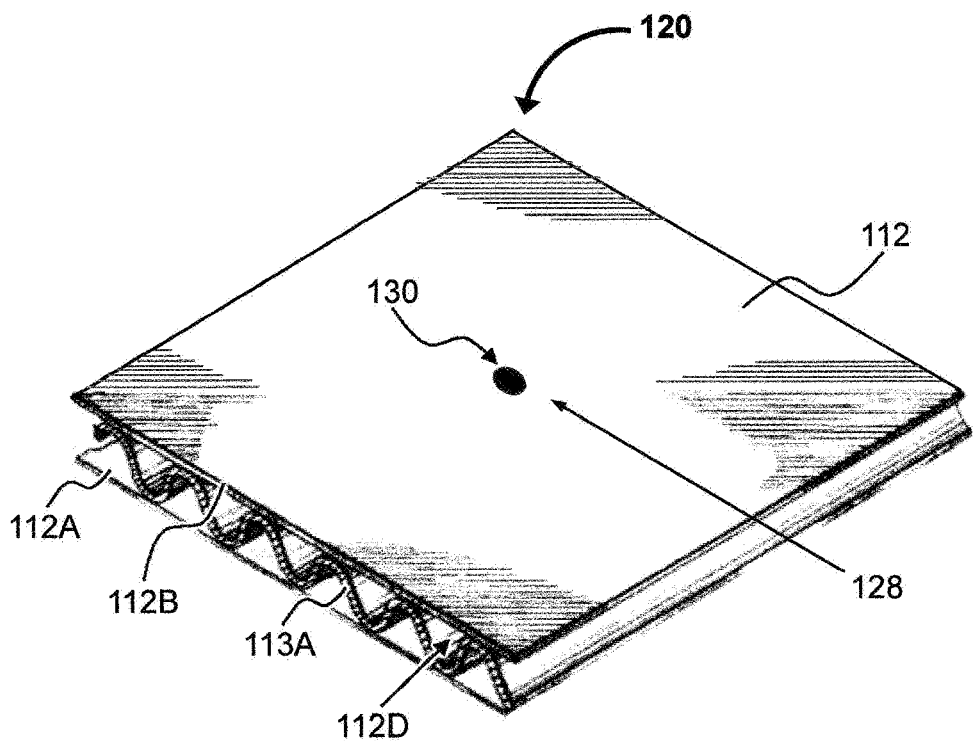
FIG. 2H is a perspective view showing an angular-shaped corrugated component constructed of a double-walled corrugated material.

With particular reference to FIG. 2H, an angular-shaped corrugated component 120 is shown comprising a double-walled corrugated material 112 having a first wall layer 112A, a second wall layer 112B distal to the first wall layer 112A, and a first fluting layer 113A disposed therebetween. The presence of the first fluting layer 113A creates air passageways 112D through the corrugated component 120, and thus through the inventive incendiary devices 100 of the present disclosure. In addition, the illustrated angular-shaped corrugated component 120 further comprises an optional hole 130 disposed therethrough, located at or about its center 128.

Figure 2I:
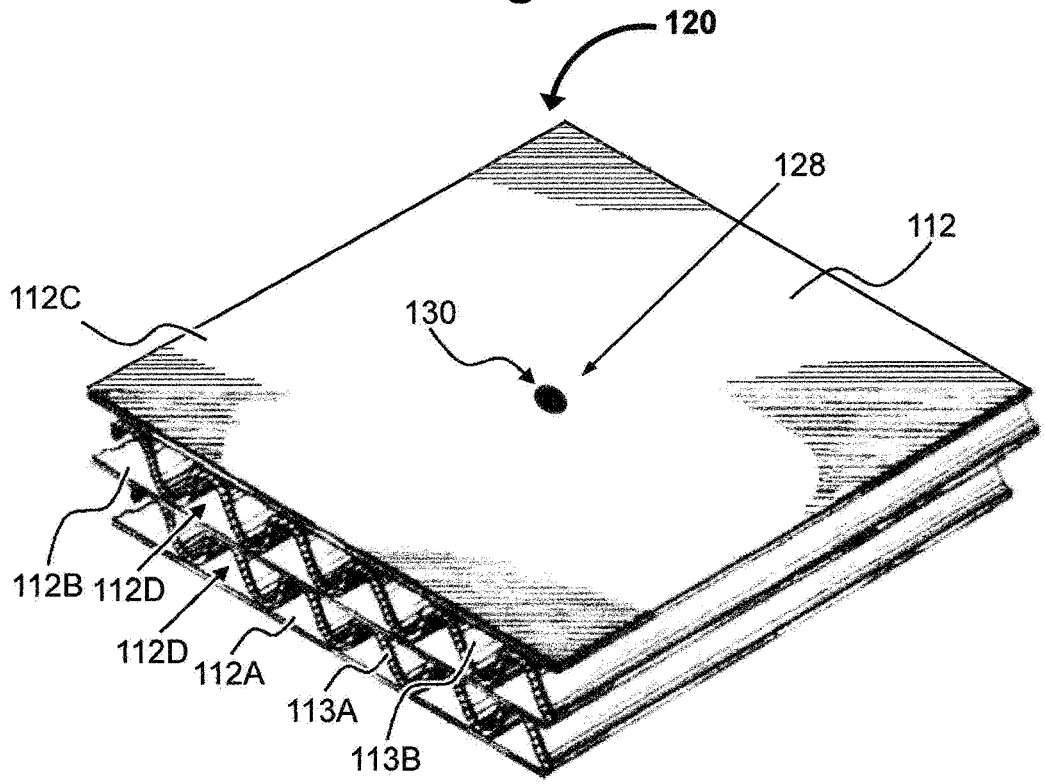
FIG. 2I is a perspective view showing an angular-shaped corrugated component constructed of a triple-walled corrugated material.
Figure 3A:
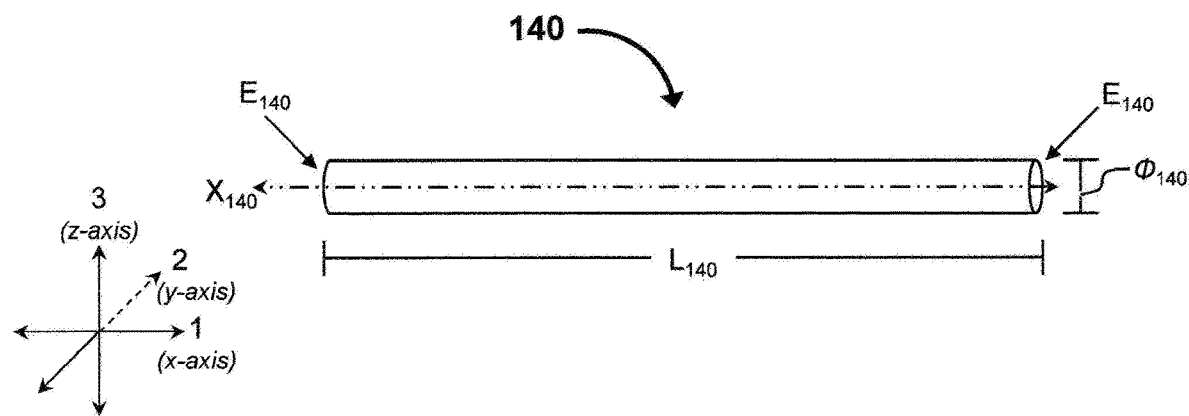
FIG. 3A is a perspective view showing an internal support component in the form of a wooden doweling.
Figure 3B:
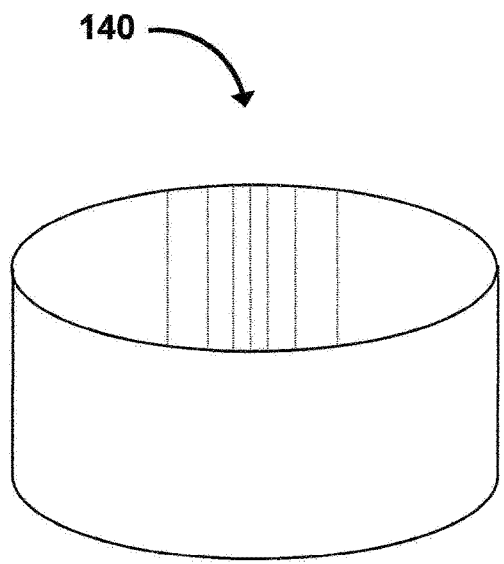
FIG. 3B is a perspective view showing an external support component in the form of an open-top container.
Figure 3C:
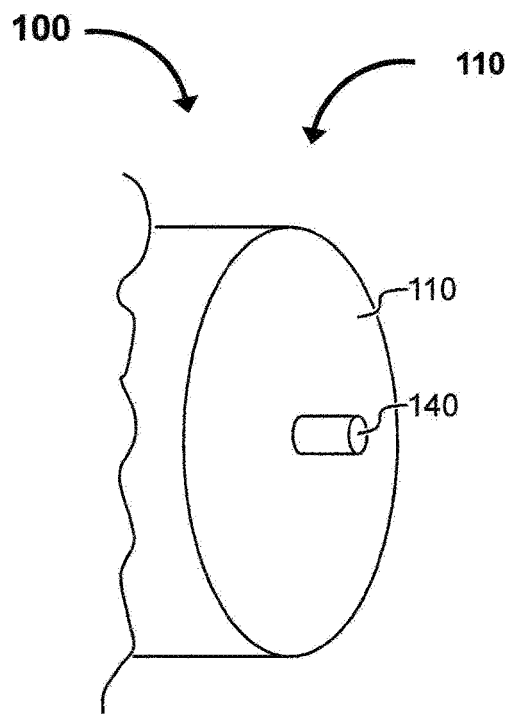
FIG. 3C is a partial perspective end view showing an inventive incendiary device of the present disclosure in the form of a firestarter log comprising a support component.
Figure 3D:
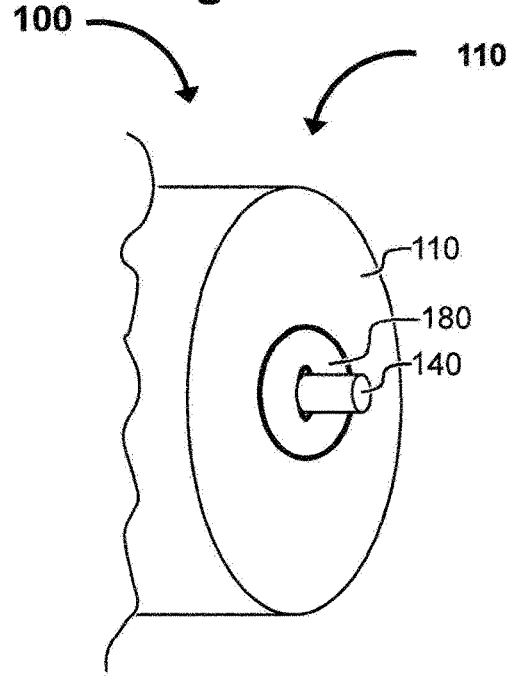
FIG. 3D is a partial perspective end view showing an inventive incendiary device of the present disclosure in the form of a firestarter log comprising a support component and having an optional faster component in the form of a compression washer disposed thereon.
Figure 3E:
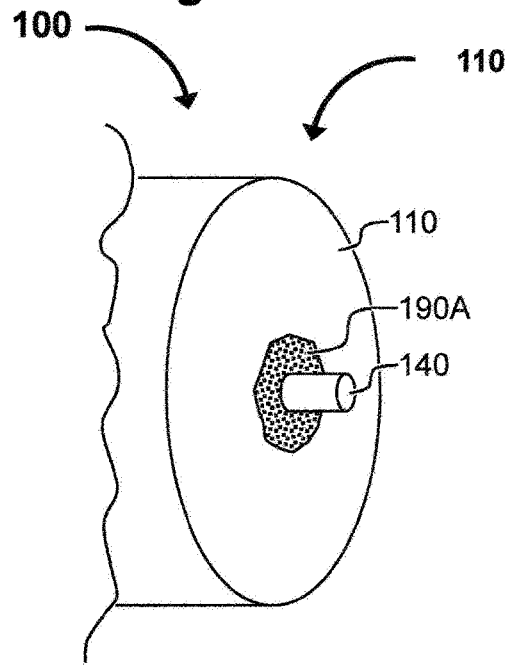
FIG. 3E is a partial perspective end view showing an inventive incendiary device of the present disclosure in the form of a firestarter log comprising a support component and an optional fastener component in the form of an adhesive.
Figure 3F:
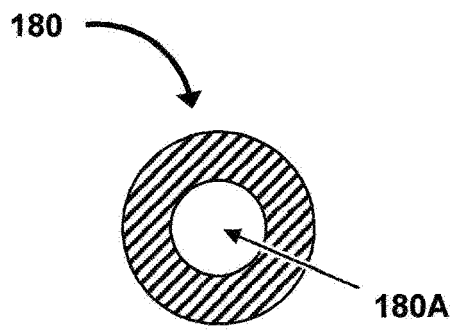
FIG. 3F is a side view of an exemplary optional fastener component in the form of a compression fastener.
Figure 3G:
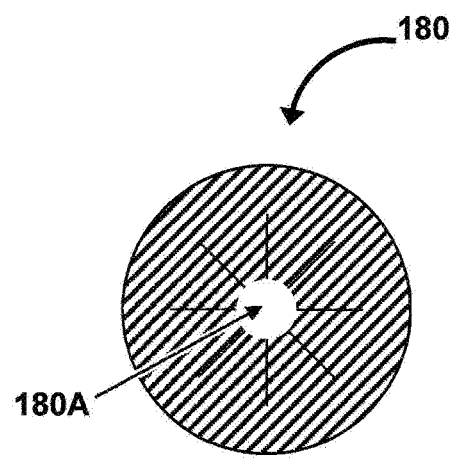
FIG. 3G is a side view of an exemplary optional fastener component in the form of an internal tooth lock washer.
Figure 3H:
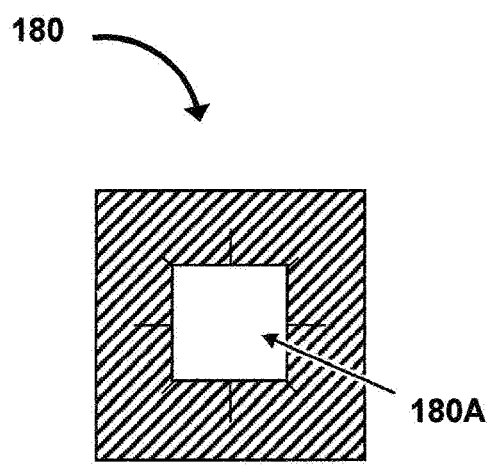
FIG. 3H is a side view of an exemplary optional fastener component in the form of a square lock washer.
Figure 3I:
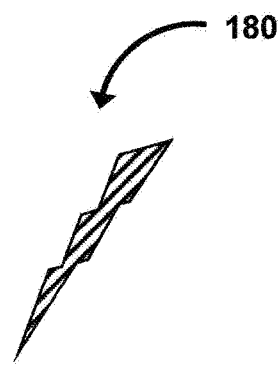
FIG. 3I is a side view of an exemplary optional fastener component in the form of a pin fastener.
Figure 3J:
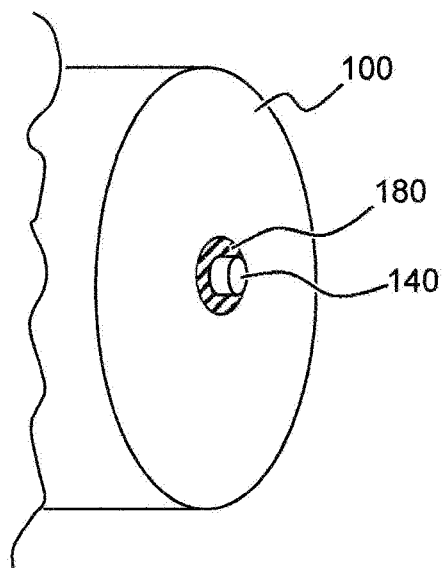
FIG. 3J is a partial perspective end view showing an inventive incendiary device of the present disclosure in the form of a firestarter log comprising a support component and an optional fastener component in the form of a compression fastener disposed thereon.
Figure 3K:
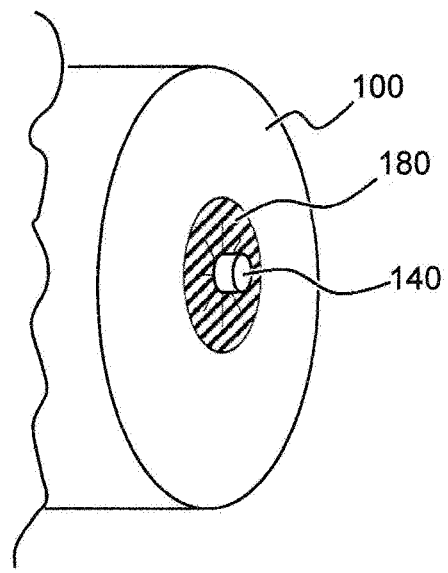
FIG. 3K is a partial perspective end view showing an inventive incendiary device of the present disclosure in the form of a firestarter log comprising a support component and an optional fastener component in the form of an internal tooth lock washer disposed thereon.
Figure 3L:
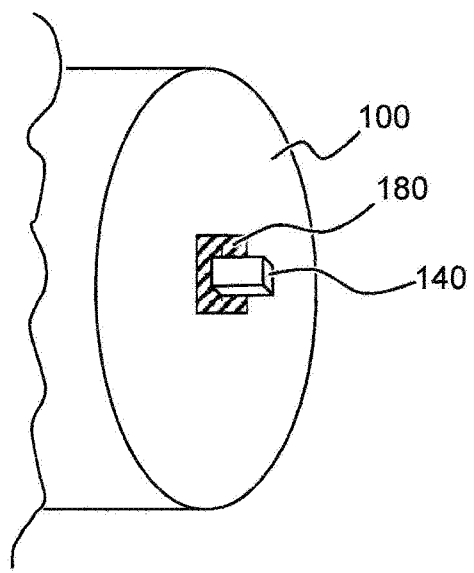
FIG. 3L is a partial perspective end view showing an inventive incendiary device of the present disclosure in the form of a firestarter log comprising a support component and an optional fastener component in the form of a square lock washer disposed thereon.
Figure 3M:
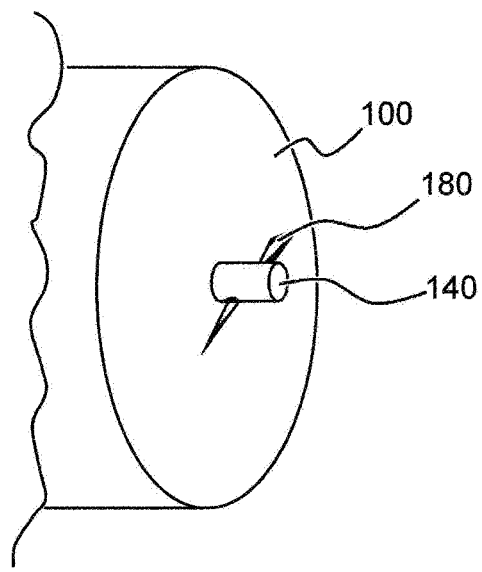
FIG. 3M is a partial perspective end view showing an inventive incendiary device of the present disclosure in the form of a firestarter log comprising a support component and an optional fastener component in the form of a pin fastener disposed therethrough.

With particular reference to FIG. 2I, an angular-shaped corrugated component 120 is shown comprising a triple-walled corrugated material 112 having a first wall layer 112A, a second wall layer 112B distal to the first wall layer 112A, and a first fluting layer 113A disposed therebetween, and further comprising a third wall layer 112C distal to the second wall layer 112B and having a second fluting layer 113B disposed between the second wall layer 112B and the third wall layer 112C. The presence of the first fluting layer 113A and the second fluting layer 113B creates air passageways 112D through the corrugated component 120, and thus through the inventive incendiary devices 100 of the present disclosure. In addition, the illustrated angular-shaped corrugated component 120 further comprises an optional hole 130 disposed therethrough, located at or about its center 128.

Figure 4A:
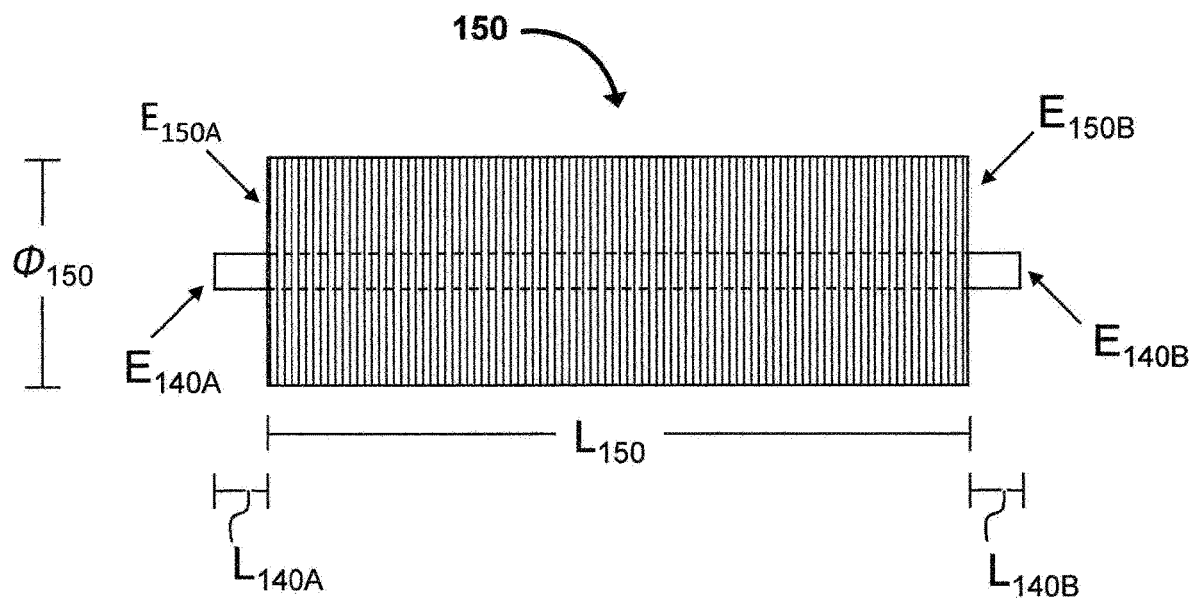
FIG. 4A is a side view showing a precursor log.
Figure 4B:
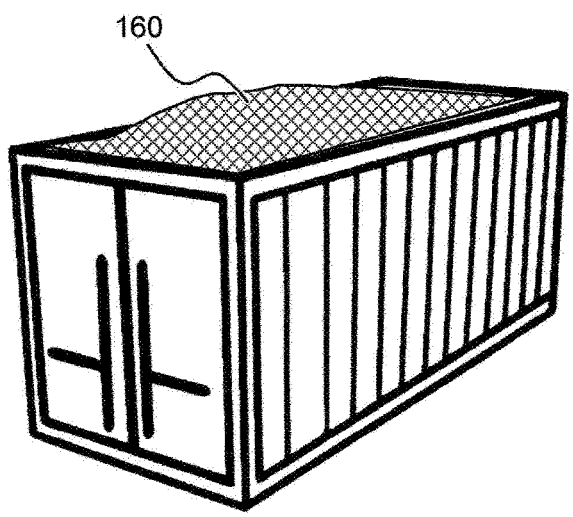
FIG. 4B is a perspective view showing waxy materials disposed within a containment member.

Referring now to FIGS. 1A and 3A-4A, the inventive incendiary devices 100 can include a support component 140. The support component 140 can assist with maintaining the structural form or configuration of the inventive incendiary devices 100. Such support component 140 can be disposed internally (see e.g., FIGS. 1A and 3A), externally (see e.g., FIG. 3B), or combinations thereof. Non-limiting examples of support components 140 will become apparent to persons having ordinary skill in the art and can include, but are not limited to, doweling, frameworks, adhesives, threaded rods, studs, rivets, clamps, rope, string, straps, ties, bands, wrappers, and the like, as well as combination thereof. In some desirable aspects, the support components 140 can comprise combustible materials, though it need not be. As illustrated in FIG. 4A, the presence of a support component 140 in combination with a configured stacked plurality of corrugated components 120 forms a precursor incendiary log 150 (i.e., prior to the presence of waxy component 160).

With specific reference to FIGS. 3C-3M, the inventive incendiary devices 100 can include an optional fastener component 180 which can be used in tandem with the support component to help maintain the structural form or configuration of the inventive incendiary devices 100. Non-limiting examples of fastener components 180 will become apparent to persons having ordinary skill in the art and can include, but are not limited to, compression fasteners, lock washers, adhesives, hook-and-loop fasteners, snaps, bolts, screws, nails, pins, and the like, as well as combinations thereof. In some desirable aspects, the fastener component 180 can comprise combustible materials, though it need not be. For example, where an inventive incendiary device 100 comprises a support component 140, such as in the form of a wood doweling, it may also comprise optional fastener components 180 in the form of wood compression fasteners, for example, which can be slid onto each end of the doweling to apply pressure to the structure of the inventive incendiary devices 100 while providing resistance to the corrugated components 120 from sliding off of the doweling, thus helping to maintain the configuration thereof while presenting a fully combustible incendiary device 100 (see e.g., FIG. 3D).

Referring now to FIGS. 4A-4F, the inventive incendiary devices 100 of the present disclosure additionally comprise a waxy component 160 (further defined above). Suitable examples of a waxy component 160 can include, but is not limited to, petroleum waxes, animal waxes, vegetable waxes, and mineral waxes, such as paraffin wax and its derivatives, beeswax, beef tallow, pork lard, soy wax, gel wax, palm wax, dairy butter, margarine, vegetable shortening, lanoline, carnauba wax, microcrystalline wax, montan wax, shale, polyethylene wax and its derivatives, and the like, as well as combinations thereof. In some desirable aspects, at least a portion of the waxy component 160 can be recycled, or otherwise intended as waste, to provide various advantages (e.g., environmental improvement, landfill reduction, cost reduction, etc.), though it need not be. Preferably, the waxy component 160 is absorbed into, and/or adsorbed onto, the corrugated components 120, such as by soaking the corrugated material 112 (e.g., in the form of a precursor incendiary log 150), or applying the waxy component 160 to the corrugated material 112 of the corrugated components 120 when in liquid form (i.e., melted or molten waxy component 162 form), such as by pouring, spraying, and the like. The amount of waxy component 160 to corrugated material 112 can range from about 5-percent by weight (5 wt %) to about 300 wt %, such as about 10 wt % to about 200 wt %, or about 20 wt % to about 100 wt %, or about 30 wt % to about 70 wt %. Factors that can be considered when determining the amount of waxy component 160 content can include type of waxy material, cost, desired burn rate, and the like.

Referring now to FIGS. 5A-5G, in some desirable aspects, the inventive incendiary devices 100 of the present disclosure can comprise an optional ignition component 190. The ignition component 190 can initiate and/or enhance incineration of the incendiary devices 100 (as compared to merely igniting the incendiary device 100 via a direct flame). Accordingly, the ignition component 190 can extend along and/or through at least a portion of the incendiary devices 100. Preferably, the ignition component 190 is flammable and can generate intense heat sufficient to ignite the incendiary devices 100. Examples of suitable ignition components 190 can include, but are not limited to, fuse materials (such as canon fuse, fireworks fuse, etc.), wicks, sparklers, black powder, kerosene, zinc-sulfur, double-base propellants (e.g., nitroglycerin dissolved in a nitrocellulose gel and solidified with additives), composite propellants (e.g., ammonium nitrate-based (ANCP) or ammonium perchlorate-based (APCP) combined with magnesium and/or aluminum and a rubber binder, such as hydroxyl-terminated polybutadiene (HTPB)), high-energy composite (HEC) propellants (e.g., polyurethane-bound aluminum-APCP combined with RDX or HMX), composite modified double base propellants (e.g., a nitrocellulose/nitroglycerin double base propellant combined with ammonium perchlorate (AP) and powdered aluminum), electric solid propellants (e.g., high performance plastisol), and the like, as well as combinations thereof. For example, one suitable ignition component is GN1051 Fuse having a ⅛ inch (2.8 mm) diameter and a burn rate of 7.5 seconds per inch, available from Skylighter, Inc., having a place of business located in Round Hill, Va., U.S.A. 20142. However, it should be understood that the ignition component 190 can comprise any flammable ignition source suitable for igniting an inventive incendiary device 100 of the present disclosure, as will become apparent to persons having ordinary skill in the art, without departing from the scope of the invention.

With particular reference to FIGS. 5A, 5C and 5D, in some aspects, the ignition component 190 can be at least partially attached to the exterior surface 100A of the inventive incendiary devices 100. Such attachment can be enhanced with an attachment component, such as a suitable adhesive 190A, for example. However, it should be understood that other attachments means (e.g., staples, string, adhesive tape, etc.), as will become apparent to persons having ordinary skill in the art, are also suitable without departing from the scope of the invention.

With particular reference to FIGS. 5B, 5C and 5E-5G, in other aspects, the inventive incendiary devices 100 can comprise an optional groove 195, wherein the groove 195 can be disposed into or through the interior volume 100B. In some such aspects, one or more such grooves 195 may be desirable to improve airflow into and/or through the inventive incendiary devices 100. In other such aspects, such a groove 195 may be desirable for disposing the ignition component 190 into the interior 100B of the inventive incendiary devices 100. In such aspects, the ignition component 190 can be secured within the groove 195 via friction alone, and/or with the aid of an attachment component (e.g., adhesive 190A, waxy component 160, staples, tape, etc.).

The optional groove 195 can be disposed along at least a portion of one or more dimensions (e.g., length $L_{100}$, width $W_{100}$, height $H_{100}$, diameter $\phi_{100}$, etc.) of the inventive incendiary devices 100 (depending on the shape), and/or exterior circumference of the inventive incendiary devices 100. Accordingly, depending upon its configuration, the length $L_{195}$ of the groove 195 can be less than, equal to, or greater than, the length $L_{100}$ of the incendiary devices 100.

In one non-limiting exemplary embodiment, the groove 195 can have a length $L_{195}$ disposed along substantially the entire length $L_{100}$ of inventive incendiary devices 100. In other aspects, the groove 195 can be disposed upon at least a portion of the 360° periphery of the inventive incendiary devices 100 (see e.g., FIG. 5F). In addition, the groove 195 can be linear or nonlinear. Furthermore, the groove 195 can be continuous or discontinuous.

When present, the optional groove 195 can also have a width $W_{195}$ as measured orthogonally to the length $L_{195}$ of the groove 195 (e.g., generally along the y-axis 2 when the length $L_{195}$ generally follows the x-axis 1). The width $W_{195}$ of the groove 195 can be generally uniform, though it need not be. For example, the width $W_{195}$ of the groove 195 may be approximately equal to the thickness (e.g., diameter) of the ignition component 190, such as about 1 millimeter (mm), or about 3 mm, or about 5 mm, or more.

When present, the optional groove 195 can also have a depth $R_{195}$ as measured from the exterior surface 100A and extending into the interior 100B (i.e., toward the central axis S-S) of the inventive incendiary devices 100. The depth Rigs of the groove 195 can be generally uniform, but it need not be. The depth Rigs of the groove 195 can range anywhere between one exterior surface 100A of the inventive incendiary devices 100 to the opposing distal exterior surface 100A (i.e., the opposite side of the incendiary device), preferably between the exterior surface 100A to the center S-S of the incendiary device 100, or less. For example, the depth $R_{195}$ of the groove 195 may be at least equal to the thickness (e.g., diameter) of the ignition component 190, such as at least about 0.04 in. (1 mm), or at least about 0.1 in. (3 mm) or at least about 0.25 in. (6 mm), or at least about 0.5 in. (1.3 cm), or at least about 0.75 in. (1.9 cm), or at least about 1.0 in. (2.5 cm), or at least about 2.0 in. (5.1 cm), or at least about 3.0 in. (7.6 cm), or more, such as between about 0.5 in. (1.3 cm) to about 6.0 in. (15.2 cm).

When a groove 195 is present, at least a portion of the ignition component 190 can be disposed within the groove 195. For example, in some aspects, the ignition component 190 can be disposed into the entire depth Rigs of the groove 195. In more preferable aspects, the ignition component 190 can be disposed only partially within the depth 8195 of the groove 195 (i.e., less than the entire depth 8195 of the groove 195) such that an air space exists between the bottom side of the ignition component 190 and the bottom (i.e., the entire depth $R_{195}$) of the groove 195. In still other aspects, the optional groove 195 can be longitudinally drilled into the interior 100B of the incendiary device 100 (e.g., generally extending from the front side 21 to the rear side 22), which can be utilized as an additional air passageway, or through which an ignition component 190 can be threaded. However, it should be understood that an ignition component 190 can be disposed upon both the exterior surface 100A and/or within the interior 100B in any configuration as may be desired, as will become apparent to persons having ordinary skill in the art, without departing from the scope of the invention (see e.g., FIG. 5C).

Referring now to FIGS. 6A-6H, the inventive incendiary devices 100 of the present disclosure can optionally comprise a packaging component 210. Such packaging component 210 can at least partially cover or envelop the incendiary devices 100. In some aspects, it may be desirable to cover or envelop an entire incendiary device 100, though it need not be. The packaging component 210 can include any form known in the art, such as wrapping substrates, stretch wraps, casings, bags, boxes, and the like, as well as combinations thereof. In addition, the packaging component 210 can comprise any suitable material known in the art, such as paper, plastic, paperboard, corrugated, metallic foil, wood, and the like, as well as combinations thereof. Accordingly, in some aspects, the packaging component 210 can comprise a plurality of materials, though it need not be. In some desirable aspects, the packaging component 210 can comprise combustible materials, though it need not be. In such aspects, it may be desirable that the packaging component 210, or a portion thereof, need not be removed to utilize the inventive incendiary devices 100. Accordingly, in some such aspects, it may be desirable to include an ignition component 190 wherein at least a portion of the ignition component 190 (e.g., an end portion) is exposed outside of the packaging component 210 (i.e., external thereto), such that the ignition component 190 can be ignited without removing the packaging 210, or a portion thereof. In other aspects, it may be desirable that the packaging component 210, or a portion thereof, is removed prior to utilizing the inventive incendiary devices 100. In still other aspects, the packaging component 210 can also serve as the ignition component 190.

With particular reference to FIGS. 6A-6F, in some aspects, the packaging component 210 can include an optional release member 220, which can assist with removal of the packaging 210, or a portion thereof (e.g., a targeted portion). The release member 220 can include any suitable release member 220 (with respect to the packaging component 210) known in the art, such as paper tabs, plastic ribbons, strings, releasable adhesive glues, tapes, hook-and-loop fasteners, and the like, as well as combinations thereof. In some aspects, the release member 220 can be integral with the packaging component 210. In other aspects, the release member 220 can be a separate component to the packaging 210.

Referring now to FIGS. 6G-6H, in some aspects, a plurality of inventive incendiary devices 100 of the present disclosure can be grouped together to form a bundle 310. Such bundle 310 can be secured via an optional bundling member 320. Such bundling member 320 can at least partially surround the bundle 310 of incendiary devices 100. In some aspects, it may be desirable to surround the entirety of the grouped incendiary devices 100 in the bundle 310, though it need not be. The bundling member 320 can include any form known in the art, such as stretch wrap, casings, bags, boxes, strings, ropes, straps, banding, wires, paper substrates, hook-and-loop fasteners, and the like, as well as combinations thereof. In addition, the bundling member 320 can comprise any suitable material known in the art, such as paper, plastic, paperboard, corrugated, wood, woven fabrics, nonwoven materials, metal, adhesives, and the like, as well as combinations thereof. In some aspects, the bundling member 320 can comprise a single type of material and/or a single style of bundling members 320, though it need not be. In some desirable aspects, the bundling member 320 can comprise combustible materials, though it need not be. In such aspects, it may be desirable that the bundling member 320, or a portion thereof, need not be removed to utilize the incendiary devices 100. Accordingly, in some such aspects, the bundling member 320 can also serve as a dispenser for the plurality of incendiary devices 100. In other aspects, it may be desirable that the bundling member 320, or a portion thereof, is removed prior to utilizing the inventive incendiary devices 100.

In some aspects, the inventive incendiary devices 100 of the present disclosure can include at least one set of instructions (not shown). Such instructions can instruct a user, inter alia, how to use the incendiary devices 100; how to remove at least a portion of optional packaging 210 and/or optional bundling member 320; how to dispense an incendiary device 100 from optional packaging 210 and/or optional bundling member 320; how to actuate the ignition component 190 of an incendiary device 100 at least partially covered or enveloped within optional packaging 210; how to store the inventive incendiary devices 100, and the like, as well as combinations thereof.

In addition to the inventive incendiary devices 100 of the present disclosure, the invention also includes methods for producing the inventive incendiary devices 100. Referring now to FIGS. 7-8, exemplary processes for producing inventive incendiary devices 100 of the present invention are described herein. For the purpose of conciseness and brevity, the described methods are directed to producing inventive incendiary devices 100 in the form of a cylindrical-shaped firestarter log 110. However, it should be understood that variations of the form of inventive incendiary devices 100, along with variations of the described methods, as well as other methods for producing a firestarter log 110, or other inventive incendiary devices 100, as will become apparent to persons having ordinary skill in the art, can also be utilized without departing from the scope of the invention.

Referring now to FIG. 7, an example firestarter log 110 (such as shown in FIG. 1A) can be formed by first obtaining a plurality of corrugated materials 112. For example, scrap pieces/sheets of recycled or waste double-walled corrugated materials 112 can be obtained from a dumpster (i.e., corrugated materials which were otherwise destined to be deposited into a landfill as waste), though it need not be. The corrugated materials 112 can optionally be laid flat, and a plurality of circular-shaped corrugated components 120 can be formed from the corrugated materials 112. Each corrugated component 120 comprised of such corrugated materials 112 can be defined by a first planar exterior side wall 112A, an opposing second planar exterior side wall 112B and a fluted substrate 113A disposed therebetween which provides a plurality of air passageways 112D therethrough, and can be further defined by a thickness $t_{120}$ and a diameter $\phi_{120}$ (such as each circular corrugated component 120 having a diameter $\phi_{120}$ of about 3 in. (7.6 cm) and a thickness $t_{120}$ of about ⅛ in. (3.5 mm), for this example) using a suitable corrugated component forming apparatus 862 (such as a hole saw having an inner diameter of about 3 in. (7.6 cm) attached to a power drill, for this example) (see e.g., FIGS. 2C-2G). A generally circular-shaped hole 130 having a particular diameter $\phi_{110}$ (such as about ¼ in. (6.4 mm), for this example) can also be hewn through the thickness $t_{120}$ of each corrugated component 120, such as at the approximate center 128 location of each corrugated component 120 (though it need not be), using a suitable hole forming apparatus 862A (such as a ¼ in. (6.4 mm) drill bit attached to a power drill, for this example) (see e.g., FIGS. 2C, 2G and 9B).

The plurality of corrugated components 120 (such as approximately 105 individual corrugated components, for this example) can then be assembled (i.e., consecutively stacked) together in a wall-to-wall configuration to form a cylindrical corrugated component stack 822 (having a length $L_{822}$ and diameter $\phi_{822}$) (such as a length $L_{822}$ of about 15.5 in. (39.4 cm) and a diameter $\phi_{822}$ of about 3 in. (7.6 cm), for this example) (see e.g., FIG. 9A). Such configuration can be maintained by inserting a support component 140 (such as a wooden doweling, for this example) defined by a particular length $L_{140}$ along the longitudinal axis $X_{140}$ (may also be referred to herein as "longitudinal length") (as measured from one distal end $E_{140A}$ of the support component 140 to the opposing distal end $E_{140B}$) and a particular length-measurement along the cross-directional, or "transverse," axis (may also be referred to herein as "transverse length" or, where dimensionally appropriate, as "diameter") $\phi_{140}$ at any given point along the longitudinal length $L_{140}$ (such as a length $L_{140}$ of about 19 in. (48.3 cm) and a diameter $\phi_{140}$ of about ¼ in. (6.4 mm), for this example) (i.e., wherein $L_{822}$ is less than $L_{140}$, and $\phi_{822}$ is about equal to $\phi_{140}$) through the hole 130 hewn into each corrugated component 120, thus forming a precursor incendiary log 150 (i.e., a corrugated log-like structure prior to application of waxy component 160), preferably configured such that the first planar exterior side wall 112A of each corrugated component 120 is generally in loose contact with the second planar exterior side wall 112B of the next consecutive adjacent corrugated component 120 (see e.g., FIGS. 3A and 4A).

With particular reference to FIG. 4A, the illustrated precursor log 150 can be further defined by a particular longitudinal length $L_{150}$ (defined by the distance between the distal exterior ends $E_{150A}, E_{150B}$ of the stacked corrugated components 120 (as measured along the longitudinal axis $X_{150}$ from one distal end $E_{150A}$ to the opposing distal end $E_{150B}$) and a particular diameter $\phi_{150}$ (defined by the diameter $\phi_{120}$ of the stacked corrugated components 120 as measured along the transverse axis $Z_{110}$ at any given point along the longitudinal length $L_{150}$) (such as a length $L_{150}$ of about 15.5 in. (39.4 cm) and a diameter $\phi_{150}$ of about 3 in. (7.6 cm), for this example). Accordingly, a length $L_{140A}$, $L_{140B}$ of the support component 140 can extend from one or both distal ends $E_{150A}, E_{150B}$ of the preliminary log structure 150, respectively (such as support component lengths $L_{140A}$, $L_{140B}$ of about 2 in. (5.1 cm) extending from exterior distal ends $E_{150A}, E_{150A}$ of the preliminary log structure, respectively, for this example).

With particular reference to FIGS. 3C-3M, in some aspects, one or more optional fastener components 180 can be provided. Such fastener components 180 can optionally be fitted onto the extending portions of the support components 140 and positioned against the outer corrugated components 120 at either end $E_{150A}, E_{150B}$ (or both ends) to help secure the stacked configuration 822 of the corrugated components 120 (i.e., the structure of the precursor incendiary log 150), and can further prevent the corrugated components 120 from sliding axially along the support structure 140.

Continuing with FIG. 7, and with additional reference to FIGS. 4A-4J and 10A-10D, a quantity of waxy materials 160 (such as recycled waxy materials, though it need not be, such as generally paraffin-based materials, including used/broken candles, crayons, and the like, that are otherwise destined to be deposited into a landfill as waste, for this example), can be placed into a suitable waxy component container 170 (such as a metal, open-top, cylindrical cooking container portion of a portable propane cooker, for this example) having suitable volumetric and size dimensions sufficient to hold a desired amount of molten waxy component 162 upon melting of the waxy material 160. Desirably, the container 170 will have a dimension in the x-y plane (e.g., a diameter $\phi_{170}$ for a circular-shaped container, or a length $L_{170}$ for a rectangular container) that is greater than the length $L_{140}$ of the support component 140 of the precursor log 150, and a depth $D_{170}$ (as measured vertically along the z-axis 3 from the interior bottom surface 172 of the container 170 to the top 174 of the container 170) such that the entire precursor log 150 can be fully submerged within the heated molten waxy component 162 (i.e., the container 170 can hold a quantity of molten waxy component 162 wherein the depth of the molten waxy component 162 is greater than the largest diameter $\phi_{150}$ of the precursor log 150 at any given point along its longitudinal length $L_{150}$), though it need not be in some aspects (e.g., where molten waxy component 162 is applied to the precursor log 150 using a suitable application means).

Accordingly, upon adding a sufficient quantity of waxy materials 160, the container 170 can be heated using a suitable heating apparatus 178 (such as a portable deep-fry grill with propane heating element, for this example). The waxy materials can then be heated to a desired temperature, preferably such that the waxy materials 160 are melted into a molten state and subsequently further heated to a desired temperature (i.e., typically a temperature that is high enough such that the heated molten waxy component 162 can saturate the precursor incendiary log 150, but less than the flash point temperature of the waxy component 160) (such as a temperature range of about 250-degrees Fahrenheit ("° F.") (121° C.) to about 400° F. (204° C.), or about 300° F. (149° C.) to about 350° F. (177° C.), for this example). As used herein, the term "saturated" refers to the presence of molten waxy component throughout the entire structure of the precursor incendiary log 150 upon application of said molten waxy component 162, thus forming a saturated incendiary log 152. In some aspects, the resulting molten waxy component 162 can be heated to a suitable temperature to attain a desired viscosity (such as a dynamic viscosity approaching that of water, such as in the range of about 0.5 centipoise (0.5 cP) to about 2 cP, or about 0.75 cP to about 1.5 cP, or about 1.0 cP, for this example). Accordingly, the heated molten waxy component 162 is preferably maintained at the desired temperature and/or viscosity during the waxy component infusion process.

Upon attaining the desired temperature and/or viscosity of the molten waxy component 162, the precursor log 150 can be placed into the container 170 of heated molten waxy component 162, preferably in a horizontal orientation, and allowed to absorb and adsorb the heated molten waxy component 162 for a suitable amount of time to achieve saturation (such as about 20 seconds, for this example) using a pair of tongs if necessary to rotate the precursor log 150 about its longitudinal axis $X_{150}$ to desirably obtain a generally even coverage throughout, thus forming a saturated incendiary log 152.

The saturated incendiary log 152 can then be removed from the container 170 using tongs or other suitable device, and one end of the externally extending support component 140 can be immediately (i.e., while the waxy component remains in a heated molten state, preferably within 10 seconds or less after removal from the container 170) securely attached to a spinning apparatus 856 (such as a standard power drill, in this example) and then rotated (such as at about 400 rounds-per-minute ("rpm") to about 500 rpm, or about 450 rpm, for this example). The spinning should continue only for enough time (such as about 1-2 seconds, for this example) such that the resulting centrifugal/inertial forces sufficiently remove excess waxy material that might otherwise inhibit air flow through the air passageways 112D (to ensure the invention functions suitably for its intended purpose), while retaining a sufficient amount of waxy component within the saturated incendiary log 152 (such as equal to a corrugated-to-waxy component ratio of about 40:60 to about 80:20 by weight, or about 60:40 by weight, for this example), wherein the waxy component 160 is preferably dispersed relatively consistently throughout, forming a spun incendiary log 154. Optionally, waxy material 160 discarded by the spinning process can be recovered (such as via a waxy material collection member 168, for example) and then re-used for making future embodiments of the invention (see e.g., FIG. 4H).

The spun incendiary log 154 can then be removed from the spinning apparatus 856 and immediately compressed inwardly as a single unit along its longitudinal axis $X_{154}$ from the distal ends $E_{154A}, E_{154B}$ toward the center point of the longitudinal axis $X_{154}$ (i.e., similar to compressing an accordion along a single axis), utilizing a force desirably sufficient to ensure each corrugated component 120 affirmatively contacts the adjacent corrugated component 120 disposed on either side (with exception to the corrugated components 120 located at the distal ends) on the one hand, while limiting such force to a compression of the length of the plurality of corrugated components 120 along the longitudinal axis (may also be referred to herein as "length compression") of about five-percent (5%) or less, relative to the length of the same stacked 822 plurality of corrugated components 120 along the longitudinal axis prior to compression (may also be referred to herein as "uncompressed length") on the other hand (such as a length compression of 0.25 in. (0.6 cm) to about 0.75 in. (1.9 cm), or about 0.5 in. (1.3 cm), for this example), thus forming a compressed stack 822' of corrugated components 120. Such compression can be provided via suitable compression apparatus (e.g., gloved hands, clamps, weights, pneumatics, hydraulics, etc.) (not shown) capable of applying a suitable force (such as about 5 lbf (2.3 kgf) to about 15 lbf (6.8 kgf), or about 10 lbf (4.5 kgf), for this example), and subsequently holding such compression at least until the waxy component has begun to set (such as for about 2 minutes to about 10 minutes, or about 5 minutes, for this example), to form a compressed incendiary log 156.

Upon release of the compression, the compressed incendiary log 156 can be oriented into a vertical position (i.e., wherein one distal end of the support component 140 is facing downward (generally towards the ground) and the other distal end of the support component 140 is facing upward (generally towards the sky). The vertically oriented compressed incendiary log 156 can then be placed onto a cooling apparatus 858 having a suitable supporting surface (e.g., solid surface which can accommodate the extending support component 140) while maintaining its vertical orientation, and allowed to cool at least until the molten waxy component 162 has solidified (e.g., to room temperature (i.e., about 21° C.), though it may be higher based on the composition of the waxy materials 160) (such as for about 1 hour to about 3 hours or more, or for about 2 hours, for this example) to form a cooled incendiary log 156 (see e.g. FIGS. 4Q-4R), thus forming a cooled incendiary log 158. In some aspects, additional means for cooling (e.g., airflow, refrigeration, etc.) can be utilized to decrease the cooling time. It should be understood that in some aspects, the compressed log 156 need not be placed in a vertical configuration, but rather can be positioned in any angular position, such as ranging from vertical to horizontal, without departing from the scope of the invention.

Upon cooling, one or more optional grooves 195, which can optionally have sufficient dimensions to suitably provide an additional air passageway and/or to receive and/or substantially secure an ignition component 190 (such as via frictional forces, though it need not be), can be disposed into the cooled incendiary log 158, to form a grooved incendiary log 159. Such grooves 195 can be configured to generally extend across the longitudinal axis for any desired distance between one end $E_{158A}$ of the cooled incendiary log 158 and the other end $E_{158B}$. Such a groove 195 can be cut (e.g., via saw blade, knife, router, etc.) into the cooled incendiary log 158 (e.g., providing length $L_{195}$, width $W_{195}$, and depth $R_{195}$ dimensions), drilled (e.g., via a drill bit, etc.) into the cooled incendiary log 158 (providing length $L_{195}$ and diameter $\phi_{195}$ dimensions), and the like (such as a single linear groove extending from one end $E_{158A}$ to the other end $E_{158B}$, having a length of about 15 in. (38 cm), a width of about 0.2 in. (0.5 cm) and a depth of about 1 in. (2.5 cm), for this example) (see e.g., FIG. 1A).

Regardless of whether any optional groove 195 is present, an ignition component 190 can be affixed to the cooled incendiary log 158 or grooved incendiary log 159 to form an inventive firestarter log 110 of the present invention. In the case of a cooled incendiary log 158 (i.e., no groove 195 present), the ignition component 190 can be affixed to the exterior of the log 158 via a suitable attachment means (e.g., adhesive, staples, tape, etc.). In the case of a grooved incendiary log 159, the ignition component 190 can be affixed to the exterior of the log 159 and/or within the groove 195 via a suitable attachment means (e.g., adhesive, friction, staples, tape, etc.) (such as by pressing the ignition component 190 into a groove 195 using a suitable pressing apparatus (e.g., a flathead screw driver, a putty knife, etc.) for this example). Preferably, the length of ignition component 190 will be suitable to allow for applying a flame to one end of the ignition component 190 (such as the ignition component 190 extending beyond one end $E_{110A}, E_{110B}$ of the log 110), as well as to sufficiently ignite the inventive firestarter log 110 (such as a fireworks fuse having a length of about 15.5 in. (39.4 cm) and an outer diameter of about 0.25 in. (0.6 cm) for a groove 195 having a length of about 15 in. (38.1 cm) and a width of about 0.25 in (0.6 cm), wherein the ignition component 190 can be held in place via friction, and can be configured such that one distal end $E_{190B}$ of the ignition component 190 is positioned adjacent to one distal end $E_{195B}$ of the groove 195, and the opposing distal end $E_{190A}$ of the ignition component 190 extends approximately 0.5 in. (1.3 cm) exterior to the opposing distal end $E_{195A}$ of the groove 195, for this example).

Continuing now with FIG. 7, and with additional reference to FIGS. 6A-6F, upon formation of the inventive firestarter log 110, an optional packaging component 210 can applied thereto. Such packaging component 210 can at least partially encompass the firestarter log 110. For example, a substrate of suitable packaging material (such as a sheet of blank newsprint paper having a length of about 30 in. (76 cm) and a width of about 19 in. (48 cm), for this example) can be laid flat on a suitable surface. The longitude $X_{110}$ of the firestarter log 110 can be centered along the width of the packaging 210 at one end $E_{210B}$ of the packaging length $L_{210}$, and then rolled onto the firestarter log 110, and folding the resulting end portions $E_{210C}, E_{210D}$ of the packaging 210 upon the ends $E_{110A}, E_{110B}$ of the firestarter log 110. One or more end portions $E_{210C}, E_{210D}$ of the packaging 210 can optionally be secured to the firestarter log 110 and/or the packaging itself via a suitable attachment component (e.g., adhesive, tape, etc.). In some aspects, the packaging 210 can include a release member 220 disposed thereon. Such release member 220 can extend at least partially upon the firestarter log 110, and can assist with removal of the packaging component 210 in a desired direction with respect to the firestarter log 110 (e.g., longitudinally, transversely, angularly, spirally, etc.). Preferably, an end portion $E_{220A}$ of the release member 220 will be disposed externally to the packaging component 210 to provide the user an opportunity for grasping the release member 220.

Continuing now with FIG. 7, and with additional reference to FIGS. 6G-6H, a plurality of firestarter logs 110 (with or without optional packaging 210) can optionally be grouped together to form a bundle 310 of firestarter logs 110. Such a bundle 310 can be secured by applying an optional bundling member 320 thereto (such as a length of baler twine tied around the bundle 310, for this example). Suitable bundling members 320, as will become apparent to those having skill in the art, can be utilized without departing from the scope of the invention.

Referring now to FIG. 8, illustrated is one non-limiting exemplary method for mass-producing inventive incendiary devices 100 of the present disclosure. For conciseness and non-limiting exemplary purposes only, the inventive incendiary device 100 will be described in the form of a firestarter log 110. Although the non-limiting exemplary mass production process 800 describes production of an inventive incendiary device 100 in the form of a firestarter log 110 for description purposes only, it should be understood that the mass production process 800 can be suitably modified, as will become apparent to persons having ordinary skill in the art, to produce incendiary devices 100 in any variety of forms, including but not limited to the various embodiments enumerated herein, without departing from the scope of the invention.

As illustrated in FIG. 8, the mass production process 800 described herein includes supplying various raw materials, including: corrugated stock 812, support component materials 840, optional fastener component materials 880, waxy materials 160, ignition component materials 890, optional packaging components 210 and optional bundling members 320. Such raw materials can be delivered as needed (e.g., just-in-time delivery) and/or in bulk, as may be desired.

FIG. 8 illustrates that suitable corrugated stock 812, preferably recycled corrugated materials (though it need not be), can be delivered via a bulk delivery system 892 (though it need not be). The corrugated stock 812 can then be transferred to an optional storage device 882 (further defined above) using a suitable transfer apparatus (further defined above) (not shown) to be stored until desired. Alternatively, the corrugated stock 812 can be fed directly from the delivery system 892 into the mass production process 800, such as by utilizing a just-in-time delivery system.

FIG. 8 also illustrates that suitable support component materials 840 can be delivered via a bulk delivery system 894 (though it need not be). The support component materials 840 can then be transferred to an optional storage device 884 using a suitable transfer apparatus (not shown) to be stored until desired. Alternatively, the support component materials 840 can be fed directly from the delivery system 894 into the mass production process 800, such as by utilizing a just-in-time delivery system.

FIG. 8 further illustrates that suitable optional fastener component materials 880 can be delivered via a bulk delivery system 898 (though it need not be). The fastener component materials 880 can then be transferred to an optional storage device 888 using a suitable transfer apparatus (not shown) to be stored until desired. Alternatively, the fastener component materials 880 can be fed directly from the delivery system 898 into the mass production process 800, such as by utilizing a just-in-time delivery system.

FIG. 8 further illustrates that suitable waxy materials 160, preferably recycled waxy materials (though it need not be), can be delivered via a bulk delivery system 896 (though it need not be). The waxy materials 160 can then be transferred to an optional storage device 886 using a suitable transfer apparatus (not shown) to be stored until desired. Alternatively, the waxy materials 160 can be fed directly from the delivery system 896 into the mass production process 800, such as by utilizing a just-in-time delivery system.

FIG. 8 also illustrates that suitable ignition component materials 890 can be delivered via a bulk delivery system 899 (though it need not be). The ignition component materials 890 can then be transferred to an optional storage device 889 using a suitable transfer apparatus (not shown) to be stored until desired. Alternatively, the ignition component materials 890 can be fed directly from the delivery system 899 into the mass production process 800, such as by utilizing a just-in-time delivery system.

Continuing with FIG. 8, and with additional reference to FIGS. 9A-9D, once the desired raw materials are present, the mass production method 800 can be initiated. A quantity of corrugated stock 812 can be transferred via a suitable transfer apparatus to an optional separator/stacking apparatus 872 which is capable of separating the corrugated stock 812 into at least a single sheet of corrugated material 112, or alternatively into a stack comprising a plurality of corrugated materials 112. Suitable separator/stacking apparatus will become apparent to persons having ordinary skill in the art. Non-limiting exemplary separator/stacking apparatus are described in U.S. Pat. No. 2,931,520 to Shields entitled "Accumulating and Straightening Device" filed Nov. 20, 1968; U.S. Pat. No. 3,601,265 to Shields entitled "Blank Stacking, Straightening and Delivery Means" filed Nov. 27, 1968; U.S. Pat. No. 4,325,475 to Spalding entitled "Method and Apparatus for Stacking" filed May 21, 1980; U.S. Pat. No. 4,957,409 to Fukao et al. entitled "Corrugated Cardboard Box Stacking Device in a Corrugated Cardboard Box Making Machine" filed Aug. 30, 1989; U.S. Pat. No. 5,018,334 to Guttinger et al. entitled "Carton Loading Machine Having Load Accumulator" filed Apr. 11, 1990; U.S. Pat. No. 5,044,874 to Shill entitled "Stack Dividing Mechanism for a Corrugated Sheet Unstacking and Feeding Apparatus" filed May 16, 1990; wherein the contents of each is hereby incorporated herein by reference in a manner that is consistent herewith.

The corrugated materials 112 can then be transferred via a suitable transfer device to a corrugated component forming apparatus 862. As illustrated in FIG. 8, the corrugated component forming apparatus 862 is capable of producing (such as by cutting, punching, etc.) a plurality of circular disks from each sheet of the corrugated material 112, each circular disk forming a corrugated component 120. Each corrugated component 120 can have any desired size and shape (such as a circular shape profile having a diameter of about 3 in. (7.6 cm), for this example). Accordingly, it should be understood that the corrugated components 120 can have other shape profiles and other dimensions without departing from the scope of the invention.

In some aspects, the corrugated component forming apparatus 862 can further be capable of disposing an aperture or hole 130 through each corrugated component 120, such as through the axial center portion C-C of each corrugated component 120 (though it need not be at the center) (such as a hole 130 having a circular shape profile with a diameter of approximately 0.25 in. (0.6 cm), for this example). However, it should be understood that the hole 130 can have other shape profiles and other dimensions without departing from the scope of the invention. Desirably, the hole 130 has dimensions that approximate the outer diameter $OD_{140}$ of the support component 140 (further discussed below) (though it need not be). Accordingly, in some aspects, the corrugated component forming apparatus 862 can comprise both a shape-forming element and a hole-forming element (though it need not be). In other aspects, one or more such holes 130 can be disposed into the corrugated components 120 via a separate process. Suitable methods for forming a corrugated component 120 and/or a hole 130 can include, but are not limited to, rotation, pneumatics, hydraulics, punch & die, mechanical cutting, laser cutting, slicing, sawing, drilling, and the like, as well as combinations thereof.

Suitable corrugated component forming apparatus and/or hole forming apparatus will become apparent to persons having ordinary skill in the art. Non-limiting exemplary corrugated component forming apparatus and/or hole forming apparatus are described in U.S. Pat. No. 6,592,693 to Nedblake entitled "Method and Apparatus for Laser Cutting of Adhesive-Bearing Webs Separate from Liner Webs" filed Aug. 23, 1972; U.S. Pat. No. 3,827,322 to Saunders et al. entitled "Ejection Member for Cutting Dies" filed Aug. 11, 2000; U.S. Pat. No. 3,850,064 to Dwyer entitled "Die for Cutting Stacked Sheet Material" filed Jan. 10, 1974; U.S. Pat. No. 3,946,627 to Hofmann entitled "Rotary Apparatus for Punching Apertures into Corrugated Board Material" filed Feb. 11, 1974; U.S. Pat. No. 4,522,095 to Saunders et al. entitled "Hole Punch for a Cutting Die" filed Sep. 21, 1982; U.S. Pat. No. 5,377,519 to Hayashi entitled "Punch and Die for Forming a Protrusion and a Pair of Slits in Sheet Material" filed Nov. 10, 1993; and U.K. Patent GB 2,318, 319 to Smithwick et al. entitled "A Method and Apparatus for Ejecting Cut Corrugated Cardboard from a Cutting Die" filed Apr. 22, 1998; wherein the contents of each is hereby incorporated herein by reference in a manner that is consistent herewith.

Corrugated components 120 can then be transferred via a suitable transfer device to a corrugated component accumulator/stacking apparatus 852. The accumulator/stacking apparatus 852 can collect and assemble a plurality of corrugated components 120 to form a corrugated component stack 822 having a first end $E_{822A}$, a second end $E_{822B}$ distal to the first end $E_{822A}$, a length $L_{822}$ defined therebetween, according to determined criteria (e.g., number of corrugated components, length of stack, etc.), a central axis S-S, an exterior surface 822A, and an interior volume 822B. For example, as illustrated in FIG. 8, the accumulator/stacking apparatus 852 can stack a plurality of corrugated components 120 to form a corrugated component stack 822 (such as a cylindrical shaped stack having a length of about 15.5 in. (39.4 cm) and a diameter of about 3 in. (7.6 cm), for this example). However, it should be understood that the stack 822 can have other shape profiles and dimensions without departing from the scope of the invention.

In some aspects, the accumulator/stacking apparatus 852 can then optionally load each stack 822 of corrugated components 120 into a storage carrier device capable of separately storing a plurality of stacks 822, thus creating a production buffer for the mass production process 800. Furthermore, the accumulator/stacking apparatus 852 can then separately unload each stack 822 of corrugated components 120 to a suitable transfer device for further processing within the mass production process 800 (such as to a support component assembly apparatus 864, for this example).

Suitable accumulator/stacking apparatus will become apparent to persons having ordinary skill in the art. Non-limiting exemplary accumulator/stacking apparatus are described in U.S. Pat. No. 3,762,582 to Barnhart et al. entitled "Transfer and Accumulating Apparatus" filed Jun. 6, 1972; U.S. Pat. No. 4,142,626 to Bradley entitled "Accumulator for Wound Paper Logs" filed Jun. 8, 1977; U.S. Pat. No. 4,159,761 to Egee et al. entitled "Cookie Dispensing Apparatus filed Nov. 4, 1977; U.S. Pat. No. 4,325,475 to Spalding entitled "Method and Apparatus for Stacking" filed May 21, 1980; and U.S. Pat. No. 4,383,600 to Southerling et al. entitled "Roll Product Accumulator" filed Apr. 2, 1980; wherein the contents of each is hereby incorporated herein by reference in a manner that is consistent herewith.

Continuing with FIG. 8, a quantity of support component materials 840 can be transferred via a suitable transfer device to a separator/cutting apparatus 874 which is capable of separating the support component materials 840 into at least a single support component element, and subsequently cutting the support component element into a desired length to form a support component 140 having a first end $E_{140A}$, a second end $E_{140B}$ distal to the first end $E_{140A}$, and a length $L_{140}$ defined therebetween. For example, as illustrated in FIG. 8, the separator/cutting apparatus 874 can cut a support component material 840 to form a support component 140 having a desired length and an outer diameter $OD_{140}$ (or other exterior dimensions depending upon the shape profile of the support component) that approximates the dimensions of the optional hole 130 in the corrugated components 120 (such as a cylindrical wood doweling having a length of about 19 in. (48.3 cm) and an outer diameter of about 0.25 in. (0.64 cm), for this example). However, it should be understood that the support component 140 can have other dimensions without departing from the scope of the invention. Suitable methods for cutting the support component 140 can include, but are not limited to, mechanical cutting, pneumatics, hydraulics, laser cutting, slicing, sawing, and the like, as well as combinations thereof.

Suitable separator/cutting apparatus will become apparent to persons having ordinary skill in the art. Non-limiting exemplary separator/cutting apparatus are described in U.S. Pat. No. 572,374 to Richards entitled "Rod-Cutting Apparatus" filed May 7, 1896; U.S. Pat. No. 992,845 to Brochu et al. entitled "Dowel-Cutting Machine" filed Nov. 5, 1910; U.S. Pat. No. 1,067,360 to McSorley et al. entitled "Sawing-Machine filed Aug. 21, 1911; U.S. Pat. No. 1,336,605 to Becker entitled "Automatic Wire-Blank-Cutting Apparatus filed Nov. 10, 1917; U.S. Pat. No. 2,529,018 to Hancharik entitled "Dowel Making Machine" filed Sep. 8, 1945; U.S. Pat. No. 3,292,470 to Daniuel et al. entitled "Orbital Saw" filed Oct. 18, 1965; U.S. Pat. No. 3,863,536 to Legardinier entitled "Cutting Guide for Machines for Producing Rods, Particularly for Cigarette Machines" filed Sep. 7, 1973; and U.S. Pat. No. 5,522,292 to Biagiotti entitled "Machine for Cutting Logs of Web Material" filed Feb. 22, 1994; wherein the contents of each is hereby incorporated herein by reference in a manner that is consistent herewith.

From the support component separator/cutting apparatus 874, each support component 140 can be transferred to a support component assembly apparatus 864 via a suitable transfer device. Simultaneously, a corrugated component stack 822 can also be transferred to the support component assembly apparatus 864 from the corrugated component accumulator/stacking apparatus 852, via a suitable transfer device. Upon entering the support component assembly apparatus 864, the support component 140 can be inserted into, and/or through, the optional holes 130 of the plurality of corrugated components 120 of the corrugated component stack 822 to form a precursor incendiary log 150, thus further ensuring alignment of the corrugated components 120 and integrity of the stack 822. Preferably, the length $L_{140}$ of the support component 140 is greater than the length $L_{822}$ of the corrugated component stack 822, such that upon insertion of the support component into the stack 822, the end portions $E_{140A}, E_{140B}$ of the support component 140 are disposed externally to the ends $E_{822A}, E_{822B}$ of the stack 822 (see e.g., FIG. 4A). Accordingly, the support component 140 can help secure the corrugated component stack 822 via frictional forces, although additional securing means (e.g., adhesives, etc.), as will become apparent to persons having ordinary skill in the art, can also be utilized without departing from the scope of the invention.

Suitable support component assembly apparatus will become apparent to persons having ordinary skill in the art. Non-limiting exemplary support component assembly apparatus are described in U.S. Pat. No. 3,507,029 to Stuckey et al. entitled "Apparatus for Inserting Coils and Slot Wedges into a Core Member" filed Oct. 2, 1967; U.S. Pat. No. 4,142,719 to Blood entitled "Golf Tee Insertion Device" filed Jan. 25, 1977; U.S. Pat. No. 4,180,195 to Caley et al. entitled "Rivet Delivery and Locating Apparatus" filed Jan. 16, 1978; U.S. Pat. No. 4,245,385 to Zemek et al. entitled "Radial Lead Component Insertion Machine" filed Jul. 9, 1979; and U.S. Pat. No. 6,527,773 to Lin et al. entitled "Cervical Dowel and Insertion Tool" filed Oct. 10, 2000; wherein the contents of each is hereby incorporated herein by reference in a manner that is consistent herewith. It should be understood that while a non-limiting exemplary support component 140 in the form of a wood doweling has been described herein, other types of support components, as will become apparent to persons having ordinary skill in the art, can also be suitable without departing from the scope of the invention.

Continuing with FIG. 8, a quantity of optional fastener component materials 880 can be transferred via a suitable transfer device to a fastener component separator apparatus 870 which is capable of separating the fastener component materials 880 into at least one fastener component 180. The optional fastener component 180 is capable of fastening and securing the precursor incendiary log 150, particularly the position of the support component 140 with respect to the corrugated component stack 822. As illustrated in FIG. 8, in some aspects, the fastener component 180 can be in the form of a circular pressure ring fastener comprising a hole 180A that can have a diameter $\phi_{180}$ which approximates the outer diameter $OD_{140}$ of the support component 140 (such as about 0.25 in. (0.64 cm), for this example (i.e., suitable for a support component 140 in the form of a cylindrical wood doweling having an outer diameter $OD_{140}$ of about 0.25 inch (0.64 cm)) (see e.g., FIGS. 3A, 3D, 3F and 3J). However, it should be understood that the fastener component 180 can have other shapes and dimensions without departing from the scope of the invention (see e.g., FIGS. 3E-3M).

Suitable fastener separator apparatus will become apparent to persons having ordinary skill in the art. Non-limiting exemplary fastener separator apparatus are described in U.S. Pat. No. 1,813,296 to Kidwell entitled "Coin Separator" filed Mar. 14, 1927; and U.S. Pat. No. 3,174,488 to Rau entitled "Coin Separating Machine" filed May 2, 1961; wherein the contents of each is hereby incorporated herein by reference in a manner that is consistent herewith.

From the fastener component separator apparatus 870, each optional fastener component 180 can be transferred to a fastener component assembly apparatus 868 via a suitable transfer device. Simultaneously, a precursor incendiary log 150 (i.e., a corrugated component stack 822 comprising an inserted support component 140) can also be transferred to the fastener component assembly apparatus 868 from the support component assembly apparatus 864 via a suitable transfer device. Upon entering the fastener component assembly apparatus 868, at least one fastener component 180 can be applied to one or both end portions $E_{140A}, E_{140B}$ of the support component 140 such that each fastener component 180 is disposed generally coplanar with, and preferably abuts against, each end $E_{822A}, E_{822B}$ of the corrugated component stack 822 (with the support component end portions $E_{140A}, E_{140B}$ extending through the opening 180A of each respective fastener component 180), thus further ensuring alignment of the core component 140 and integrity of the precursor incendiary log 150.

Suitable fastener component assembly apparatus will become apparent to persons having ordinary skill in the art. Non-limiting exemplary fastener component assembly apparatus are described in U.S. Pat. No. 4,078,357 to Ida entitled "Method and Apparatus for Inserting and Fastening an Adhesive-Coated Ring into a Group of Four Cans" filed Jan. 14, 1977; U.S. Pat. No. 5,174,680 to Nakamura et al. entitled "Fastening Apparatus for a Shaft and a Wheel or Wheel-Like Body" filed Oct. 11, 1991; and U.S. Pat. No. 5,881,452 to Nowell, III et al. entitled "Apparatus for Applying Deformable Metal Fastener Clips to Concrete Reinforcement Steel and the Like" filed on Nov. 5, 1997; wherein the contents of each is hereby incorporated herein by reference in a manner that is consistent herewith.

As illustrated in FIG. 8, the precursor incendiary log 150 comprising optional fastener components 180 can be transferred via a suitable transfer device to a waxy component infuser apparatus 900 for further processing in the mass production process 800.

Continuing with FIG. 8, a quantity of waxy material 160 can be transferred via a suitable transfer device to a waxy component infuser apparatus 900 which can be capable of, inter alia, heating the waxy material 160 to a desired temperature, melting the waxy material 160 into a molten waxy component 162, further heating the molten waxy component to a desired temperature and/or viscosity, maintaining the heated molten waxy component 162 at the desired temperature and/or viscosity, infusing the heated molten waxy component 162 into the precursor incendiary log 150 to form a saturated incendiary log 152, and the like. The waxy materials 160 can be in the form of solid materials, semi-solid materials, liquid materials, as well as combinations thereof.

In some aspects, prior to entering the waxy component infuser apparatus 900, the waxy material 160 can be transferred via a suitable transfer device to an optional waxy component pre-heating apparatus 885 which can be capable of pre-heating the waxy materials 160 from a first temperature to a higher second temperature. Such second temperature may or may not be the same temperature intended for the waxy component infuser apparatus 900. In some desirable aspects, the optional waxy component pre-heating apparatus 885 can provide enough heat to form (or maintain) the waxy material 160 into a molten waxy material 162 form.

In some aspects, prior to entering the waxy component infuser apparatus 900, the waxy material 160 can be transferred via a suitable transfer device to an optional waxy component filtration apparatus 887 which can be capable of separating out at least some impurities or other such undesirable constituents. The type of filtration apparatus 887 will become apparent to persons having ordinary skill in the art, and will depend at least partly upon the type and form of waxy material that is to be filtered, as well as upon the types of constituents intended to be filtered out of the waxy material 160. For example, in the case of solid or semi-solid waxy materials, perforated or mesh screens (e.g., sifters, etc.) may be preferable, whereas in the case of liquid or molten waxy material, filter mediums, filter substrates (e.g., filter papers, strainers, mesh, etc.), foams, sponges, centrifugal filters, and the like may be preferable.

Upon entering the waxy component infuser apparatus 900, the waxy material 160 can be heated to and/or maintained at a desired temperature and/or viscosity in preparation for infusing the molten waxy material 162 into a precursor incendiary log 150. The desired temperature of the molten waxy material 162 will depend upon a number of variables, including waxy component composition, waxy material melting point, waxy component flash point, waxy component purity, presence and type of volatile organic compounds (VOC's), desired molten waxy material viscosity, precursor incendiary log 150 material (i.e., corrugated component 120) composition, and the like. However, desirable temperatures can typically be in the range of about 250° F.-400° F. (120° C.-205° C.), such as about 275° F.-350° F. (135° C.-175° C.), or about 300° F.-325° F. (145° C.-165° C.), for example.

Referring now to FIGS. 10A-10D, illustrated is one non-limiting exemplary embodiment of a waxy component infuser apparatus 900 suitable for infusing heated molten waxy material 162 into a precursor incendiary log 150. The illustrated waxy component infuser apparatus 900 comprises at least a container member 910, a strainer member 920 and a heating member 930.

The illustrated container member 910 has a generally cubicle shape in this non-limiting example, having a first side 914, a second side 913, a front side 915, a back side 916, a bottom side 912, and a top side 911, wherein the top side 911 has a generally open configuration. The container member 910 has a length $L_{910}$, a width $W_{910}$ and a height $H_{910}$, which combine to form an interior volume $V_{910}$.

Proximate or adjacent to the bottom side 912 of the container member 910 is a heating member 930. The illustrated heating member 930 comprises a manifold 936 from which a plurality of tubular heating elements 930A generally extend along the length $L_{910}$ of the container member 910. The heating member 930 further comprises at least one inlet 932 shown as having an opening 934 through which a heat energy 940 source can enter. Suitable heat energy sources will become apparent to persons having ordinary skill in the art, and can include fuels or other exothermic chemicals (e.g., natural gas, propane, butane, etc.), heated steam, electricity, and the like, as well as combinations thereof. Preferably, the waxy component infuser apparatus 900 includes a control module (not shown) for regulating the amount of heat generated by the heating member 930

Continuing with FIGS. 10A-10D, the waxy component infuser apparatus 900 can also comprise at least one additional opening 950. Benefits of such at least one additional opening 950 will become apparent to persons having ordinary skill in the art, and can include an overflow outlet (e.g., to maintain molten waxy material level within the waxy component infuser apparatus 900), a recirculation inlet (e.g., to recover waxy materials 160 from the spinning apparatus 856), a waxy material 160 or molten waxy material 162 inlet (e.g., to fill or replenish the waxy component infuser apparatus 900), a ventilation opening, and the like, as well as combinations thereof.

Continuing with FIGS. 10A-10D, the illustrated waxy component infuser apparatus 900 further comprises a strainer member 920. The strainer member 920 has a generally cubicle shape, having a first side wall 954, a second side wall 953, a front side wall 955, a back side wall 956, and a bottom side wall 952, wherein the walls 952,953,954, 955,956 have an at least partially open configuration (to allow molten waxy component 162 to drain through while containing the precursor incendiary log 150 and/or saturated incendiary log 152) and a top side 951, wherein the top side 951 has a substantially open configuration. The strainer member 920 has a length $L_{920}$, a width $W_{920}$ and a height $H_{920}$, which combine to form an interior volume $V_{920}$. Preferably, the interior volume $V_{920}$ of the strainer member 920 is less than the interior volume $V_{910}$ of the container member 910, such that the strainer member 920 can fit inside the container member 910.

The strainer member 920 can be utilized to form a saturated incendiary log 152 by placing a precursor incendiary log 150 into the interior volume $V_{920}$ of the strainer member 920, immersing the log 150 into a quantity of heated molten waxy component 162 contained within the container member 910 (e.g., for a determined amount of time, preferably until saturated), and then removing the saturated log 152 from the molten waxy component 162, while allowing excess molten waxy material 162 to drain from the log 152 (preferably back into the container member 910, though it need not be). Accordingly, the strainer member 920 is desirably configured to hold at least one precursor incendiary log 150 (and in some desirable aspects, a plurality of precursor incendiary logs 150).

In addition, at least one of the walls 952,953,954,955,956 of the strainer member 920 comprises at least one opening 924 (and in some desirable aspects, a plurality of openings) which holds the saturated incendiary log 152 while allowing excess molten waxy material 162 to drain from the saturated incendiary log 152 and pass through the opening(s) 924. Accordingly, the at least one opening 924 is preferably located upon the bottom side wall 952, first side wall 954, second side wall 953, front side wall 955 and/or back side wall 956 of the strainer member 920. In one non-limiting exemplary embodiment, the strainer member 920 comprises a stainless-steel wire mesh substrate. However, it should be understood that numerous other forms of openings 924, as well as construction materials, as will become apparent to persons having ordinary skill in the art, are also suitable for the strainer member 920 without departing from the scope of the invention.

In addition, the strainer member 920 can optionally comprise at least one positioning device 925 which can enable movement of the strainer member 920 by a suitable movement apparatus (e.g., hoist, crane, hand, etc.) (not shown), such as lowering the strainer member 920, raising the strainer member 920, re-orientation, movement from a first location to a second location, and the like. Suitable positioning devices 925 will become apparent to persons having ordinary skill in the art, and can include handles 926, brackets 928, and the like, as well as combinations thereof.

Although FIGS. 10A-10D illustrate a partial batch process, it should be understood that the waxy component infuser apparatus 900 of the mass production process 800 can be configured as a continuous process without departing from the scope of the invention. Suitable continuous process configurations will become apparent to persons having ordinary skill in the art, and can include a perforated conveyor which directs each precursor incendiary log 150 through a suitable quantity of molten waxy material 162 to form a saturated incendiary log 152, and the like, for example.

Continuing with FIG. 8, and with additional reference to FIGS. 10A-10D, from the waxy component infuser apparatus 900, the saturated incendiary log 152 can then be transferred via a suitable transfer device to a process for removing excess waxy material 160, such as a spinning apparatus 856. The spinning apparatus 856 can be capable of, inter alia, axially rotating the saturated incendiary log 152 at a desired revolutions per minute (rpm) for a desired amount of time, which leverages the centrifugal and inertial forces created to remove excess waxy material 160 from the saturated incendiary log 152, to form a spun incendiary log 154. The desired spin rate and spin time will depend upon numerous variables, such as waxy component composition, waxy component viscosity, incendiary log composition, incendiary log configuration, air passageway 112D dimensions, and the like. For example, a saturated incendiary log 152 comprising circular double-walled corrugated components 120 having a diameter of about 3.0 in. (7.6 cm) and a log length of about 15.5 in. (39.4 cm) that has been infused with substantially paraffin molten waxy material 162 at a temperature of about 310° F. (154° C.) can be spun at about 400 rpm to about 500 rpm, such as about 425 rpm to about 475 rpm (such as about 450 rpm, for this example), for about 1 sec to about 10 sec, such as about 1 sec to about 5 sec or more, or about 1 sec to about 3 sec (such as about 2 sec, for this example) to form a spun incendiary log 154. Preferably, the excess waxy material 160 is removed while such waxy material is in a molten state 162 from the waxy component infuser apparatus 900 (such as within about 10 sec after removal of the saturated incendiary log 152, for this example). The amount of waxy material 160 removed will depend upon numerous variables, such as desired incineration rate, waxy component composition, waxy component viscosity, incendiary log composition, incendiary log configuration, desired airflow, and the like. Preferably, the amount of waxy material 160 removed from the saturated incendiary log 152 is sufficient to remove excess waxy material that might otherwise inhibit airflow through the air passageways 112D (to ensure the invention functions suitably for its intended purpose), while retaining a sufficient amount of waxy component within the resulting inventive incendiary log 110 to ensure suitable incineration. For example, in some aspects, it can be desirable to remove an amount of excess waxy material such that the quantity of waxy material 160 remaining in the inventive incendiary log 110 is at least about 10 wt %, such as at least about 25 wt %, or at least about 40 wt %, or at least about 60 wt %, or between about 20 wt % and 150 wt %, or between about 30 wt % and 100 wt %, or between about 40 wt % and 80 wt %.

Suitable spinning apparatus will become apparent to persons having ordinary skill in the art, and can include driven belts, centrifuges, lathes, axles, drilling means (e.g., by attaching to the support component 140), and the like. Other non-limiting exemplary spinning apparatus are described in U.S. Pat. No. 3,492,698 to Geary, Jr. et al. entitled "Centrifugal Casting Apparatus for Forming a Cast Wall Member Extending Transversely Across an Elongated Bundle of Substantially Parallel Hollow Filaments of a Fluid Permeation Separation Apparatus" filed on Dec. 22, 1965; U.S. Pat. No. 5,538,199 to Biagiotti entitled "Rewinding Machine for Coreless Winding of a Log of Web Material with a Surface for Supporting the Log in the Process of Winding" filed Feb. 9, 1994; U.S. Pat. No. 5,660,350 to Byrne et al. entitled "Method of Winding Logs with Different Sheet Counts" filed on Oct. 10, 1996; and U.S. Pat. No. 7,000,864 to McNeil et al. entitled "Consumer Product Winding Control and Adjustment" filed Jun. 10, 2002; wherein the contents of each is hereby incorporated herein by reference in a manner that is consistent herewith. In some aspects, the molten waxy component 162 removed from the saturated incendiary log 152 can be recovered and recycled within the manufacturing process 800, such as via a recirculation line 960, which can extend from the spinning apparatus 856 to the waxy component infuser apparatus 900.

Continuing with FIG. 8, from the spinning apparatus 856, the spun incendiary log 154 can then be transferred via a suitable transfer device to a process for compressing the incendiary log, such as a compression apparatus 875, to form a compressed corrugated component stack 822'. Desirably, such process is initiated while the waxy component 160 remains in a molten or semi-molten waxy component 162 state. The compression apparatus 875 can be capable of, inter alia, compressing the spun incendiary log 154 inwardly along its longitudinal axis from the distal ends $E_{822A}, E_{822B}$ of the corrugated component stack 822 toward the center point of the stack 822 (i.e., from a first length $L_{822}$ to a lesser new length $L_{822'}$) for a desired amount of time (e.g., typically until the molten waxy component 162 begins to set). Desirably, such compression utilizes a compressive force sufficient to ensure each corrugated component 120 affirmatively contacts the adjacent corrugated component 120, such as a length compression of about 10% or less, such as about 5% or less, or between about 2% and 8% (relative to the length of the same plurality of corrugated components 120 along the longitudinal axis prior to compression) (such as a length compression of about 0.25 in. (0.6 cm) to about 0.75 in. (1.9 cm), or about 0.5 in. (1.3 cm), for this example) (i.e., the compressed corrugated stack 822' having a length $L_{822'}$ of about 15 in. (38 cm), for this example). Accordingly, such compression can be provided by a suitable compression apparatus capable of applying a suitable force (such as about 1 lbf (0.5 kgf) to about 20 lbf (9.1 kgf), or about 5 lbf (2.3 kgf) to about 15 lbf (6.8 kgf), or about 10 lbf (4.5 kgf), for this example), and then subsequently maintaining such compressive force at least until the waxy component has begun to set (such as for about 1 min to about 20 min, or about 2 min to about 10 min, or about 5 min, for this example), to form a compressed incendiary log 156. Suitable compression apparatus will become apparent to persons having ordinary skill in the art, and can include gloved hands, clamps, weights, pistons, springs, hydraulics, pneumatics, and the like.

Continuing with FIG. 8, from the compression apparatus 875, the compressed incendiary log 156 can then be transferred via a suitable transfer device to a process for cooling the log, such as a cooling apparatus 876, to form a cooled incendiary log 158. In some desirable aspects, such cooling process can be conducted while the compressed incendiary log 156 is disposed in a substantially vertical orientation (i.e., the longitudinal axis is inverted from a horizontal orientation along the X-axis 1 (in the x-y plane) to a vertical orientation along the Z-axis 3) to prevent migration of the molten waxy component 162 towards an exterior surface of the log, though it need not be. In such aspects, the cooling apparatus 876 can be capable of, inter alia, accepting and maintaining the compressed incendiary log 875 in a substantially vertical orientation. Accordingly, suitable cooling apparatus for such aspects 876 can comprise a depression or aperture which can accommodate the support component 140 which extends from either end $E_{822A}, E_{822B'}$ of the compressed corrugated component stack 822'. Desirably, the cooling apparatus 876 (regardless of log orientation) can stow the compressed incendiary log 156 for a desired amount of time (e.g., typically until the molten waxy component 162 has converted to a substantially solid waxy component 160) (such as at least about 15 minutes, or at least about 30 min, or at least about 1 hour, or at least about 3 hours, or more), typically until the compressed incendiary log has reached about room temperature (such as about 70° F. (21° C.), for this example), though it need not be. In some aspects, the cooling apparatus 876 can comprise an additional cooling source which can accelerate the cooling process, such as via air currents, forced air, cooled air, and the like, as well as combinations thereof. Suitable cooling apparatus will become apparent to persons having ordinary skill in the art, and can include conveyors, accumulators, clamps, pegboards, hangers, refrigeration units, air conditioners, and the like.

Continuing with FIG. 8, from the cooling apparatus 876, the cooled incendiary log 158 can then be transferred via a suitable transfer device to a process for forming an optional groove 195, such as via a groove forming apparatus 878. The a groove forming apparatus 878 can be capable of, inter alia, cutting or drilling an optional groove 195 into the compressed corrugated component stack 822', such as into the exterior surface 822" of the compressed corrugated component stack 822'. The optional groove 195 can be disposed along at least a portion of the length $L_{822'}$ and/or circumference of the compressed corrugated component stack 822'. Accordingly, depending upon its configuration, the length $L_{195}$ of the groove 195 can be less than, equal to, or greater than, the length $L_{822'}$ of the compressed corrugated component stack 822'. In one non-limiting exemplary embodiment, the groove 195 can have a length $L_{195}$ disposed along substantially the entire length $L_{822'}$ of the corrugated component stack 822. In other aspects, the groove 195 can be disposed upon at least a portion of the 360° periphery of the compressed corrugated component stack 822'. In addition, the groove 195 can be linear or nonlinear. Furthermore, the groove 195 can be continuous or non-continuous.

When present, the optional groove 195 can also have a width $W_{195}$ as measured orthogonally to the length $L_{195}$ of the groove 195 (or a diameter $\phi_{195}$, depending on the configuration of the groove 195). In some desirable aspects, the width $W_{195}$ (or diameter $\phi_{195}$) of the groove 195 can be preferably generally uniform, though it need not be. For example, the width $W_{195}$ of the groove 195 may be approximately equal to the thickness (e.g., diameter $\phi_{190}$) of the ignition component 190 (discussed further below), such as about 1 millimeter (mm), or about 2 mm, or about 3 mm, or more.

When present, the optional groove 195 can also have a depth $R_{195}$ (depending on the configuration of the groove 195) as measured from the exterior surface 822" into the interior 822''' (i.e., toward the central axis T-T) of the compressed corrugated component stack 822'. The depth $R_{195}$ of the groove 195 is preferably generally uniform, but need not be. The depth $R_{195}$ of the groove 195 can range anywhere from one exterior surface 110A of the firestarter log 110 to the opposing distal exterior surface 110A (i.e., the opposite side) of the log, preferably between one exterior surface 110A of the log 110 to the center of the log 110. For example, the depth $R_{195}$ of the groove 195 may be at least equal to the thickness (e.g., diameter) of the ignition component 190, such as about 1 millimeter (mm), or about 2 mm, or about 3 mm, or about 5 mm, or about 7 mm, or about 10 mm, or more. Suitable groove forming apparatus 878 will become apparent to persons having ordinary skill in the art, and can include, but are not limited to, routers, saw blades, drills, knife blades, files, and the like.

Continuing with FIG. 8, a quantity of ignition component materials 890 can be transferred via a suitable transfer device to an ignition component cutting apparatus 879 which is capable of isolating a single strand of the ignition component material 890 (e.g., by unwinding the ignition material 890 from a spool, by separating one strand from a plurality of strands, etc.) and then cutting the strand of ignition component material 890 into a predetermined length, to form an ignition component 190 having a length $L_{190}$ defined by a first end $E_{190A}$, and an opposing second end $E_{190B}$ distal to the first end $E_{190A}$. The ignition component 190 is capable of initiating incineration of the inventive incendiary log 110, such as by contacting the ignition component 190 with a flame. In addition, the ignition component 190 is also capable of distributing the incineration energy generally evenly along at least a portion of a length $L_{110}$ of the incendiary log 110. In some aspects, it may be preferred that an end portion of the ignition component 190 protrudes externally from one end the inventive incendiary log 110. For example, the ignition component 190 can protrude externally by about 0.25 in. (0.64 cm), such as about 0.50 in. (1.27 cm), or 1.00 in. (2.54 cm), or 2.00 in. (5.08 cm), or more, as desired. Thus, in aspects wherein the incineration energy is intended to be distributed along an entire length $L_{110}$ of the incendiary log 110, the length $L_{190}$ of the ignition component 190 will preferably be greater than the length $L_{110}$ of the inventive incendiary log 110. Suitable methods for cutting the ignition component material 890 to form an ignition component 190 will become apparent to persons having ordinary skill in the art and can include, but are not limited to, mechanical cutting, pneumatic cutting, hydraulic cutting, laser cutting, slicing, sawing, and the like, as well as combinations thereof.

In some aspects, the ignition component 190 can be in the form of a fuse material, such as canon fuse or fireworks fuse. However, it should be understood that the ignition component 190 can comprise any suitable ignition source, as will become apparent to persons having ordinary skill in the art, without departing from the scope of the invention.

As illustrated in the example of FIG. 8, from the ignition component cutting apparatus 879, each ignition component 190 can be transferred to an ignition component assembly apparatus 869 via a suitable transfer device. Simultaneously, a grooved incendiary log 159 (or cooled incendiary log 158 if no optional groove 195 is present) can also be transferred to the ignition component assembly apparatus 869 from the optional groove forming apparatus 878 (or from the cooling apparatus 876 if no optional groove is present) via a suitable transfer device. Upon entering the ignition component assembly apparatus 869, the grooved incendiary log 159 can be positioned such that the groove 195 and ignition component 190 are generally aligned, whereupon the ignition component 190 can be inserted into the groove 195 (if present) and/or applied to the exterior surface 822" of the compressed corrugated component stack 822' of the cooled incendiary log 158, as desired, to form an inventive incendiary log 110 of the present disclosure. In some aspects, at least a portion of the ignition component 190 can be at least partially affixed to the exterior surface 822" of the compressed corrugated component stack 822', such as via an adhesive, hook-and-loop, ultrasonic, and the like, as well as combinations thereof. In some aspects, at least a portion of the ignition component 190 can be at least partially affixed within the optional groove 195 (if present), such as via friction, an adhesive, hook-and-loop, ultrasonic, and the like, as well as combinations thereof. In some aspects, the ignition component 190 can be only partially disposed within an optional groove 195, such that an air space is present both above and below the ignition component 190, for improved results. Suitable means for affixing an ignition component 190 onto the exterior surface 822" of the compressed stack 822', or into an optional groove 195, will become apparent to persons having ordinary skill in the art, and can include hands, blades, wedges, air, and the like.

Continuing with FIG. 8, from the ignition component assembly apparatus 869, the inventive incendiary log 110 can then be transferred to an optional log accumulator apparatus 850. The optional log accumulator apparatus 850 can serve as a production storage buffer for the mass production process 800. Suitable log accumulator apparatus will become apparent to persons having ordinary skill in the art. Non-limiting exemplary log accumulator apparatus are described in U.S. Pat. No. 4,142,626 to Bradley entitled "Accumulator for Wound Paper Logs" filed Jan. 8, 1977; U.S. Pat. No. 4,383,600 to Southerling et al. entitled "Roll Product Accumulator" filed Apr. 2, 1980; U.S. Pat. No. 5,960,927 to Bahr entitled "Apparatus for Providing a Buffer between Article-Handling Devices" filed Apr. 30, 1997; and U.S. Pat. No. 6,840,368 to Betti et al. entitled "Accumulator for Elongated Products, Such As Tubes and the Like" filed Jun. 21, 2002; wherein the contents of each is hereby incorporated herein by reference in a manner that is consistent herewith.

Continuing with FIG. 8, once formed, the inventive incendiary log 110 of the present disclosure can be transferred to an optional packaging apparatus 821 via a suitable transfer device. The packaging apparatus 821 can apply desired packaging component materials 210 to at least a portion of an individual incendiary log 110, thus forming an incendiary log 110 comprising a packaging component 210. Exemplary packaging apparatus which may be suitable for such application are described in U.S. Pat. No. 1,816,085 to Langhammer entitled "Wrapping Machine and Process" filed Mar. 25, 1930; U.S. Pat. No. 6,098,371 to Cassoli et al. entitled "Automatic Machine for the Individual Packaging of Rolls of Paper or Similar Cylindrical Products" filed Jun. 24, 1998; and U.S. Pat. No. 6,865,862 to Daoust et al. entitled "Log Bander Apparatus and Method" filed May 1, 2003; wherein the contents of each is hereby incorporated herein by reference in a manner that is consistent herewith. Other suitable packaging apparatus 821 will become apparent to persons having ordinary skill in the art, without departing from the scope of the invention.

Continuing with FIG. 8, a plurality of inventive incendiary logs 110 can be transferred (such as from the optional packaging apparatus 821, if present) to an optional bundle packaging apparatus 831 via a suitable transfer device. The bundle packaging apparatus 831 can group together a plurality of inventive firestarter logs 110 to form a bundle 310, and then apply a desired bundling member 320 to at least a portion of the bundle 310. Thus, multiple incendiary logs 110 can be provided in a single bundle 310. Exemplary bundle packaging apparatus which may be suitable for such application are described in U.S. Pat. No. 3,762,582 to Barnhart entitled "Transfer and Accumulating Apparatus" filed Jun. 6, 1972; U.S. Pat. No. 3,986,319 to Puskarz et al. entitled "Wrap-Around Packer" filed Jul. 3, 1974; U.S. Pat. No. 4,078,363 to Ranzi entitled "Machine for Wrapping Articles in Stretchable Film" filed Feb. 7, 1977; U.S. Pat. No. 4,679,379 to Cassoli entitled "Automatic Bundling Machine" filed Sep. 13, 1983; and U.S. Pat. No. 5,604,961 to Cole entitled "Multiple Purpose Fastening Device, System and Method" filed Jul. 11, 1995; wherein the contents of each is hereby incorporated herein by reference in a manner that is consistent herewith. Other suitable bundle packaging apparatus 821, as well as suitable bundling members 320, will become apparent to persons having ordinary skill in the art, without departing from the scope of the invention.

The invention also includes a method of incineration. For the purpose of conciseness and brevity, the described method herein is directed to building a stacked wood fire (such as for campfires, bonfires, fireplaces, fire pits, wood-burning stoves, etc.). However, it should be understood that variations of the form of the fire, along with the materials utilized to fuel the fire, as will become apparent to persons having ordinary skill in the art, can also be utilized without departing from the scope of the invention.

For comparison purposes, traditional methods of starting and building a stacked wood fire are time-consuming, unreliable, frustrating, and often dangerous. Prior to attempting to ignite and build such a fire using traditional methods, at least three (3) basic items must first be gathered and properly arranged: tinder, kindling and wood blocks. A typical method for building a traditional stacked wood fire includes the following steps:

1. Obtain and prepare tinder. As used herein, the term "tinder" refers to a precursor fuel that catches the initial flame from an ignition source, such as paper, cardboard, wood shavings, lighter fluid, and the like, as well as combinations thereof. It is essential that any such tinder is utilized in a dry state. Dry newsprint paper tinder is most typically utilized for wood block fires.
2. Obtain and prepare kindling. As used herein, the term "kindling" refers to an intermediary fuel comprised of substantially thin cut wood. Accordingly, such kindling must be chopped (e.g., via hatchet, ax, etc.), or otherwise cut, into relatively small pieces (as compared to wood blocks), typically having a width or diameter of less than 1 in. (2.5 cm). It is essential that any such kindling is utilized in a dry state (i.e., not damp, wet or green).
3. Obtain and prepare wood blocks. As used herein, the term "wood blocks" refers to a primary fuel comprised substantially of sections of wood derived from trees. Accordingly, such wood blocks must be cut (e.g., via chain saw, ax, etc.), and in some cases further split (e.g., via log splitter, ax, etc.), to pre-determined dimensions (such as a length of less than about 16 in. (41 cm) and a diameter of less than about 8 in. (20 cm), for example). It is essential that any such wood blocks are utilized in a dry state (i.e., not damp, wet or green).
4. Separate the dry newsprint paper tinder into individual sheets.
5. Crumple the individual sheets of newsprint paper tinder into compact ball-like structures.
6. Place the ball-like structured tinder into a general pile within a suitable burning location.
7. Place a suitable amount of kindling onto the pile of crumpled balls, carefully arranged into a teepee-style configuration, to help promote airflow into the kindling to enhance ignition and to help maintain continued incineration of the kindling once the tinder has been consumed.
8. Ignite the tinder with a flame from an ignition source (e.g., match, butane lighter, etc.)
until a suitable enduring flame is present.
9. Allow the flame to consume the tinder while ensuring that the flame transfers to the kindling.
10. Allow the kindling to burn such that a suitable enduring flame is present which can be maintained, even upon repositioning of the kindling arrangement.
11. Place a plurality of wood blocks onto the burning kindling while ensuring that the flame transfers to the wood blocks. The wood blocks may need to be repositioned periodically using a suitable instrument (e.g., poker, crow bar, etc.) to adjust air availability, to ensure the flame properly transfers to the wood blocks from the kindling, and to ensure the flame endures upon the wood blocks.
12. Allow the wood blocks to incinerate until consumed (or until the stacked wood fire is no longer desired).
13. Ensure the stacked wood fire is properly terminated when finished, using good fire handling practices.

Such traditional steps for building a stacked wood fire set forth above are presented having the best conditions in mind. Unfortunately, even under the best of conditions, many such stacked wood fires fail at least on the first attempt, and often fail on one or more subsequent attempts as well. Furthermore, many stacked wood fires are attempted without having such ideal conditions present (e.g., damp or wet constituents, green wood, improper arrangements, insufficient airflow, etc.). Indeed, many wood fires are attempted without much planning whatsoever, and rather, often occur on the spur of a moment (e.g., a family campfire, a neighborhood bonfire, a fireplace for visitors, etc.). As a result, many people will forego the efforts of obtaining the ideal conditions (if such are even available) and instead will use whatever happens to be present, or that can be readily found within the given circumstances, for exerting their efforts to build a fire. However, such efforts often become an exercise in futility. Indeed, persons having ordinary skill in the art will appreciate that many factors can affect the success of traditional fire building methods, including but not limited to, weather conditions, the amount and condition of combustible materials available, the experience of the user, etc.

In contrast to the traditional methods of incineration, such as building a stacked wood fire, the method of the present invention comprises significantly less steps, and further results in comparatively higher rates of success. For example, prior to attempting to ignite and build a comparative stacked wood fire, only two (2) basic items must first be obtained using the inventive method herein: an inventive firestarter log 110 of the present disclosure, and wood blocks. Accordingly, an inventive method for building a stacked wood fire includes the following steps:
1. Obtain an inventive firestarter log 110 of the present invention. Unlike the tinder and kindling of traditional methods, it is irrelevant whether the firestarter log 110 is dry, damp or wet.
2. Obtain and prepare wood blocks. Such wood blocks can be cut (e.g., via chain saw, ax, etc.) into predetermined section lengths, though it need not be. In addition, unlike traditional methods, it is unnecessary to further split the sections into a pre-determined diameter or width dimensions. It is also unnecessary that such wood blocks are dry.
3. Place the inventive firestarter log 110 within a suitable burning location.
4. Place a plurality of wood blocks onto the inventive firestarter log 110 in any suitable arrangement.
5. Ignite the inventive firestarter log 110 by contacting the ignition component 190 with a flame from an ignition source (e.g., match, butane lighter, etc.).
6. Allow the wood blocks to incinerate until consumed (or until the stacked wood fire is no longer desired).
7. Ensure the stacked wood fire is properly terminated when finished, using good fire handling practices.

Thus, it can be seen that the inventive method for incineration, such as building a stacked wood fire, reduces the steps required by the traditional method from 13 steps to only 7 steps. In addition, since the inventive incendiary devices 100 of the present disclosure are substantially saturated with a hydrophobic waxy component 160, the need for dry conditions is eliminated (i.e., the inventive incendiary devices 100 of the present disclosure, such as an inventive incendiary log 110, can be utilized when dry, damp, wet, or even in the rain). Furthermore, since the inventive incendiary devices 100 of the present disclosure are designed to burn for a predetermined amount of time (such as 30-45 min, for example), the need for tinder, kindling, dry constituents, particular constituent dimensions, particular constituent arrangements, user experience, and the like, are also eliminated. Thus, in a most basic sense, the simple "stack, light and burn" nature of the inventive method for incineration solves the age-old problem of incineration, such as building stacked wood fires, in a novel, more user-friendly, cost-effective, and more reliable way.

In some aspects, since the inventive incendiary devices 100 of the present disclosure are designed to burn for a predetermined amount of time, they can even be utilized alone, without any other materials whatsoever. In such aspects, using the non-limiting embodiment of a firestarter log 110, the inventive method of incineration can comprise the following steps:
1. Obtain an inventive firestarter log 110 of the present invention.
2. Place the inventive firestarter log 110 within a suitable burning location.
3. Ignite the inventive firestarter log 110 by contacting the ignition component 190 with a flame from an ignition source (e.g., match, butane lighter, etc.).
4. Allow the firestarter log to incinerate until consumed (or until the fire is no longer desired).
5. Ensure the inventive firestarter log 110 incineration is properly terminated when finished, using good fire handling practices.

In such aspects, it can be seen that the inventive method for incineration, such as the equivalent of building a stacked wood fire, further reduces the steps required by the traditional method from 13 steps to merely 5 steps. Thus, in a most basic sense, the simple "light and burn" nature of this inventive method for incineration solves the age-old problem of incineration, such as building the equivalent of stacked wood fires, in a novel, more user-friendly, cost-effective, and more reliable way.

Referring now to FIGS. 11A-11B, a number of incinerations utilizing the inventive methods of incineration of the present disclosure are available. In some aspects, various embodiments of the inventive incendiary devices 100 of the present disclosure can be incinerated without more, under various burning conditions. In other aspects, various embodiments of the inventive incendiary devices 100 of the present disclosure can be incinerated in tandem with other materials, under various burning conditions, such as in the case of a stacked wood fire (camp fire, bonfire, etc.) or in a fireplace. Additional non-limiting exemplary methods of incineration are shown and/or discussed in U.S. Provisional Application No. 62/787,256 filed Dec. 31, 2018 entitled "Incendiary Means, Devices and Methods Thereof", which is hereby incorporated herein by reference in its entirety Referring now to FIGS. 12A-12C, although the inventive incendiary device 100 of the present disclosure has been described herein predominantly in the form of a firestarter log 110 for reasons of brevity and conciseness, the inventive incendiary device 100 can additionally take the form of numerous alternative embodiments. Accordingly, several non-limiting alternative embodiments are presented in FIGS. 12A-12C. Additional non-limiting exemplary alternative embodiments of inventive incendiary devices 100 of the present disclosure are shown and/or discussed in U.S. Provisional Application No. 62/787,256, which is incorporated herein by reference in its entirety. In general, the non-limiting exemplary alternative embodiments comprise at least a corrugated component (comprising a corrugated substrate), a waxy component, and typically a support component (internal or external). In some desirable aspects, the alternative embodiments further comprise an ignition component. In other aspects, such alternative embodiments can comprise additional materials or constituents (e.g., fastener components, grooves, packaging, bundling members, wood blocks, etc.)

The present invention may be better understood with reference to the following examples.

EXAMPLES

Example 1

A plurality of previously-used corrugated boxes comprising double-walled corrugated material (see e.g., FIG. 2A) was obtained. The boxes were broken-down (i.e., disassembled and laid flat into planar substrates, each having a thickness of about 3-4 mm) to form a plurality of corrugated materials 112, and then positioned into a single stack. A corrugated component forming apparatus 862 was prepared by assembling a 3 in. (7.6 cm) hole saw blade comprising a center 0.25 inch drill bit onto a standard power drill (see e.g., FIG. 2C), and the corrugated component forming apparatus 862 was then used to cut out a plurality of circular corrugated components 120 (see e.g., FIG. 2G), such that each resulting corrugated component 120 had a diameter of about 3 in. (7.6 cm) with an aperture (i.e., hole 130) located in the approximate center thereof having a diameter $\phi_{110}$ of about 0.25 in. (6 mm). A support component 140 in the form of a wood doweling (see e.g., FIG. 3A) having a length $L_{140}$ of about 18 in. (46 cm) and a diameter $\phi_{140}$ of about 7 mm was obtained, and a quantity of approximately 110 of the corrugated components 120 were positioned onto the doweling 140 through the aperture 130 and then pressed lightly together by hand pressure to form a corrugated component stack 822 upon the doweling having a length of about 15.5 in. (39 cm), thus forming a precursor incendiary log 150 (see e.g., FIG. 4A). The precursor incendiary log 150 was then set aside.

Figure 4C:
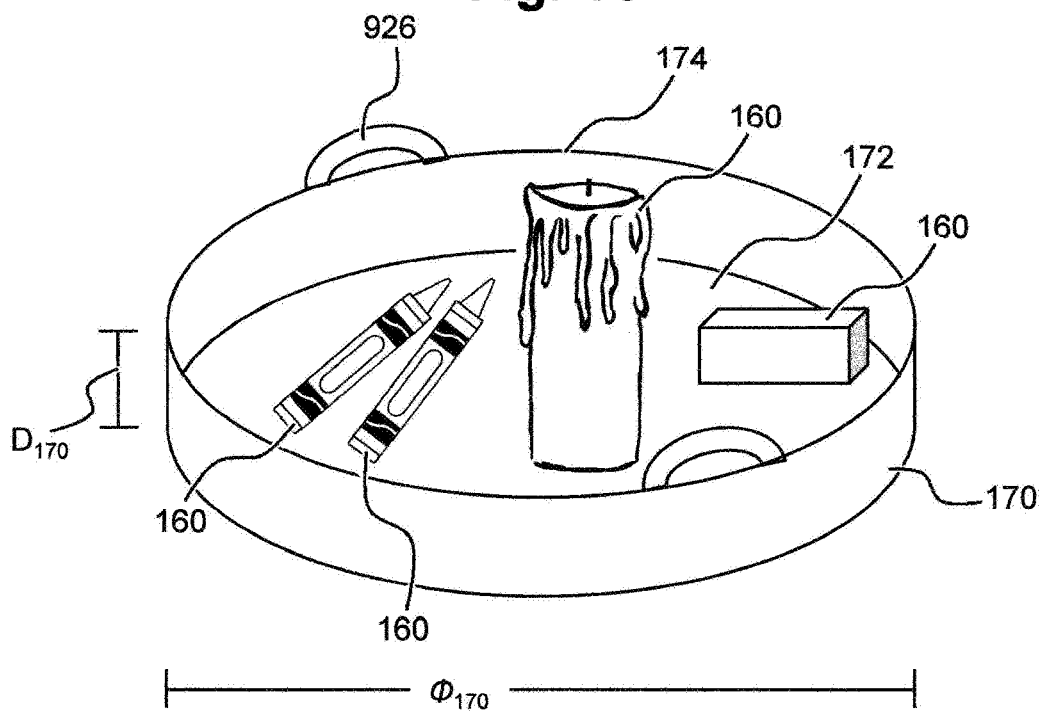
FIG. 4C is a perspective view showing a plurality of recycled waxy materials, including crayons, a used candle and a wax block, disposed within a waxy component container.
Figure 4D:
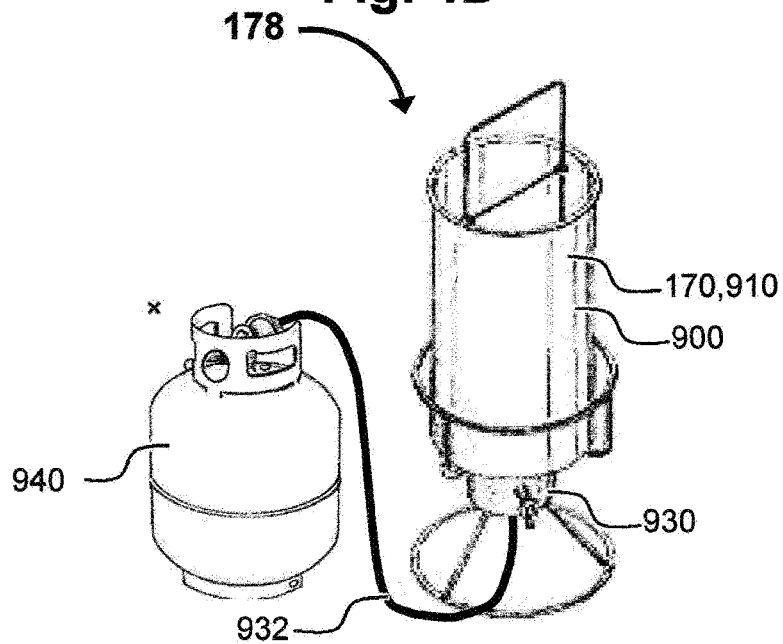
FIG. 4D is a perspective view showing a waxy component container in the form of a heated container member comprising a heating member, a fuel inlet and a fuel source.
Figure 4E:
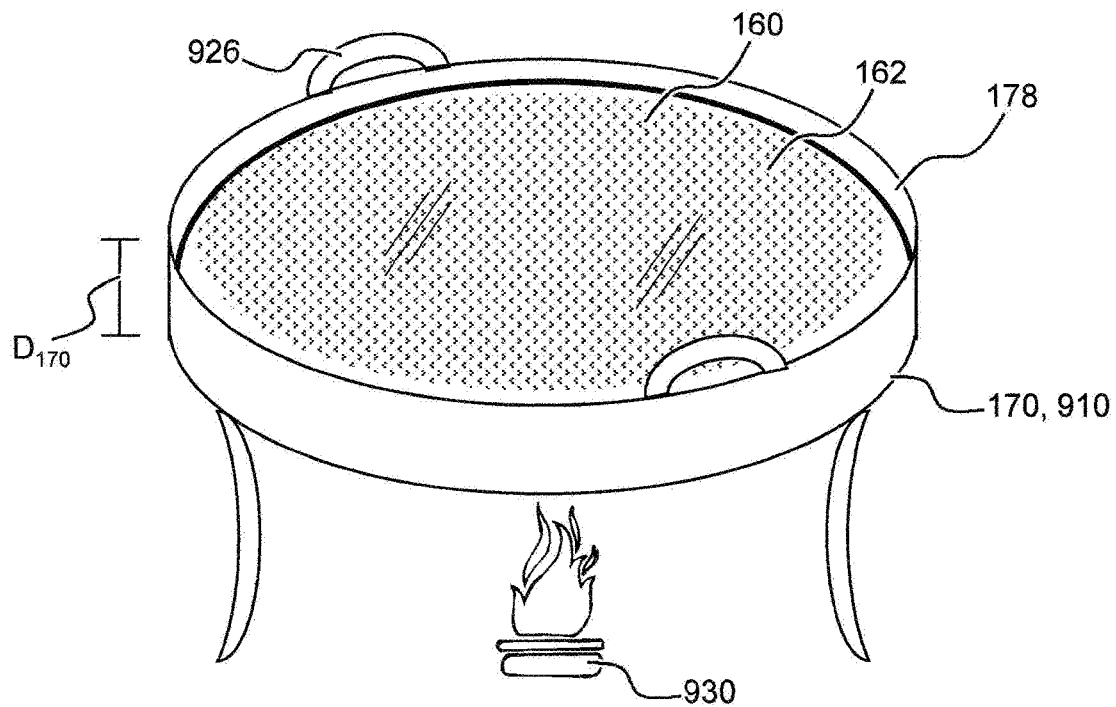
FIG. 4E is a perspective view showing a waxy component container in the form of a heated container member comprising waxy material, wherein the waxy material is in the form of molten waxy component.
Figure 4F:
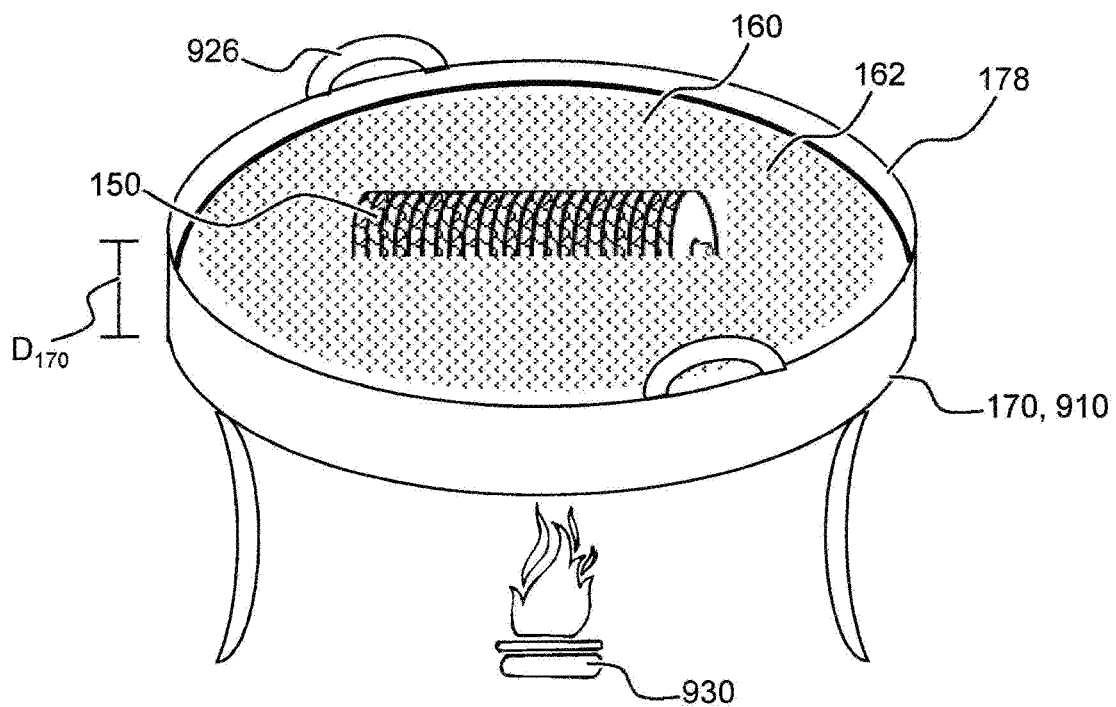
FIG. 4F is a perspective view showing a waxy component container in the form of a heated container member comprising waxy material, wherein the waxy material is in the form of heated molten waxy component, and further comprising a precursor incendiary log disposed therein.
Figure 4G:
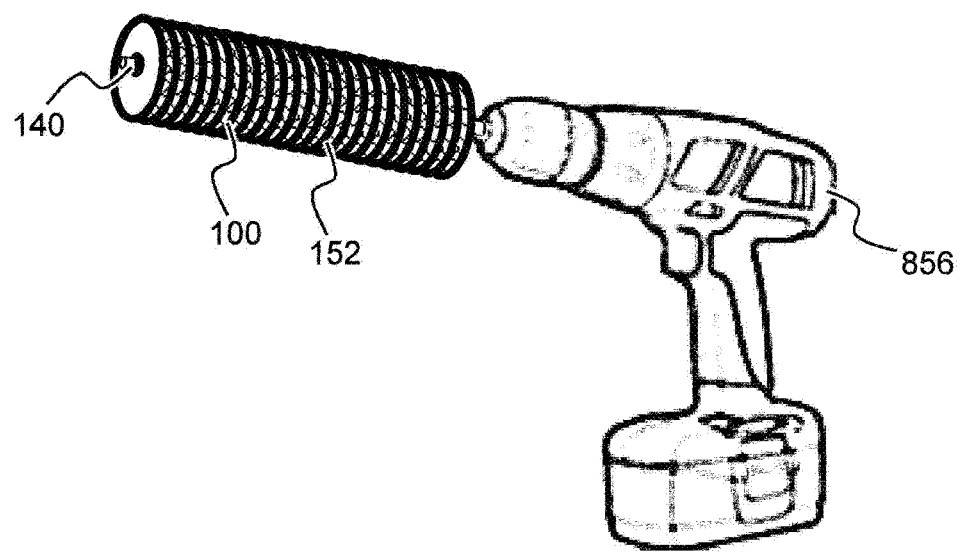
FIG. 4G is a perspective view showing an inventive incendiary device of the present disclosure in the form of a saturated incendiary log attached to a spinning apparatus.
Figure 4H:
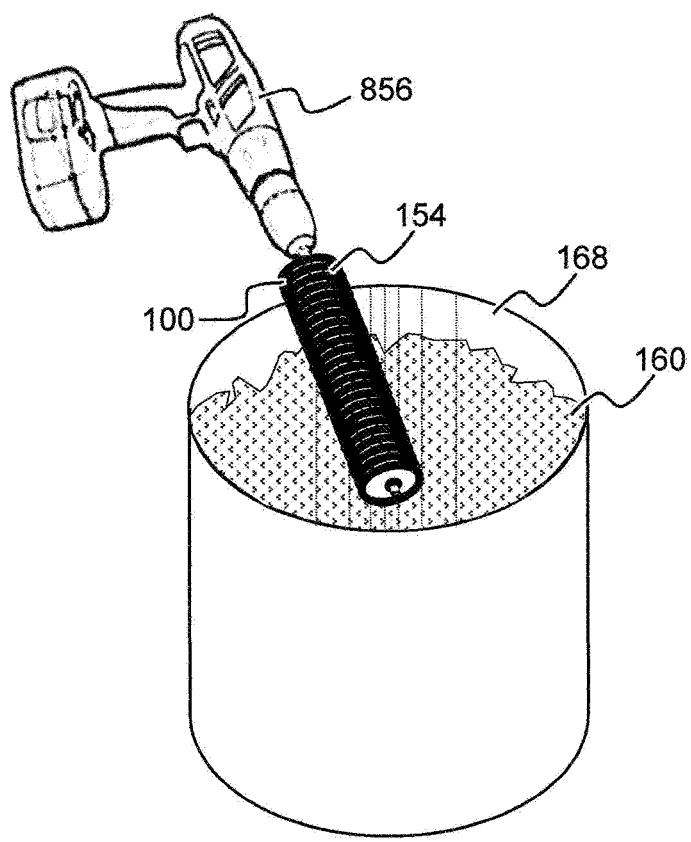
FIG. 4H is a perspective view showing an inventive incendiary device of the present disclosure in the form of a spun incendiary log, and spun waxy component disposed within a waxy component collection member.
Figure 4I:
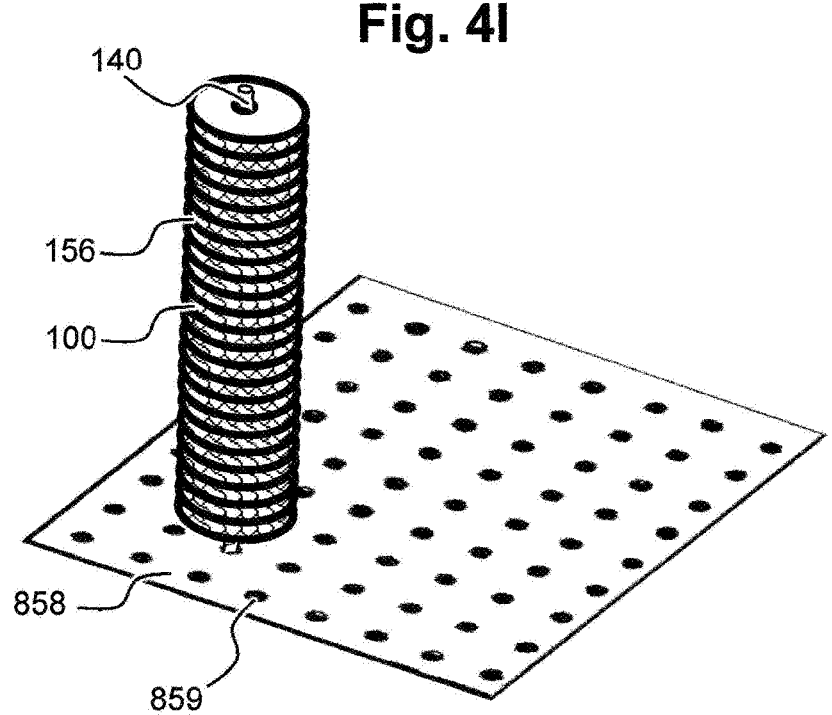
FIG. 4I is a perspective view showing an inventive incendiary device of the present disclosure vertically disposed upon a cooling apparatus.
Figure 4J:
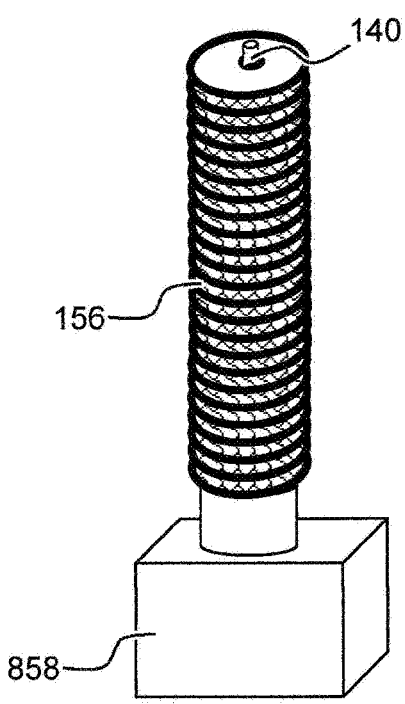
FIG. 4J is a perspective view showing an inventive incendiary device of the present disclosure vertically disposed upon a cooling apparatus.

Similar to that shown in FIGS. 4C and 4E, a waxy component infuser apparatus 178,900 in the form of a portable outdoor deep fryer was provided. The waxy component infuser apparatus 178,900 comprised a heated container member 910 in the form of an open-top cylindrical vat container 170 (having a diameter of about 36 in. (91 cm) and a depth of about 8 in. (20 cm)) which was heated from the bottom-side via a heating member 930 in the form of a flaming heating element 930A which utilized a fuel 940 in the form of propane. A sufficient quantity of recycled waxy materials 160 (i.e., about 90-percent by weight (90 wt %) in the form of used wax candles and about 10 wt % in the form of used wax crayons) was added to the container member 170,910 such that, in its molten waxy material 162 state, it filled the container member 910 to a depth of about 6 in. (15 cm). The waxy materials 160 were then melted into a molten waxy material 162 state, and subsequently heated to a temperature of about 300° F. (150° C.) to obtain a viscosity of about 1 cP.

Upon the molten waxy material 162 reaching the desired temperature, the precursor incendiary log 150 was then placed into the heated molten waxy material 162 using a set of tongs, and allowed to become saturated with the molten waxy material 162 for about 20 sec. (see e.g., FIG. 4F). During this time, it was observed that upon placement of the precursor incendiary log 150 into the heated molten waxy material 162, the heated molten waxy material 162 immediately began to foam and proceeded to wick all the way around (i.e., 360°) the corrugated component stack 822 of the precursor incendiary log 150. In addition, the precursor incendiary log 150 proceeded to rotate on its own at a relatively constant rotational speed within the heated molten waxy material 162, ensuring complete coverage of waxy component 160 onto, and into, the corrugated component stack 822. In addition, prior to removal, the corrugated component stack 822 was fully submerged into the heated molten waxy material 162 using the tongs, and held in such position for about 5 sec. to further ensure complete saturation of the precursor incendiary log 150 with the heated molten waxy material 162, forming a saturated incendiary log 152.

After engaging with the molten waxy material 162 for about 25 sec. in total, the saturated incendiary log 152 was removed from the heated container member 170,910 and excess molten waxy component 162 was allowed to drip off the saturated incendiary log 152 for about 2 sec. One end of the doweling 140 was then immediately clamped into the end of a power drill (see e.g., FIG. 4G), and then spun at about 450 rpm for another 2 sec. to remove any additional molten waxy material 162 from the air passageways 112D of the corrugated components 120 (see e.g., FIG. 4H), to ensure the air passageways 112D provided by the flutings 113A remained substantially free of clogging waxy material 160, thus forming a spun incendiary log 154, wherein the waxy component content was about 30-percent by weight (30 wt %). The saturated corrugated component stack 822 (cleared of excess molten waxy material 162) was then compressed lengthwise to a length of about 15 in. (38 cm) using protected hand pressure to form a compressed incendiary log 156. Once the molten wax 162 had begun to set, the compressed incendiary log 156 was placed in a vertical position upon a generally flat surface (having an opening to accommodate the protruding doweling) and allowed to cool to room temperature (about 21° C.), to form a cooled incendiary log 158 (see e.g., FIGS. 4I-4J).

Upon cooling, a lengthwise groove 195 having a width of about 2 mm and depth of about 15 mm was longitudinally cut into the cooled incendiary log 158 using a table saw, to form a grooved incendiary log 159. In addition, the end portions of the doweling 140 were cut off using a saw such that a length of about 4 mm of the remaining doweling 140 protruded from either end of the grooved incendiary log 159. An ignition component 190 in the form of a cannon-style fuse having a length of about 15.5 in. (39 cm) and a diameter of about 3 mm was inserted lengthwise into the groove 195 using the blade of a putty knife, configured such that one end of the fuse 190 was flush with a first planar exterior surface of the corrugated components 120 at one end of the compressed corrugated component stack 822', and the other end of the fuse 190 protruded from the second end of the grooved incendiary log 159 by about 0.5 in. (1.3 cm). Thus, the above method resulted in a non-limiting version of an inventive incendiary device 100 of the present disclosure in the form of a firestarter log 110.

The firestarter log 110 was placed onto the ground, and a plurality of green wood blocks were stacked upon it. The ignition component 190 was then ignited using a flame from a butane lighter, the firestarter log began burning and further ignited the green wood blocks, and the stacked wood fire was allowed to burn until substantially consumed. The inventive firestarter log 110 of this Example 1 was thus a success.

Example 2

A plurality of previously-used corrugated boxes comprising double-walled corrugated material was obtained. The boxes were broken-down (i.e., disassembled and laid flat into planar substrates, each having a thickness of about 4 mm) to form a plurality of corrugated materials 112, and then positioned into a single stack. A corrugated component forming apparatus 862 was prepared by assembling a 3 in. (7.6 cm) hole saw blade comprising a 0.25 in. center drill bit onto a standard power drill, and the corrugated component forming apparatus 862 was then used to cut out a plurality of circular corrugated components 120, such that each resulting corrugated component 120 had a diameter of about 3 in. (7.6 cm) with an aperture (i.e., hole 130) located in the approximate center thereof having a diameter $\phi_{130}$ of about 6 mm. A support component 140 in the form of a wood doweling having a length $L_{140}$ of about 18 in. (46 cm) and a diameter $\phi_{140}$ of about 7 mm was obtained, and a quantity of approximately 100 of the corrugated components 120 were positioned onto the doweling through the aperture 130 and then pressed lightly together by hand pressure to form a corrugated component stack 822 upon the doweling having a length of about 15.7 in (40 cm), thus forming a precursor incendiary log 150. The cylindrical precursor incendiary log 150 was then set aside.

A waxy component infuser apparatus 178,900 in the form of a portable outdoor deep fryer was provided. The waxy component infuser apparatus 178,900 comprised a heated container member 910 in the form of an open-top cylindrical vat container 170 (having a diameter of about 36 in. (91 cm) and a depth of about 8 in. (20 cm)) which was heated from the bottom-side via a heating member 930 in the form of a flaming heating element 930A which utilized a fuel 940 in the form of propane. A sufficient quantity of recycled waxy material 160 (i.e., beef tallow) was added to the container member 170,910 such that, in its molten waxy material 162 state, it filled the container member 170,910 to a depth of about 6 in. (15 cm). The beef tallow 160 was then melted into a molten oil 162 state, and subsequently heated to a temperature of about 350° F. (176° C.) to obtain a viscosity of about 1 cP.

Upon the molten beef tallow 162 reaching the desired temperature, the precursor incendiary log 150 was then placed into the heated molten waxy component 162 (i.e., molten beef tallow) using a set of tongs, and allowed to become saturated with the molten beef tallow 162 for about 20 sec. During this time, it was observed that upon placement of the precursor incendiary log 150 into the heated molten beef tallow 162, the heated molten beef tallow 162 immediately began to wick all the way around (i.e., 360°) the corrugated component stack 822 of the precursor incendiary log 150. In addition, the precursor incendiary log 150 proceeded to rotate on its own within the heated molten beef tallow 162, ensuring complete coverage of beef tallow 160 onto, and into, the corrugated component stack 822. In addition, prior to removal, the precursor incendiary log 150 was fully submerged into the heated molten beef tallow 162 using the tongs, and held in such position for about 5 sec. to further ensure complete saturation of the precursor incendiary log 150 with the heated molten waxy material 162, thus forming a saturated incendiary log 152.

After engaging with the molten beef tallow 162 for about 25 sec. in total, the saturated incendiary log 152 was removed from the heated container member 170,910 and excess waxy material 160 was allowed to drip off the saturated incendiary log 152 for about 2 sec. One end of the doweling 140 was then immediately clamped into the end of a power drill, and then spun at about 450 rpm for another 2 sec. to remove any additional molten waxy material 162 from the air passageways 112D of the corrugated components 120, to ensure the air passageways 112D provided by the flutings 113A remained substantially free of clogging beef tallow 160, such that the beef tallow content was about 55 wt %, thus forming a spun incendiary log 154. The spun incendiary log 154 (cleared of excess molten beef tallow 162) was then compressed lengthwise to a length of about 15 in. (38 cm) using protected hand pressure until the molten beef tallow 162 began to set, thus forming a compressed incendiary log 156. The compressed incendiary log 156 was then placed in a vertical position upon a generally flat surface (having an opening to accommodate the protruding doweling) and allowed to cool to room temperature (about 21° C.), thus forming a cooled incendiary log 158.

Upon cooling, a lengthwise groove 195 having a width of about 2 mm and depth of about 15 mm was cut into the cooled incendiary log 158 using a table saw, thus forming a grooved incendiary log 159. In addition, the end portions of the doweling 140 were cut off using a saw such that a length of about 5 mm of the remaining doweling 140 protruded from either end of the grooved incendiary log 159. An ignition component 190 in the form of a cannon-style fuse having a length of about 16 in. (41 cm) and a diameter of about 3 mm was inserted lengthwise into the groove 195 using the blade of a putty knife, configured such that one end of the fuse 190 was flush with a first end of the compressed corrugated component stack 822', and the other end of the fuse 190 protruded from the second end of the grooved incendiary log 159 by about 1 in. (2.5 cm). Thus, the above method resulted in a non-limiting version of an inventive incendiary device 100 of the present disclosure in the form of a firestarter log 110.

The firestarter log 110 was placed onto the ground, and a plurality of green wood blocks were stacked upon it. The ignition component 190 was then ignited using a flame from a butane lighter, the firestarter log began burning and further ignited the green wood blocks, and the stacked wood fire was allowed to burn until substantially consumed. The inventive firestarter log 110 of this Example 2 was thus a success.

Example 3

A plurality of previously-used corrugated materials 112 comprising triple-walled corrugated material (each having a thickness of about 7 mm) in the form of planar substrates was obtained. The corrugated materials 112 were then positioned into a single stack. A corrugated component forming apparatus 862 was prepared by assembling a 3 in. (7.6 cm) hole saw blade comprising a 0.25 in. center drill bit onto a standard power drill, and the corrugated component forming apparatus 862 was then used to cut out a plurality of circular corrugated components 120, such that each resulting corrugated component 120 had a diameter of about 3 in. (7.6 cm) with an aperture (i.e., hole 130) located in the center thereof having a diameter $\phi_{130}$ of about 6 mm. A support component 140 in the form of a wood doweling having a length $L_{140}$ of about 18 in. (46 cm) and a diameter $\phi_{140}$ of about 7 mm was obtained, and a quantity of approximately 56 of the corrugated components 120 were positioned onto the doweling through the aperture 130 and then pressed lightly together by hand pressure to form a corrugated component stack 822 having a length of about 15.5 in. (39 cm), thus forming a precursor incendiary log 150. A fastener component 180 in the form of a wood pressure washer was then assembled onto each protruding end portion of the doweling 140, and then positioned securely against its respective corrugated component 120 exterior planar surface to ensure retention of the compressed stacked configuration. The cylindrical precursor incendiary log 150 was then set aside.

A waxy component infuser apparatus 178,900 in the form of a portable outdoor deep fryer was provided. The waxy component infuser apparatus 178,900 comprised a heated container member 910 in the form of an open-top cylindrical vat container 170 (having a diameter of about 36 in. (91 cm) and a depth of about 8 in. (20 cm)) which was heated from the bottom-side via a heating member 930 in the form of a flaming heating element 930A which utilized a fuel 940 in the form of propane. A sufficient quantity of waxy materials 160 (i.e., IGI 1230A fully refined paraffin wax, available from The International Group, Inc., having a place of business located in Titusville, Pa., USA 16354) was added to the container member 170,910 such that, in its molten waxy material 162 state, it filled the container member 170,910 to a depth of about 6 in. (15 cm). The waxy materials 160 were then melted into a molten waxy component 162 state, and subsequently heated to a temperature of about 310° F. (150° C.) to obtain a viscosity of about 1 cP.

Upon the molten waxy material 162 reaching the desired temperature, the precursor incendiary log 150 was then placed into the heated molten waxy component 162 using a set of tongs, and allowed to become saturated with the molten waxy component 162 for about 20 sec. During this time, it was observed that upon placement of the precursor incendiary log 150 into the heated molten waxy component 162, the heated molten waxy component 162 immediately began to foam and the molten waxy component proceeded to wick all the way around (i.e., 360°) the corrugated component stack 822. In addition, the precursor incendiary log 150 proceeded to rotate on its own at a variable rotational speed within the heated molten waxy component 162, ensuring complete coverage of waxy component 160 onto, and into, the corrugated component stack 822 of the precursor incendiary log 150. In addition, prior to removal, the precursor incendiary log 150 was fully submerged into the heated molten waxy component 162 using the tongs, and held in such position for about 5 sec. to further ensure complete saturation of the precursor incendiary log 150 with the heated molten waxy component 162, thus forming a saturated incendiary log 152.

After engaging with the molten waxy component 162 for about 25 sec. in total, the saturated incendiary log 152 was removed from the heated container member 910 and excess molten waxy component 162 was allowed to drip off the saturated incendiary log 152 for about 2 sec. One end of the doweling 140 was then immediately clamped into the end of a power drill, and then spun at about 450 rpm for another 2 sec. to remove any additional molten waxy component 162 from the air passageways 112D of the corrugated components 120, to ensure the air passageways 112D provided by the flutings 113A,113B remained substantially free of clogging waxy material 160 such that the waxy component content was about 45 wt %, thus forming a spun incendiary log 154. The spun incendiary log 154 (cleared of excess molten waxy component 162) was then compressed lengthwise to a length of about 15 in. (38 cm) until the molten waxy component 162 began to set using protected hand pressure to form a compressed incendiary log 156. The compressed incendiary log 156 was then placed in a vertical position upon a generally flat surface (having an opening to accommodate the protruding doweling) and allowed to cool to room temperature (about 21° C.), thus forming a cooled incendiary log 158.

Upon cooling, a lengthwise groove 195 having a width of about 2 mm and depth of about 15 mm was cut into the precursor incendiary log 150 using a table saw, thus forming a grooved incendiary log 159. In addition, the end portions of the doweling 140 were cut off using a saw such that a length of about 2 mm of the remaining doweling 140 extended from each pressure washer 180 of the grooved incendiary log 159. An ignition component 190 in the form of a fireworks-style fuse having a length of about 15.5 in. (39 cm) and a diameter of about 2.5 mm was inserted lengthwise into the groove 195 using the blade of a putty knife, configured such that one end of the fuse 190 was flush with a first planar exterior surface of the corrugated components 120 at one end of the compressed corrugated component stack 822', and the other end of the fuse 190 protruded from the second end of the grooved incendiary log 159 by about 0.5 in. (1.3 cm). Thus, the above method resulted in a non-limiting version of an inventive incendiary device 100 of the present disclosure in the form of a firestarter log 110.

The firestarter log 110 was placed onto the ground, and a plurality of green wood blocks were stacked upon it. The ignition component 190 was then ignited using a flame from a butane lighter, the firestarter log began burning and further ignited the green wood blocks, and the stacked wood fire was allowed to burn until substantially consumed. The inventive firestarter log 110 of this Example 3 was thus a success.

Example 4

A plurality of previously-used corrugated boxes comprising double-walled corrugated material was obtained. The boxes were broken-down (i.e., disassembled and laid flat into corrugated material 112 planar substrates, each having a thickness of about 3-4 mm). A corrugated component forming apparatus 862 in the form of a mechanical punch die comprising a plurality of 1.5 in. (3.8 cm) size circular punch elements, each having an additional center punch element having a diameter of about 3 mm (see e.g., FIGS. 2E-2F), was then used to cut out a plurality of circular corrugated components 120 from each substrate, such that each resulting corrugated component 120 had a diameter of about 1.5 in. (3.8 cm) with an aperture (i.e., hole 130) located in the approximate center thereof having a diameter $\phi_{130}$ of about 3 mm. A support component 140 in the form of a wood doweling having a length $L_{140}$ of about 8 in. (46 cm) and a diameter $\phi_{140}$ of about 3 mm was obtained, and a quantity of approximately 45 of the corrugated components 120 were positioned onto the doweling through the aperture 130 and then pressed lightly together by hand pressure to form a corrugated component stack 822 having a length of about 6.5 in. (39 cm), thus forming a precursor incendiary log 150. The cylindrical precursor incendiary log 150 was then set aside.

A waxy component infuser apparatus 178,900 in the form of a portable outdoor deep fryer was provided. The waxy component infuser apparatus 178,900 comprised a heated container member 910 in the form of an open-top cylindrical vat container 170 (having a diameter of about 36 in. (91 cm)

and a depth of about 8 in. (20 cm)) which was heated from the bottom-side via a heating member 930 in the form of a flaming heating element 930A which utilized a fuel 940 in the form of propane. A sufficient quantity of recycled waxy materials 160 (i.e., about 90 wt % used wax candles and about 10 wt % used wax crayons) was added to the container member 170,910 such that, in its molten waxy component 162 state, it filled the container member 910 to a depth of about 6 in. (15 cm). The waxy materials 160 were then melted into a molten waxy component 162 state, and subsequently heated to a temperature of about 300° F. (150° C.) to obtain a viscosity of about 1 cP.

Upon the molten waxy component 162 reaching the desired temperature and viscosity, the precursor incendiary log 150 was then placed into the heated molten waxy component 162 using a set of tongs, and allowed to become saturated with the molten waxy component 162 for about 15 sec. During this time, it was observed that upon placement of the precursor incendiary log 150 into the heated molten waxy component 162, the heated molten waxy component 162 immediately began to foam and proceeded to wick all the way around (i.e., 360°) the corrugated component stack 822 of the precursor incendiary log 150. In addition, the precursor incendiary log 150 proceeded to rotate on its own at a variable rotational speed within the heated molten waxy component 162, ensuring complete coverage of waxy component 160 onto, and into, the corrugated component stack 822. In addition, prior to removal, the precursor incendiary log 150 was fully submerged into the heated molten waxy component 162 using the tongs, and held in such position for about 3 sec. to further ensure complete saturation of the corrugated component stack 822 with the heated molten waxy component 162, thus forming a saturated incendiary log 152.

After engaging with the molten waxy component 162 for about 18 sec. in total, the saturated incendiary log 152 was removed from the heated container member 910 and excess waxy material 160 was allowed to drip off the saturated incendiary log 152 for about 2 sec. One end of the doweling 140 was then immediately clamped into the end of a power drill, and then spun at about 450 rpm for another 2 sec. to remove any additional molten waxy component 162 from the air passageways 112D of the corrugated components 120, to ensure the air passageways 112D provided by the flutings 113A remained substantially free of clogging waxy material 160, such that the waxy component content was about 30 wt %, thus forming a spun incendiary log 154. The spun incendiary log 154 (cleared of excess molten waxy component 162) was then compressed lengthwise to a length of about 6 in. (15 cm) using protected hand pressure until the molten waxy component 162 began to set to form a compressed incendiary log 156. The compressed incendiary log 156 was then placed in a vertical position upon a generally flat surface (having an opening to accommodate the protruding doweling) and allowed to cool to room temperature (about 21° C.), thus forming a cooled incendiary log 158.

Upon cooling, a lengthwise groove 195 having a width of about 2 mm and depth of about 10 mm was cut into the cooled incendiary log 158 using a table saw, thus forming a grooved incendiary log 159. In addition, the end portions of the doweling 140 were cut off using a saw such that a length of about 1 mm of the remaining doweling 140 protruded from either end of the grooved incendiary log 159. An ignition component 190 in the form of a fireworks-style fuse having a length of about 7 in. (18 cm) and a diameter of about 2.5 mm was inserted lengthwise into the groove 195 using the blade of a putty knife, configured such that one end of the fuse 190 was flush with a first planar exterior surface of the corrugated components 120 at one end of the compressed corrugated component stack 822', and the other end of the fuse 190 protruded from the second end of the grooved incendiary log 159 by about 1 in. (2.5 cm). Thus, the above method resulted in a non-limiting version of an inventive incendiary device 100 of the present disclosure in the form of a firestarter log 110.

The firestarter log 110 was completely submerged into a pool of water, and then allowed to float upon the water. While floating on the water, the ignition component 190 was then ignited using a flame from a butane lighter, and the firestarter log 110 ignited and incinerated until substantially consumed. The inventive firestarter log 110 of this Example 4 was thus a success, even when utilized in a wet condition.

Example 5

With reference to FIGS. 6A-6F, a firestarter log 110 made according to the method of Example 1 was provided. An 18 in. (46 cm) length of 3 in. (7.6 cm) wide Kraft packaging adhesive tape having a brown color and a basis weight of about 25 pounds was laid flat on a table with the adhesive side facing upwards (i.e., away from the table surface). A sheet of Kraft paper having a brown color and a basis weight of about 15 pounds was then cut to dimensions comprising a length of about 26 in. (66 cm) and a width of about 18 in. (46 cm). The cut Kraft paper was then laid flat onto the tape, such that the length of the tape was generally transversely centered along the longitudinal length of the Kraft paper, and wherein approximately 4 in (10 cm) of the tape extended from a first end 210A of the paper. The paper was then pressed against the tape to engage the pressure sensitive adhesive upon the tape. In addition, about 1 in. (2.5 cm) of the tape (as measured from the extending end) was folded upon itself to create a grasping element. The firestarter log 110 was then placed transversely (i.e., the length of the firestarter log 110 was placed along the width of the paper) at the second end 210B of the paper (opposite of the adhesive tape end) and subsequently centered with respect to the width dimension of the paper. The Kraft paper was then rolled onto the firestarter log 110 along the length of the paper, such that the paper was wrapped around the circumference of the firestarter log 110 approximately 2.7 times, with about 1.5 in. (3.8 cm) of the paper extending beyond the distal ends of the firestarter log 110. In addition, the tape extending beyond the first end 210A of the paper was likewise wrapped around the circumference of the firestarter log 110, and then pressed against the wrapped paper to engage the pressure sensitive adhesive, thus fastening the packaging component 210 and release member 220 to the firestarter log 110. The transverse end portions of the paper (i.e., the portion of paper extending beyond the ends $E_{110A}$, $E_{110B}$ of the firestarter log 110) were then folded into contact with the ends $E_{110A}$, $E_{110B}$ of the firestarter log 110, thus substantially encapsulating the entire log with the packaging component 210. Hot melt glue was then applied to a first side of two circular corrugated components 120 (each having a diameter of about 3 in (7.6 cm)), and the first side of each corrugated component was then pressed upon the folded paper at each distal end of the firestarter log 110, thus forming a non-limiting, exemplary packaging for an inventive incendiary device 100 of the present disclosure.

Example 6

With reference to FIG. 6G, a plurality of firestarter logs 110 (i.e., six (6) logs) made according to the method of Example 1 were provided. A bundling member 320 in the form of a plastic banding having a length of about 36 in. (91 cm) and a width of about 0.25 in. (0.6 cm) was laid flat on a suitable surface. The plurality of firestarter logs 110 was placed onto the approximate longitudinal center of the banding and arranged in an ascending 3-2-1 pyramid-stacked configuration to form a bundle 310 (wherein the banding 320 generally aligned with the approximate longitudinal center of the logs 110). The end portions of the banding 320 were then drawn up and around the bundle 310, and subsequently overlapped to form a snug fit upon the bundle 310. Adhesive glue was then applied to the overlapped portion of the banding 320 and held in place until the glue set and cured, thus forming a bundle 310 of inventive incendiary devices 100 comprising a bundling member 320.

It will be appreciated that details of the foregoing examples, given for purposes of illustration, are not to be construed as limiting the scope of this invention. Although only a few exemplary embodiments of this invention have been described in detail above, persons having ordinary skill in the art will readily appreciate that many modifications are possible in the examples without materially departing from the novel teachings and advantages of this invention. For example, features described in relation to one example may be incorporated into any other example of the invention.

Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention. As various changes could be made in the above constructions without departing from the scope of the invention, it is intended that all matter contained in the above description shall be interpreted as illustrative and not in a limiting sense.

What is claimed is:

1. An incendiary device comprising a plurality of corrugated components, a support component and a waxy component;

wherein each corrugated component comprises corrugated material comprising a first wall layer having a first planar surface, a second wall layer having a second planar surface distal to the first wall layer, and a fluting layer disposed therebetween to provide a plurality of air passageways;

wherein the corrugated components are disposed in an adjacent configuration such that the first planar surface of a corrugated component is in substantial contact with the second planar surface of an adjacent corrugated component;

wherein the adjacent configuration of the plurality of corrugated components is configured as a stacked configuration to form a corrugated component stack having a longitudinal length, a width, a height, a first end and a second end;

wherein the plurality of corrugated components each comprise an aperture to form a plurality of apertures within the corrugated component stack, and wherein each aperture is disposed such that the plurality of apertures are substantially contiguously aligned throughout the longitudinal length of the corrugated component stack;

wherein the support component is in contact with at least one of the plurality of corrugated components and is disposed within the apertures throughout the longitudinal length of the corrugated component stack; and wherein the corrugated material is substantially saturated with the waxy component.

2. The incendiary device of claim 1 wherein the incendiary device is in the form of a firestarter log.

3. The incendiary device of claim 1 wherein the plurality of corrugated components each comprise an aperture to form a plurality of apertures within the corrugated component stack, and wherein each aperture is disposed such that the plurality of apertures are substantially contiguously aligned throughout the longitudinal length of the corrugated component stack.

4. The incendiary device of claim 3 wherein the support component is disposed within the apertures throughout the longitudinal length of the corrugated component stack.

5. The incendiary device of claim 4 wherein the support component extends beyond the first end and the second end of the corrugated component stack.

6. The incendiary device of claim 5 further comprising a fastener component disposed about the support component, wherein the fastener component is in substantial contact with the first end of the corrugated component stack.

7. The incendiary device of claim 4 wherein the support component is a wood doweling.

8. The incendiary device of claim 4 further comprising an ignition component extending at least partially along the longitudinal length of the corrugated component stack.

9. The incendiary device of claim 4 further comprising a groove extending at least partially along the longitudinal length of the corrugated component stack.

10. The incendiary device of claim 9 further comprising an ignition component extending at least partially along the longitudinal length of the corrugated component stack, wherein at least a portion of the ignition component is disposed within at least a portion of the groove.

11. A method for making an incendiary device, comprising:

a. providing corrugated materials, waxy materials and a support component having a longitudinal length and distal ends;

b. preparing a plurality of corrugated components from the corrugated materials, wherein each said corrugated component comprises a first wall layer having a first planar surface, a second wall layer having a second planar surface distal to the first wall layer, and a fluting layer disposed therebetween to provide a plurality of air passageways through the corrugated component;

c. disposing a hole in each said corrugated component, wherein the hole passes through the first wall layer, the fluting layer and the second wall layer, and wherein the hole is located in substantially the same location for each said corrugated component;

d. arranging the plurality of corrugated components into a stacked configuration such that the holes are substantially aligned to form a corrugated component stack having a longitudinal length and distal ends;

e. disposing the support component through the holes of the corrugated component stack such that the distal ends of the support component extend externally from the distal ends of the corrugated component stack to form a precursor incendiary log;

f. disposing the waxy materials into a suitable container and heating the waxy materials to form a molten waxy component;

g. disposing the precursor incendiary log into the molten waxy component until saturation is attained to form a saturated incendiary log;

h. spinning the saturated incendiary log to remove excess molten waxy component sufficient to substantially clear the air passageways to form a spun incendiary log;

i. longitudinally compressing the corrugated component stack of the spun incendiary log such that each said corrugated component is in planar contact with an adjacent corrugated component to form a compressed incendiary log; and j. cooling the compressed incendiary log to a temperature wherein the waxy material substantially solidifies to form the incendiary device.

12. The method of claim 11 wherein the molten waxy material is heated to a viscosity of about 1 centipoise.

13. The method of claim 11 further comprising providing an ignition component, and attaching the ignition component to the incendiary device.

14. The method of claim 11 further comprising disposing a groove into the incendiary device.

15. The method of claim 14 further comprising providing an ignition component, and disposing the ignition component at least partially into the groove.

16. The method of claim 11 further comprising providing fastener components, and disposing the fastener components onto the distal ends of the support component such that the fastener components are in substantial contact with the distal ends of the corrugated component stack of the precursor incendiary log.

17. The method of claim 11 further comprising applying a packaging component to the incendiary device.

18. A method for incinerating, comprising:

a. providing an incendiary device comprising a plurality of corrugated components, a support component, a waxy component and an ignition component;

b. placing the incendiary device onto a suitable surface; and c. igniting the incendiary device by contacting the ignition component with a flame;

wherein each corrugated component of the plurality of corrugated components comprises corrugated material comprising a first wall layer having a first planar surface, a second wall layer having a second planar surface distal to the first wall layer, and a fluting layer disposed therebetween to provide a plurality of air passageways;

wherein the plurality of corrugated components are disposed in an adjacent configuration such that the first planar surface of a corrugated component is in substantial contact with the second planar surface of an adjacent corrugated component to form a corrugated component stack having a longitudinal length and distal ends;

wherein the support component is disposed through the longitudinal length of the corrugated component stack;

wherein the ignition component is in contact with the corrugated component stack and is disposed along at least a portion of the longitudinal length thereof; and wherein the incendiary device comprises the waxy component such that the corrugated material is substantially saturated with the waxy component and the air passageways are substantially free of clogging waxy component.

19. The method of claim 18 wherein the ignition component is disposed along substantially the entire longitudinal length of the incendiary device.

20. The method of claim 18 further comprising placing at least one block of wood onto the incendiary device.

* * * * *